United States Patent [19]
Crump et al.

[11] Patent Number: 5,752,044
[45] Date of Patent: May 12, 1998

[54] COMPUTER SYSTEM HAVING MULTI-LEVEL SUSPEND TIMERS TO SUSPEND FROM OPERATION IN ATTENDED AND UNATTENDED MODES

[75] Inventors: Dwayne Thomas Crump, Apex; Duane Edward Norris; Steven Taylor Pancoast, both of Raleigh, all of N.C.

[73] Assignee: International Business Machines Corporation, Armonk, N.Y.

[21] Appl. No.: 477,857

[22] Filed: Jun. 7, 1995

[51] Int. Cl.⁶ ........................................ G06F 1/32
[52] U.S. Cl. ............................... 395/750; 395/838
[58] Field of Search ............................. 395/750, 838

[56] References Cited

U.S. PATENT DOCUMENTS

| | | |
|---|---|---|
| 4,851,987 | 7/1989 | Day . |
| 5,008,829 | 4/1991 | Cox et al. . |
| 5,021,983 | 6/1991 | Nguyen et al. . |
| 5,142,684 | 8/1992 | Perry et al. . |
| 5,167,024 | 11/1992 | Smith . |
| 5,193,176 | 3/1993 | Brandin . |
| 5,218,704 | 6/1993 | Watts, Jr. et al. . |
| 5,283,819 | 2/1994 | Glick et al. . |
| 5,300,831 | 4/1994 | Pham et al. . |
| 5,355,501 | 10/1994 | Gross et al. . |
| 5,369,771 | 11/1994 | Gettel . |
| 5,410,711 | 4/1995 | Stewart . |
| 5,410,713 | 4/1995 | White et al. . |
| 5,504,907 | 4/1996 | Stewart et al. ............ 395/750 |

FOREIGN PATENT DOCUMENTS

| | | |
|---|---|---|
| 0 518 622 A1 | 12/1992 | European Pat. Off. . |
| 59-77531 | 4/1984 | Japan . |

*Primary Examiner*—Jack B. Harvey
*Assistant Examiner*—Jeffrey K. Seto
*Attorney, Agent, or Firm*—Calfee, Halter & Griswold LLP

[57] ABSTRACT

A computer system having suspend and resume capabilities using multiple suspend timers. The multiple suspend timers execute such that the computer system suspends after a longer period of time of user inactivity when the system is powered up in an attended mode and suspends after a shorter period of time of inactivity when the system is powered up in an unattended mode. If the system awakens in an unattended mode and user activity is subsequently detected, the system changes to suspend after the longer period of time of user inactivity. The multiple timers are implemented either by a single timer restarted to two different values or by two independent timers having different expiration values.

27 Claims, 57 Drawing Sheets

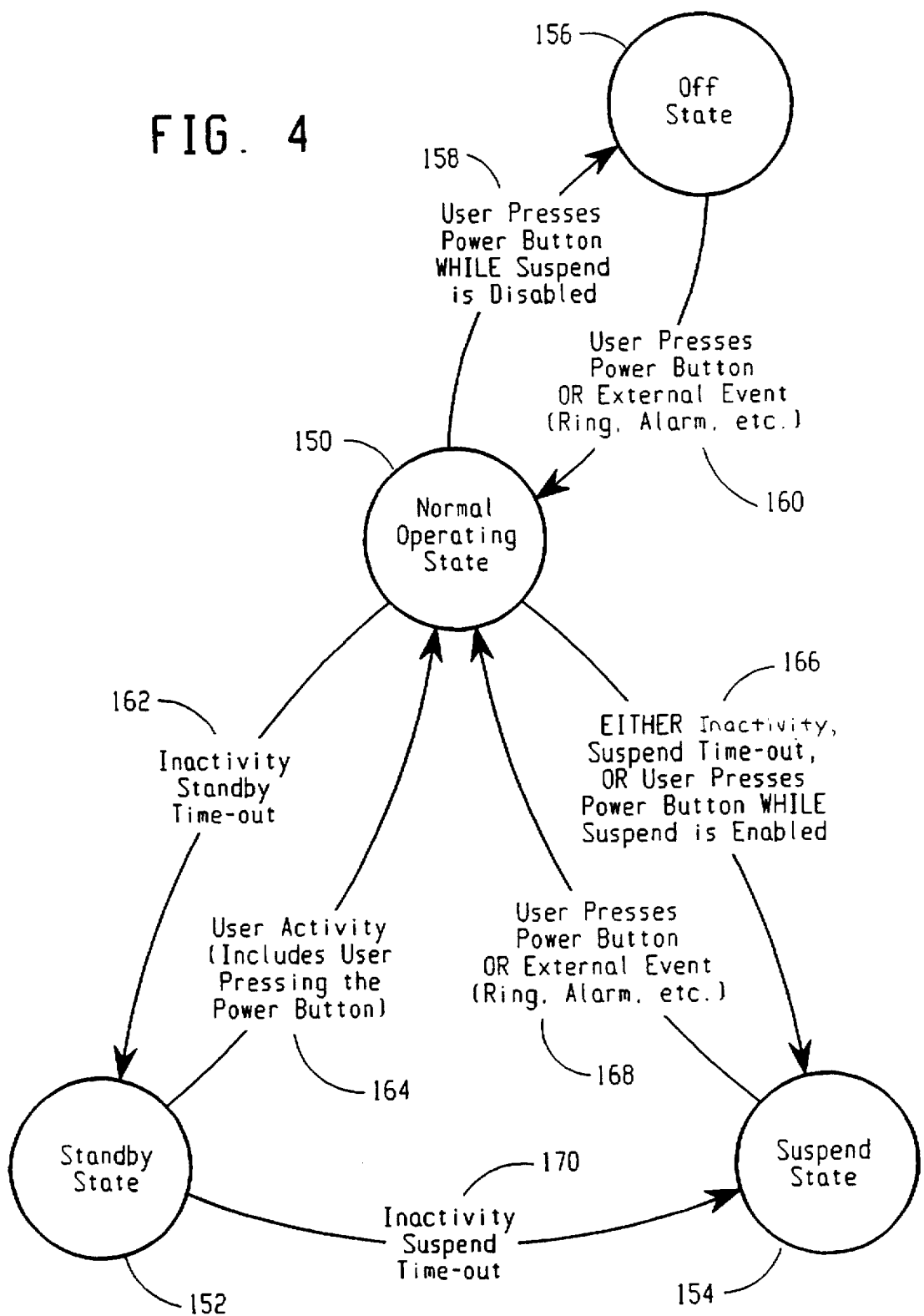

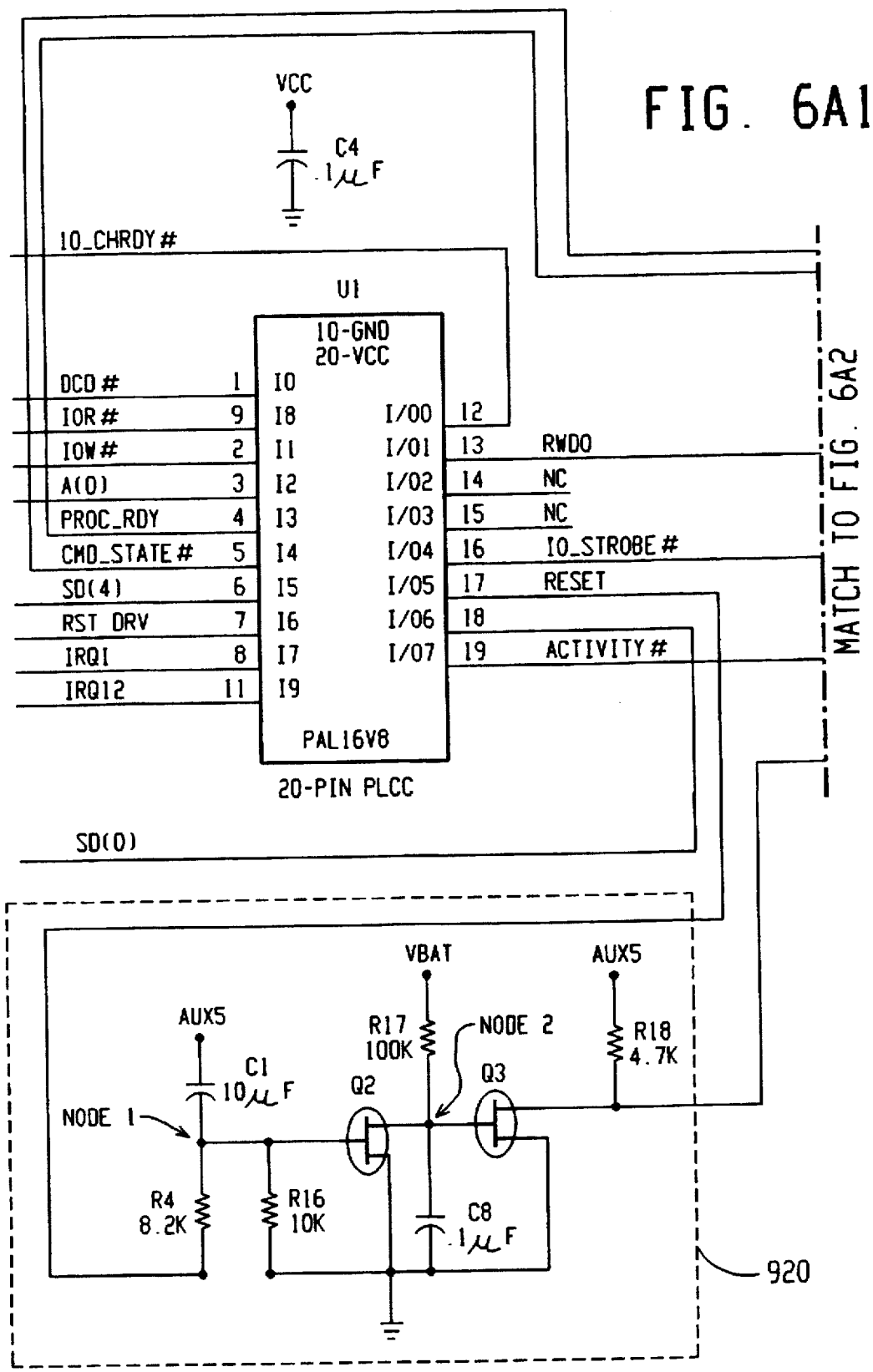
FIG. 6A1

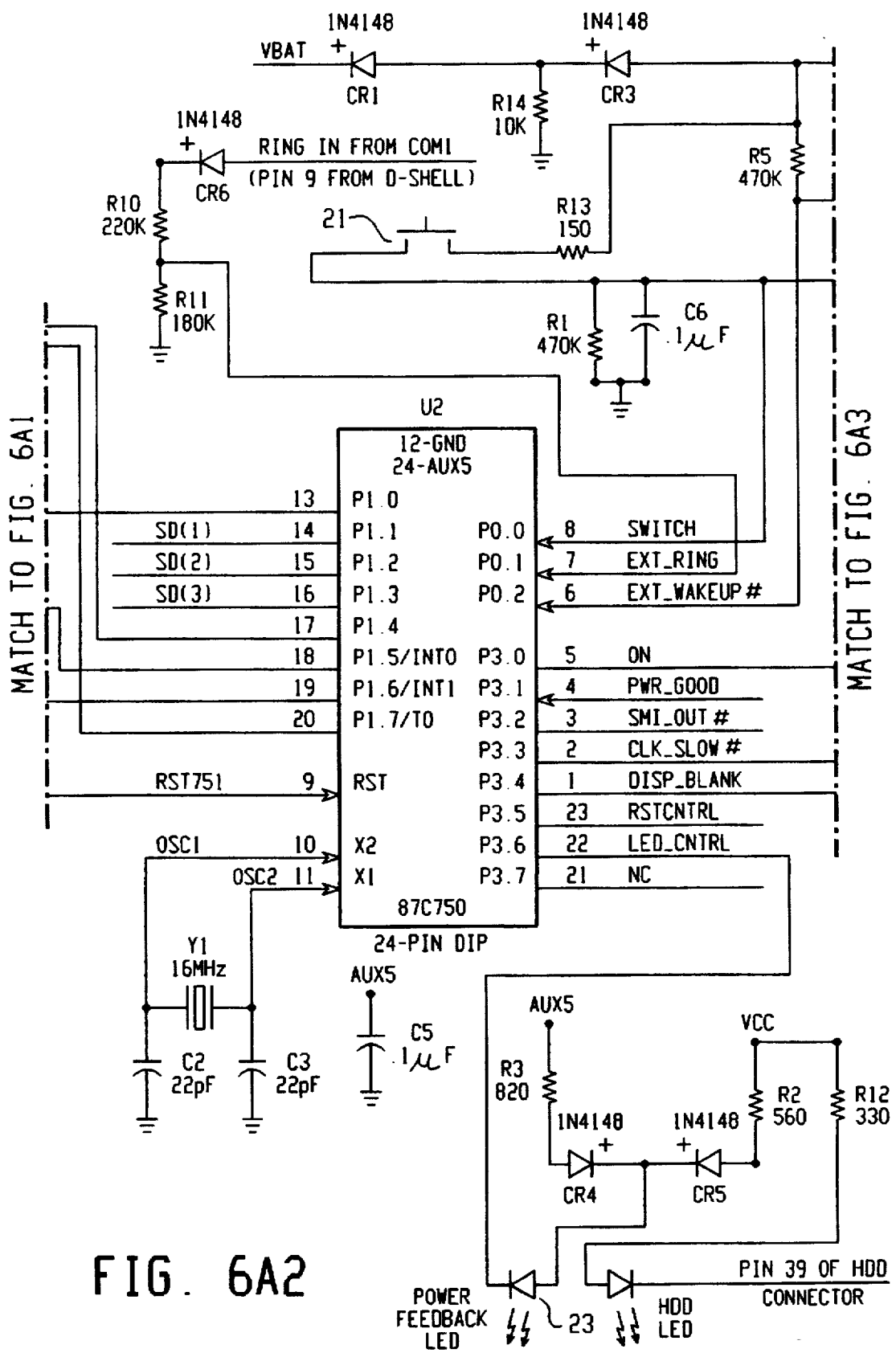
FIG. 6A2

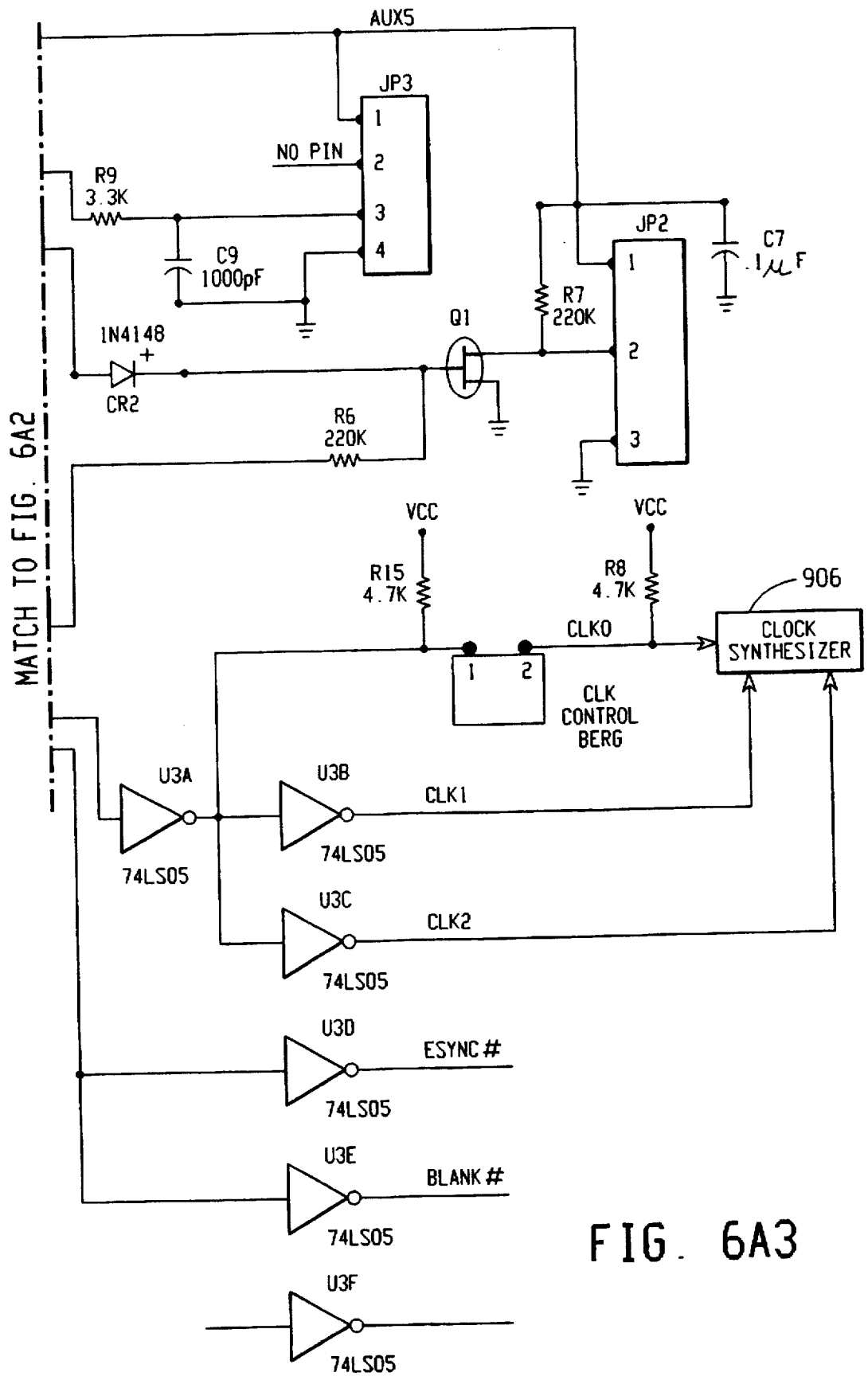
FIG. 6A3

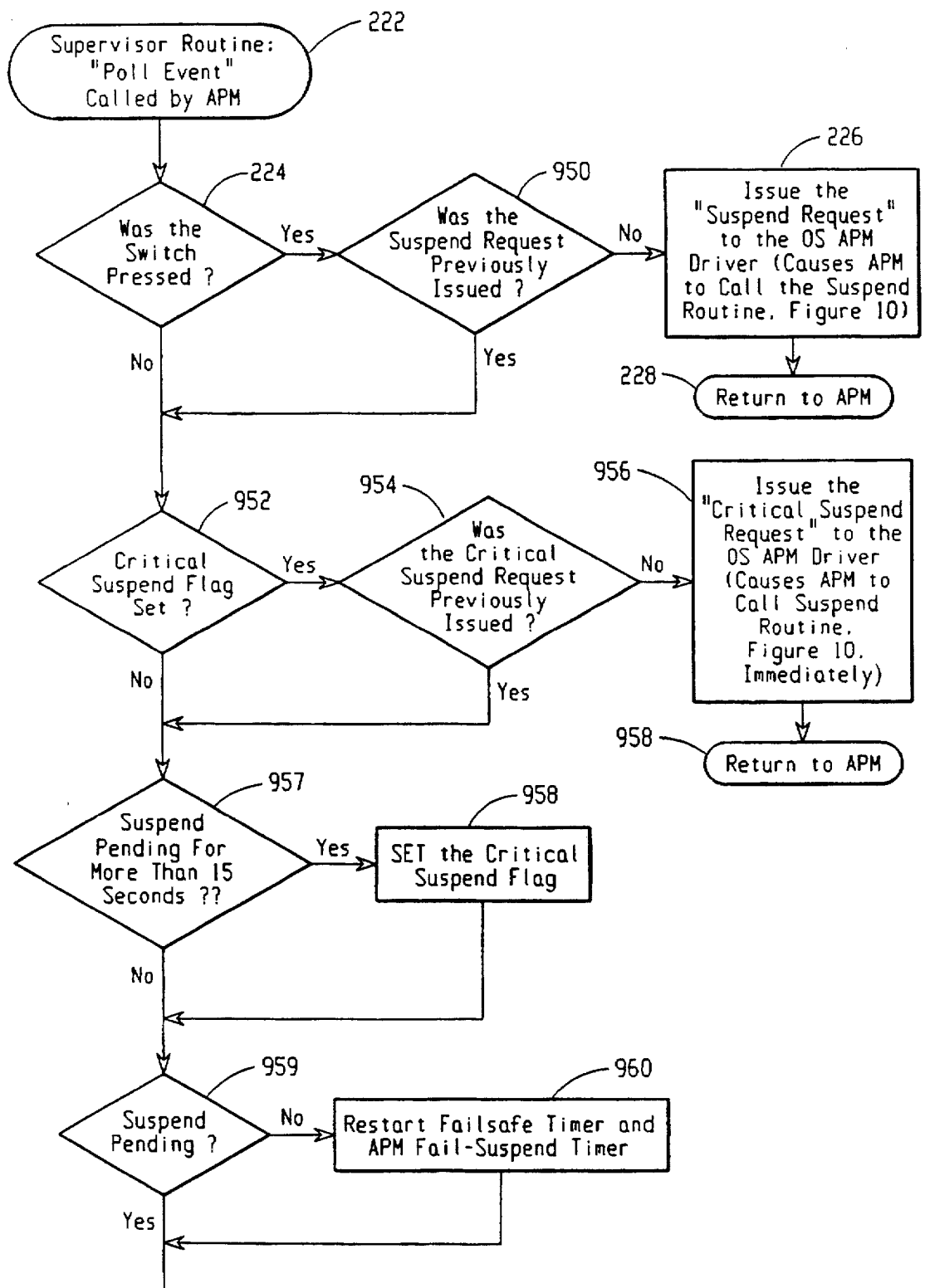
FIG. 9A1

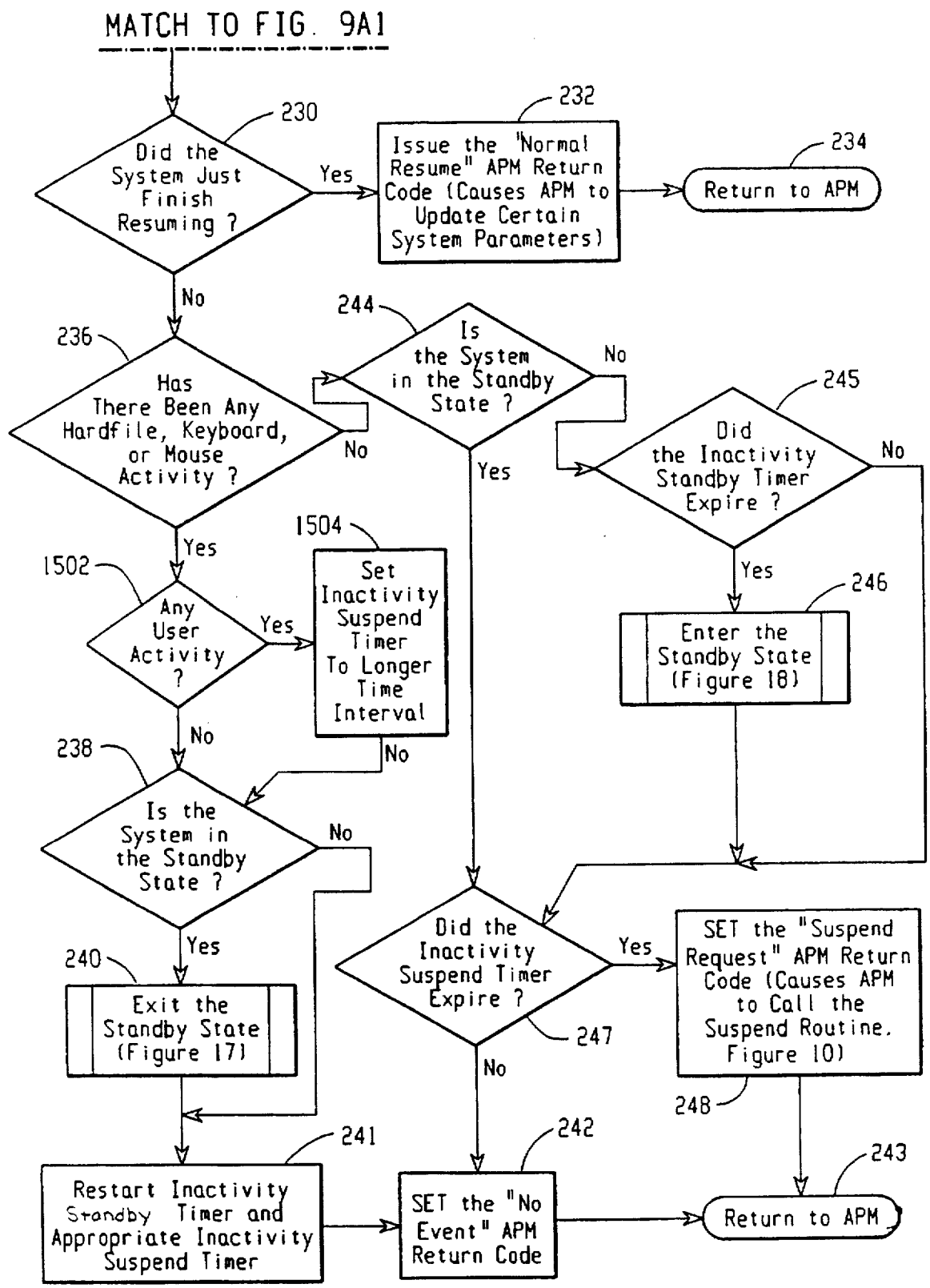
FIG. 9A2

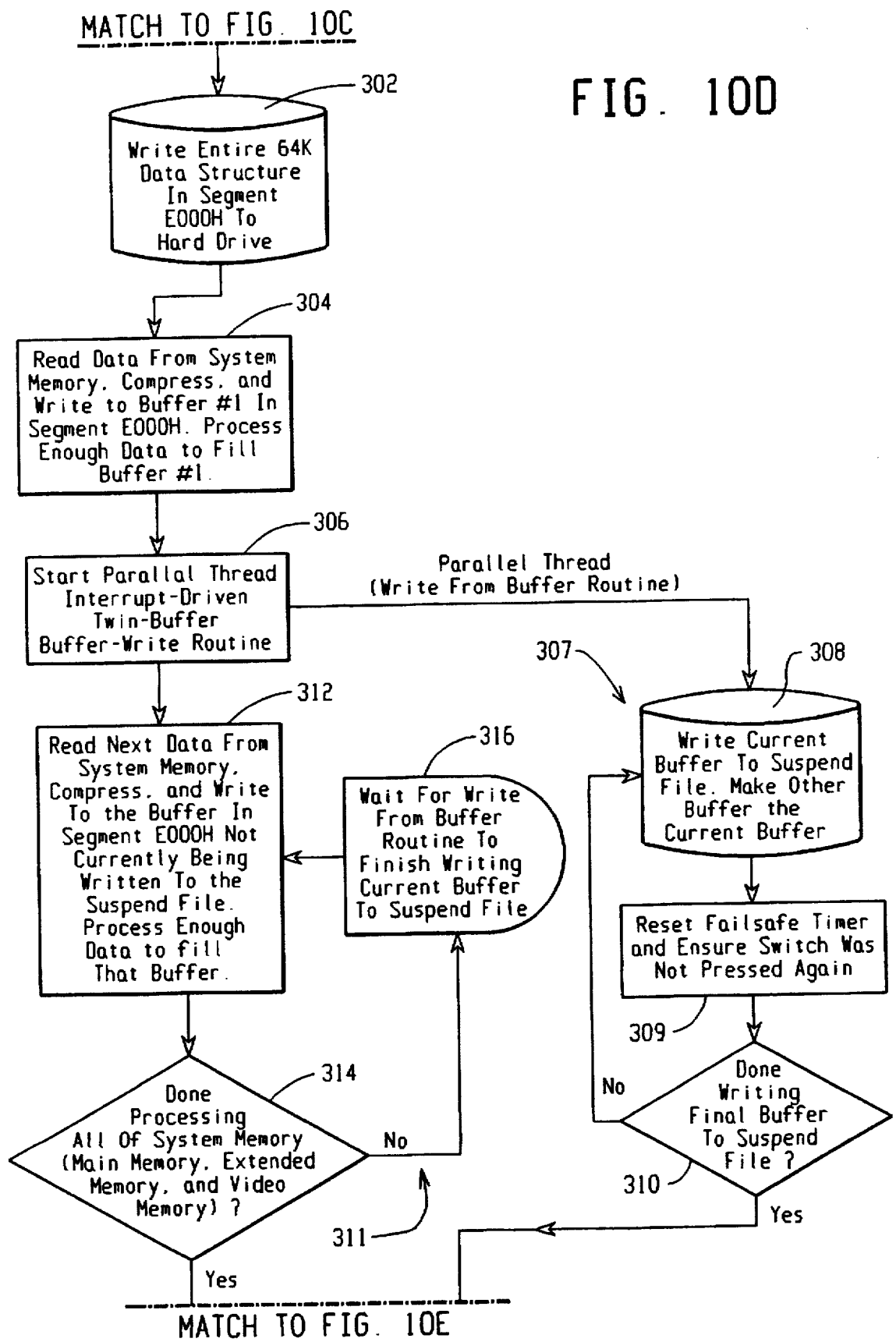

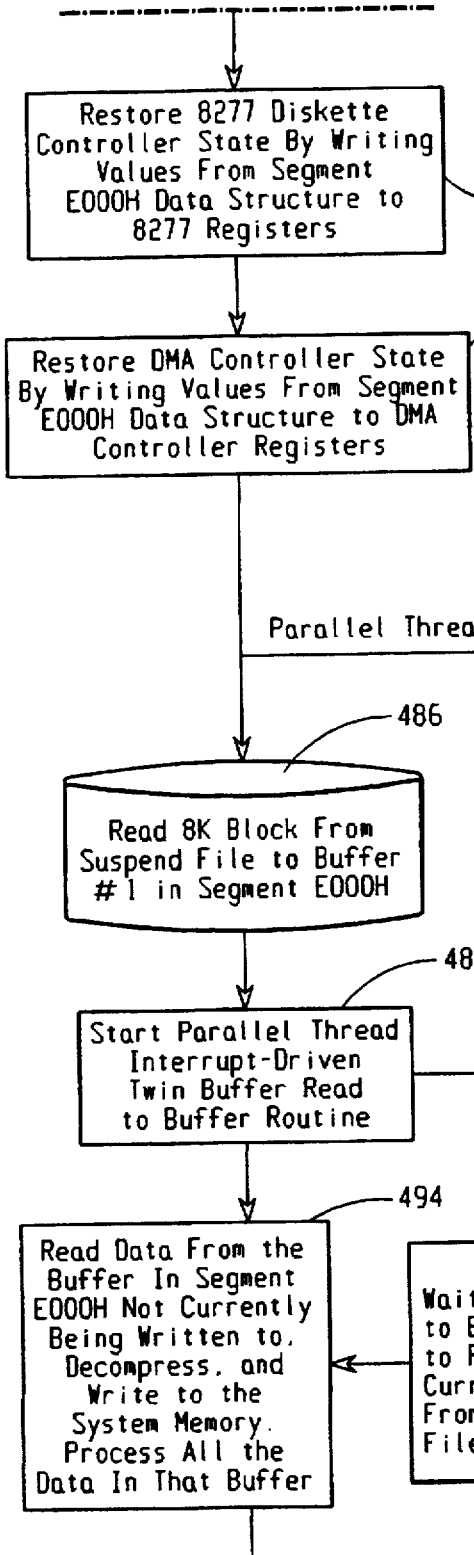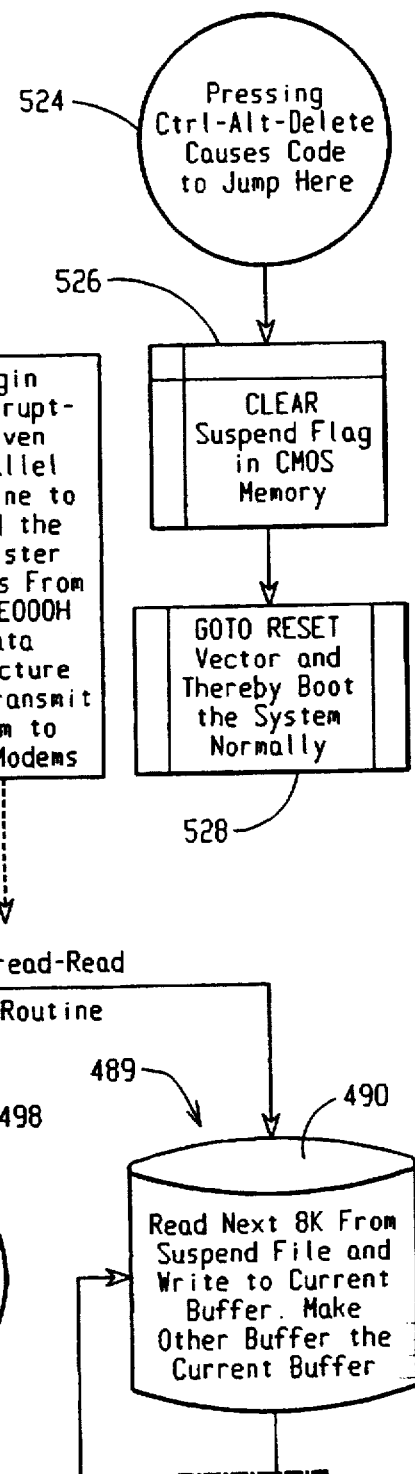
FIG. 12C

MATCH TO FIG. 15B

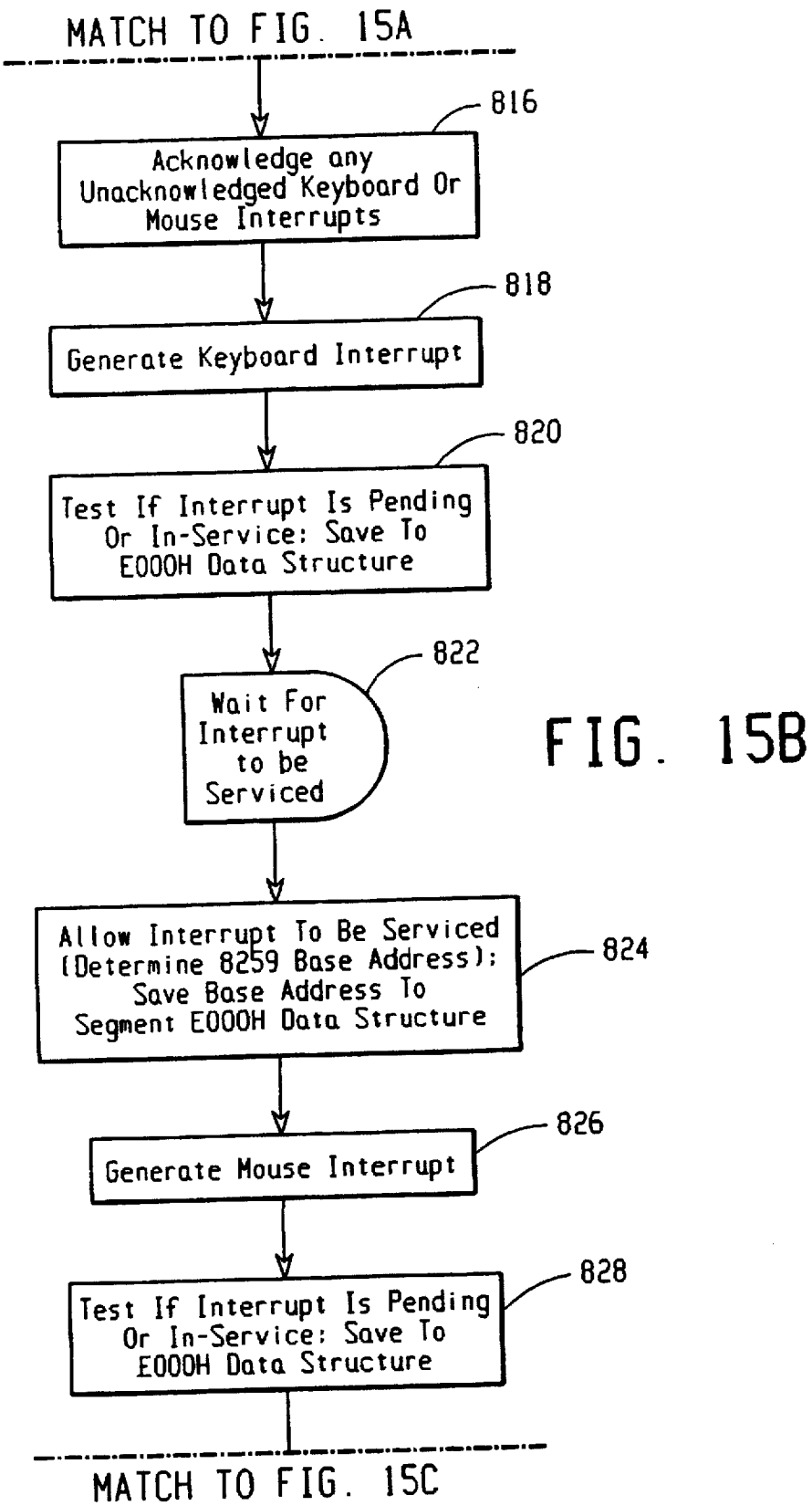

MATCH TO FIG. 19D

COMPUTER SYSTEM HAVING MULTI-LEVEL SUSPEND TIMERS TO SUSPEND FROM OPERATION IN ATTENDED AND UNATTENDED MODES

CROSS-REFERENCE TO RELATED APPLICATIONS

The present application is believed to be related to the following pending applications and issued patents:

application Ser. No. 08/097,334, filed Jul. 23, 1993, now U.S. Pat. No. 5,513,359, and entitled "DESKTOP COMPUTER HAVING A SINGLE-SWITCH SUSPEND/RESUME FUNCTION";

application Ser. No. 08/097,250, filed Jul. 26, 1993, now U.S. Pat. No. 5,511,202, and entitled "DESKTOP COMPUTER SYSTEM HAVING ZERO-VOLT SYSTEM SUSPEND AND CONTROL UNIT FOR ASCERTAINING INTERRUPT CONTROLLER BASE ADDRESS";

application Ser. No. 08/097,246, filed Jul. 23, 1993, now U.S. Pat. No. 5,497,494, and entitled "METHOD FOR SAVING AND RESTORING THE STATE OF A CPU EXECUTING CODE IN A PROTECTED MODE";

application Ser. No. 08/097,251, filed Jul. 26, 1993, now U.S. Pat. No. 5,548,763, and entitled "DESKTOP COMPUTER SYSTEM HAVING MULTI-LEVEL POWER MANAGEMENT";

application Ser. No. 08/303,102, filed Sep. 7, 1994, now U.S. Pat. No. 5,581,692, and entitled "AUTOMATIC CLEARING OF POWER SUPPLY FAULT CONDITION IN SUSPEND SYSTEM";

application Ser. No. 08/302,148, filed Sep. 7, 1994, and entitled "AUTOMATIC ALLOCATION OF SUSPEND FILE";

application Ser. No. 08/301,466, filed Sep. 7, 1994, now U.S. Pat. No. 5,530,879, and entitled "COMPUTER SYSTEM HAVING POWER MANAGEMENT PROCESSOR FOR SWITCHING POWER SUPPLY FROM ONE STATE TO ANOTHER RESPONSE TO A CLOSURE OF A SWITCH, A DETECTED RING OR AN EXPIRATION OF A TIMER";

application Ser. No. 08/302,147, filed Sep. 7, 1994, and entitled "MULTIFUNCTION POWER SWITCH AND FEEDBACK LED FOR SUSPEND SYSTEMS";

application Ser. No. 08/302,157, filed Sep. 7, 1994, and entitled "LOW POWER RING DETECT FOR COMPUTER SYSTEM WAKEUP";

application Ser. No. 08/301,464, filed Sep. 7, 1994, now U.S. Pat. No. 5,511,204, and entitled "PERFORMING SYSTEM TASKS AT POWER-OFF USING SYSTEM MANAGEMENT INTERRUPT";

application Ser. No. 08/302,066, filed Sep. 7, 1994, and entitled "AUTOMATIC RESTORATION OF USER OPTIONS AFTER POWER LOSS";

application Ser. No. 08/303,103, filed Sep. 7, 1994, now U.S. Pat. No. 5,551,043, and entitled "STANDBY CHECKPOINT TO PREVENT DATA LOSS";

application Ser. No. 08/301,943, filed Sep. 7, 1994, now U.S. Pat. No. 5,560,023, and entitled "AUTOMATIC BACKUP SYSTEM FOR ADVANCED POWER MANAGEMENT (APM)";

application Ser. No. 08/487,119, filed Jun. 7, 1995, and entitled "COMPUTER SYSTEM HAVING POWER SUPPLY PRIMARY SENSE TO FACILITATE PERFORMANCE OF TASKS AT POWER OFF";

application Ser. No. 08/473,097, filed Jun. 7, 1995, and entitled "COMPUTER SYSTEM HAVING SUSPEND ONCE RESUME MANY SESSIONS";

application Ser. No. 08/483,330, filed Jun. 7, 1995, and entitled "COMPUTER SYSTEM HAVING A PLURALITY OF STORED SYSTEM STATES FROM WHICH TO RESUME";

application Ser. No. 08/538,532, filed Oct. 3, 1995, now U.S. Pat. No. 5,577,220, entitled "METHOD FOR SAVING AND RESTORING THE STATE OF A CPU EXECUTING CODE IN PROTECTED MODE INCLUDING ESTIMATING THE VALUE OF THE PAGE TABLE BASE REGISTER";

application Ser. No. 08/472,207, filed Jun. 7, 1995, entitled "DESKTOP COMPUTER SYSTEM HAVING ZERO VOLT SYSTEM SUSPEND"; and application Ser. No. 08/457,768, filed Jun. 1, 1995, entitled "METHOD OF SAVING AND RESTORING THE STATE OF A CPU EXECUTING CODE IN A PROTECTED MODE."

FIELD OF THE INVENTION

The present invention relates generally to computer system architecture and, more specifically, to a desktop computer system having a system suspend/resume capability and multiple suspend timers executing such that the computer system suspends after a longer period of time of inactivity when the system is booted in an attended mode and suspends after a shorter period of time of inactivity when the system is booted in an unattended mode.

BACKGROUND OF THE INVENTION

Personal computer systems are well known in the art. Personal computer systems in general, and IBM Personal Computers in particular, have attained widespread use for providing computer power to many segments of today's modern society. Personal computers can typically be defined as a desktop, floor standing, or portable microcomputer that is comprised of a system unit having a single central processing unit (CPU) and associated volatile and nonvolatile memory, including all RAM and BIOS ROM, a system monitor, a keyboard, one or more flexible diskette drives, a fixed disk storage drive (also known as a "hard drive"), a so-called "mouse" pointing device, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/1 (IBM PS/1).

Personal computer systems are typically used to run software to perform such diverse activities as word processing, manipulation of data via spread-sheets, collection and relation of data in databases, displays of graphics, design of electrical or mechanical systems using system-design software, etc.

The first thirteen related applications disclose a computer system having four power management states: a normal operating state, a standby state, a suspend state, and an off state. One switch is used to change between the off state, the normal operating state, and the suspend state.

The normal operating state of the computer system of the present invention is virtually identical to the normal operating state of any typical desktop computer. Users may use applications and basically treat the computer as any other. One difference is the presence of a power management driver, which runs in the background (in the BIOS and the operating system), transparent to the user. The portion of the power management driver in the operating system (OS) is the Advanced Power Management (APM) advanced programming interface written by Intel and Microsoft, which is now present in most operating systems written to operate on Intel's 80X86 family of processors. The portion of the power management driver in BIOS (APM BIOS) communicates with the APM OS driver. The APM OS driver and the APM BIOS routines together control the computer's transition to and from the other three states.

The second state, the standby state, uses less power than the normal operating state, yet leaves any applications executing as they would otherwise execute. In general, power is conserved in the standby state by placing devices in their respective low-power modes. For example, power is conserved in the standby state by ceasing the revolutions of the fixed disk within the hard drive and by ceasing generating the video signal.

The third state is the suspend state. In the suspend state, computer system consumes an extremely small amount of power. The suspended computer consumes very little power from the wall outlet. The only power consumed is small amount of power to maintain the circuitry that monitors the switch from a battery inside the computer system (when the system is not receiving AC power) or a small amount of power generated at an auxiliary power line by the power supply (when the system is receiving AC power).

This small use of power is accomplished by saving the state of the computer system to the fixed disk storage device (the hard drive) before the power supply is turned "off". To enter the suspend state, the computer system interrupts any executing code and transfers control of the computer to the power management driver. The power management driver ascertains the state of the computer system and writes the state of the computer system to the fixed disk storage device. The state of the CPU registers, the CPU cache, the system memory, the system cache, the video registers, the video memory, and the other devices' registers are all written to the fixed disk. The entire state of the system is saved in such a way that it can be restored without the code applications being adversely affected by the interruption. The computer then writes data to the non-volatile CMOS memory indicating that the system was suspended. Lastly, the computer causes the power supply to stop producing power. The entire state of the computer is safely saved to the fixed disk storage device, system power is now "off", and computer is now only receiving a small amount of regulated power from the power supply to power the circuitry that monitors the switch.

The fourth and final state is the off state. In this state, the power supply ceases providing regulated power to the computer system, but the state of the computer system has not been saved to the fixed disk. The off state is virtually identical to typical desktop computers being turned off in the usual manner.

Switching from state to state is handled by the power management driver and is typically based on closure events of a single switch, a flag, and two timers: the inactivity standby timer and the inactivity suspend timer. The system has a single power button. This button can be used to turn on the computer system, suspend the state of the system, restore the state of the system, and turn off the system.

In such a system, the transition from the normal operating state to the suspend state can occur as a result of inactivity by the user as measured by a inactivity suspend timer. Thus, is the user leaves the system unattended for a predetermined period of time, e.g., 30 minutes, the system will suspend to save energy. However, in the system described in the related applications, the computer system can be awakened in an unattended mode by, e.g., a ring of an attached telephone line for the system to receive a facsimile transmission or by an internal alarm to perform a specific activity at a specific time. One drawback with this suspend/resume system is that when the system is resumed in unattended mode, the system must wait this predetermined period of time for the system to automatically suspend. Since the system was awakened in an unattended mode, there will typically not be any user activity at all, so waiting the period of time normally associated with the machine being used in attended mode is a waste of energy.

SUMMARY OF THE INVENTION

According to the present invention, an inactivity suspend timer with two intervals is provided. The system will suspend automatically if there is no user activity for the applicable interval. On the one hand, if the system is awakened by the user, the normal longer time interval (e.g., 30 minutes) will be used to determine when the system will be automatically suspended. On the other hand, if the system is awakened in unattended mode, the shorter time interval (e.g., 2 minutes) will be used to determine when the system will be automatically suspended.

Of course, the system might be awakened in an unattended mode and thereafter, the user approaches and uses the system. In such a situation, it would be improper to continue to use the much shorter interval for the inactivity suspend timer. Thus, optionally, the interval can be changed from the shorter interval to the longer interval if user activity is detected.

In the alternative to a single inactivity suspend timer with two possible time intervals, two inactivity suspend timers can be used, one with a shorter interval of time, such that the same effect described above is achieved.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

FIG. 4 is a state diagram of the computer system of the present invention, showing the four system states: normal, standby, suspend, and off;

FIG. 6A is an electrical schematic diagram of the power management circuitry of the present invention, showing the various interfaces to other Figures;

FIG. 9A is a flow chart showing the details of the Supervisor Routine, which is called by the APM device driver in the operating system approximately every second;

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. The present invention deals with the complete design of a computer system, including, but not limited to computer architecture design, digital design, BIOS design, protected mode 80486 code design, application code design, operating system code design, and Advanced Power Management advanced programming interface usage. This application is written for those very familiar with all aspects of computer system design.

Figure 1:
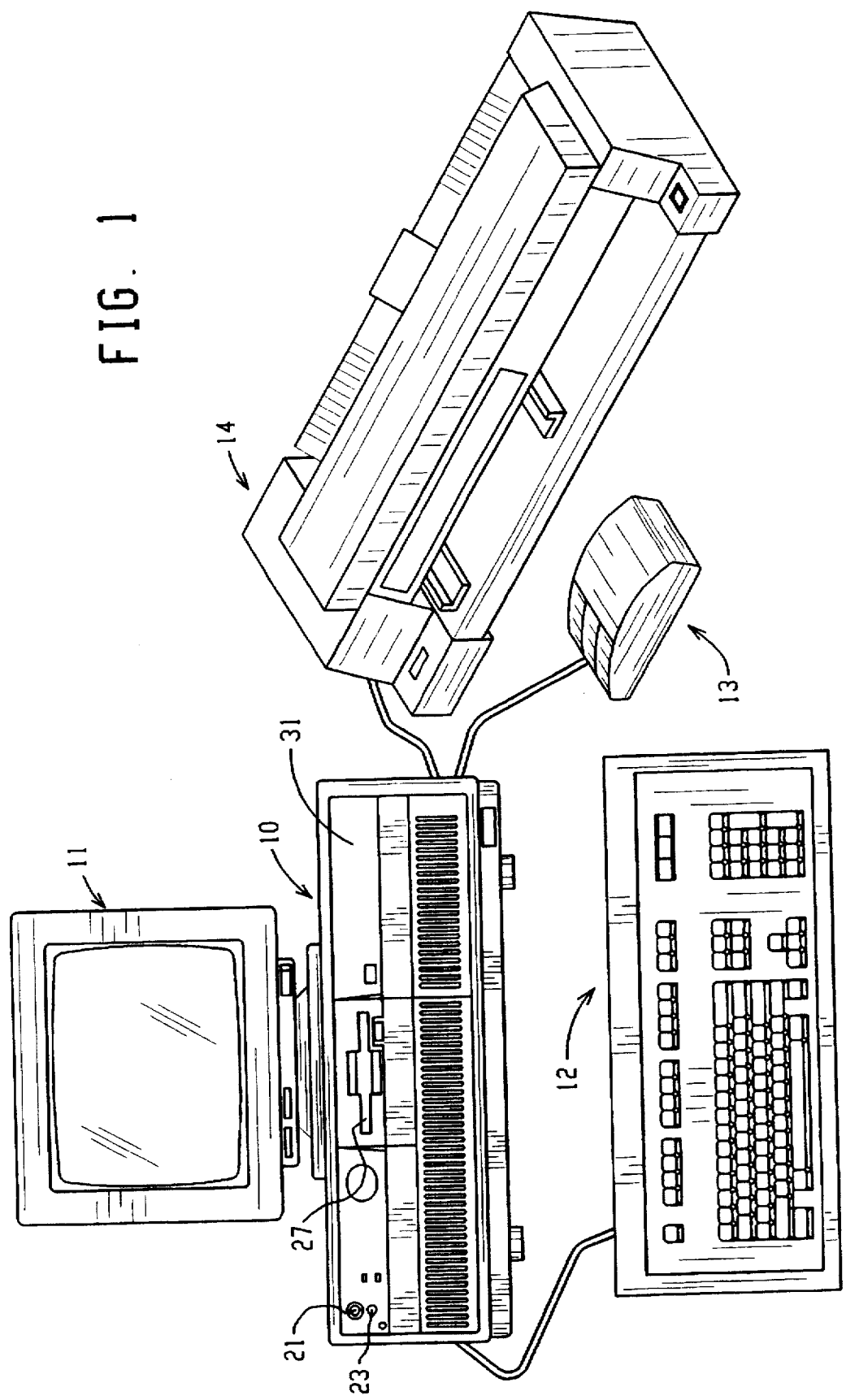
FIG. 1 is a perspective view of a personal computer embodying this invention.

Referring now more particularly to the accompanying drawings, a microcomputer system embodying the present invention is there shown and generally indicated at 10 (FIG. 1). As mentioned hereinabove, the computer 10 may have an associated display monitor 11, keyboard 12, mouse 13, and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory adapter cards or boards, and the like. As pointed out more fully hereinafter, provisions are made in the planar 20 for the passage of input/output signals to and from the operating components of the microcomputer.

Figure 2:
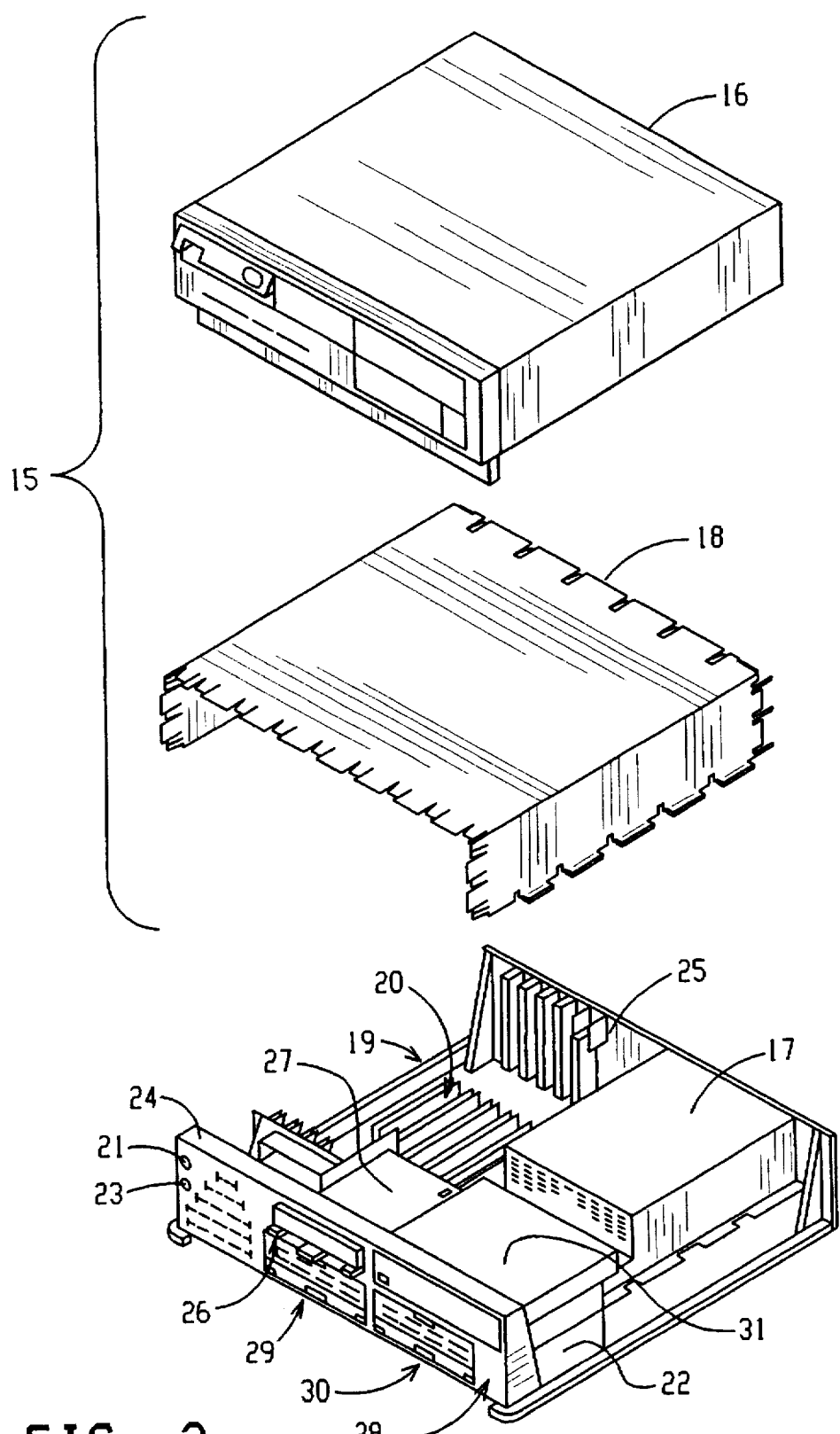
FIG. 2 is an exploded perspective view of certain elements of the personal computer of FIG. 1 including a chassis, a cover, an electromechanical direct access storage device and a planar board and illustrating certain relationships among those elements.

The computer system has a power supply 17, a power button 21, also hereinafter the switch 21, and a power/feedback LED 23. Unlike in the usual power switch in a typical system, the power button 21 does not switch AC line power to and from the power supply 17, as will be explained below. The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other 28 is adapted to receive drives of a selected one of two sizes (such as 3.5 and 5.25 inch) and the lower bays are adapted to receive devices of only one size (3.5 inch). One floppy disk drive is indicated at 27 in FIG. 1, and is a removable medium direct access storage device capable of receiving a diskette inserted thereinto and using the diskette to receive, store and deliver data as is generally known. One hard disk drive is indicated at 31 and is a fixed medium direct access storage device capable of storing and delivering data as is generally known.

Figure 3A:
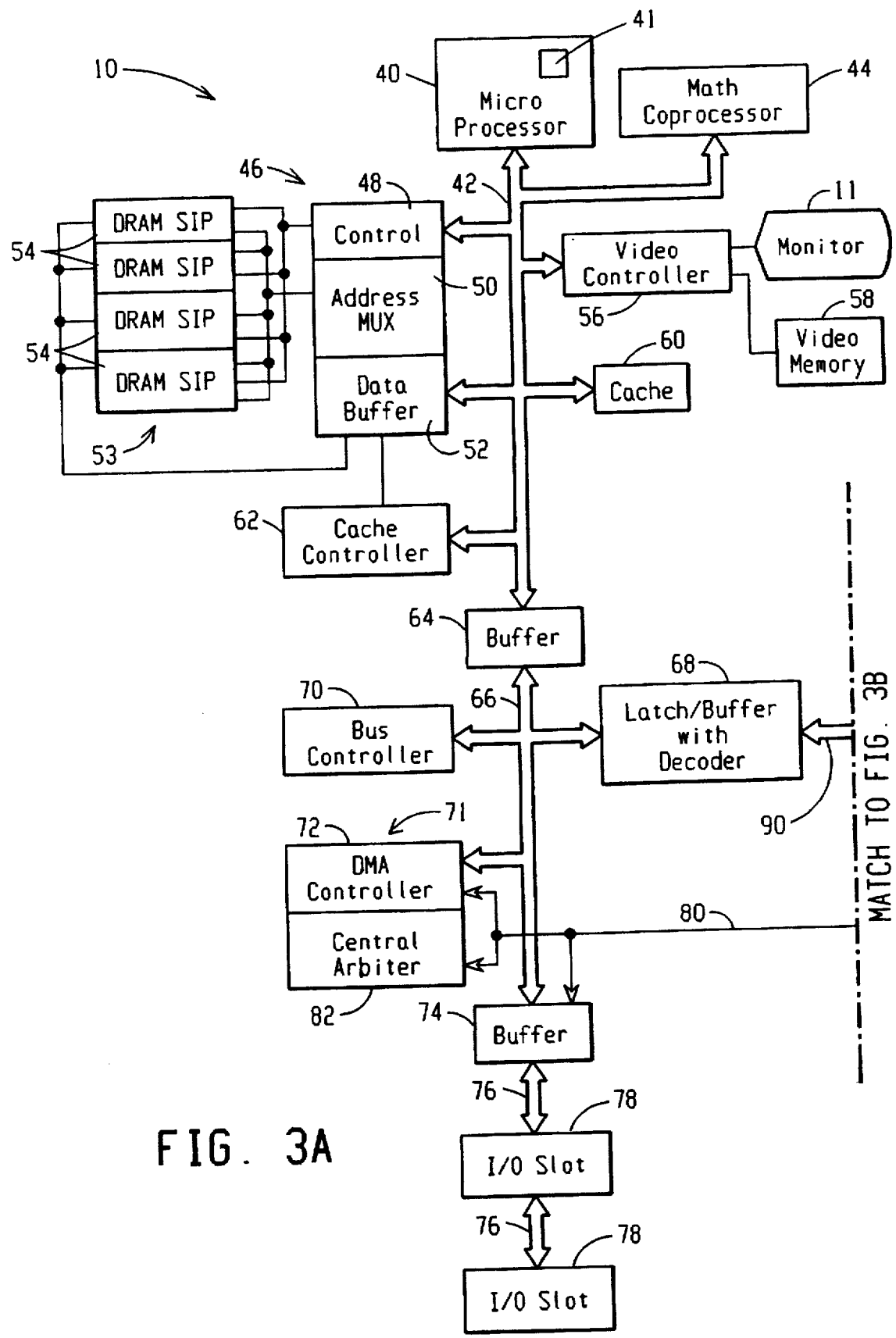
FIGS. 3A and 3B show a block diagram of certain components of the personal computer of FIGS. 1 and 2.
Figure 3B:
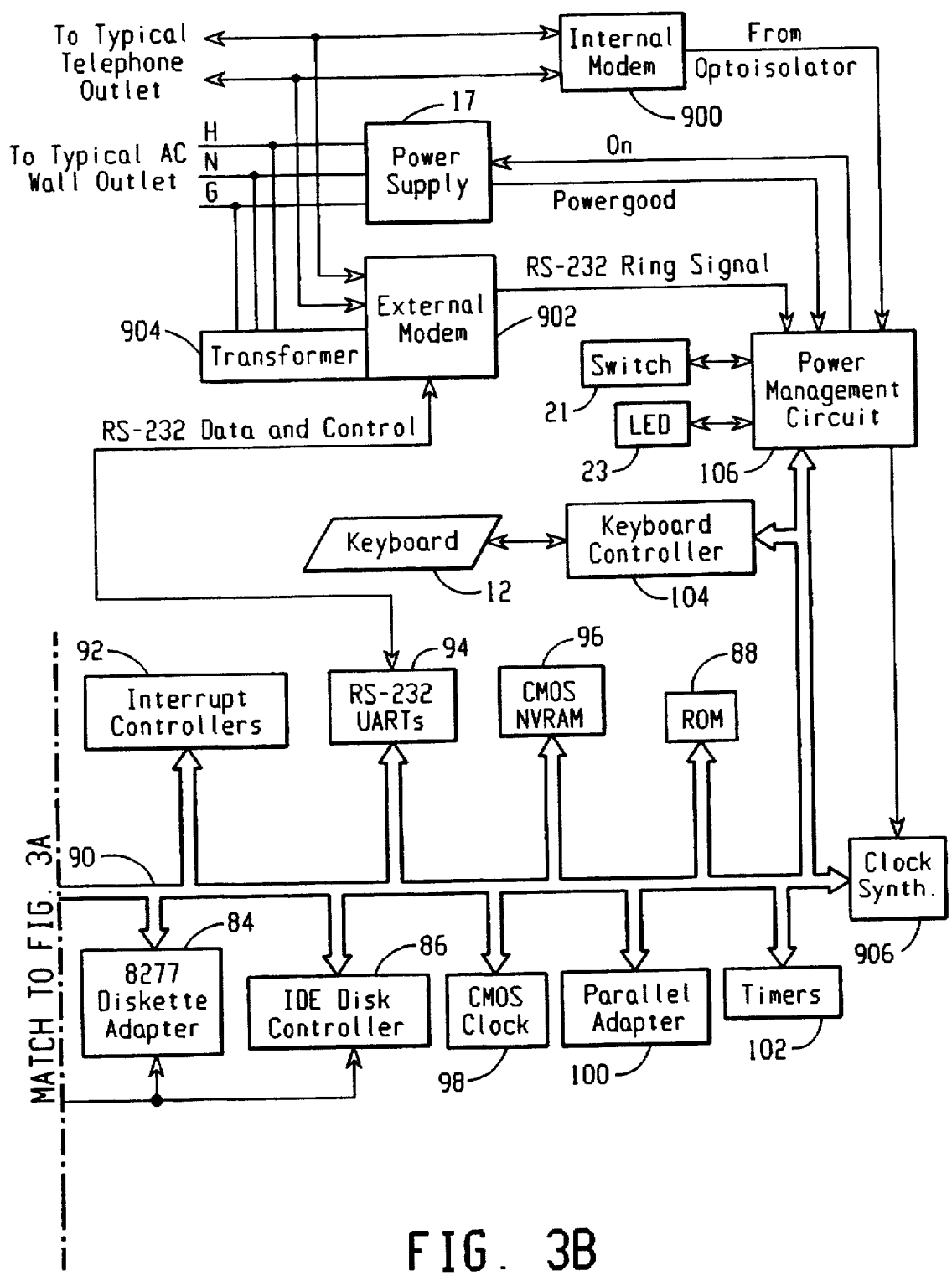

Prior to relating the above structure to the present invention, a summary of the operation in general of the personal computer system 10 may merit review. Referring to FIGS. 3A and 3B, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 40, also herein CPU 40, comprised of a microprocessor, which is connected by a high speed CPU local bus 42 through a memory control unit 46, which is further connected to a volatile random access memory (RAM) 53. The memory control unit 46 is comprised of a memory controller 48, an address multiplexer 50, and a data buffer 52. The memory control unit 46 is further connected to a random access memory 53 as represented by the four RAM modules 54. The memory controller 48 includes the logic for mapping addresses to and from the microprocessor 40 to particular areas of RAM 53. This logic is used to reclaim RAM previously occupied by BIOS. Further generated by memory controller 48 is a ROM select signal (ROMSEL), that is used to enable or disable ROM 88. While any appropriate microprocessor can be used for system processor 40, one suitable microprocessor is the 80486 which is sold by INTEL. The Intel 80486 has an internal cache, therefore, any CPU 40 that is an Intel 80486 will have a CPU cache 41.

While the present invention is described hereinafter with particular reference to the system block diagram of FIGS. 3A and 3B, it is to be understood at the outset of the description which follows that it is contemplated that the apparatus and methods in accordance with the present invention may be used with other hardware configurations of the planar board. For example, the system processor 40 could be an Intel 80286 or 80386 microprocessor. As used herein, reference to an 80286 or 80386 or 80486 generally intends such a microprocessor as obtained from Intel. However, in recent times other manufacturers have developed microprocessors which are capable of executing the instruction set of the Intel X86 architecture, and usage of the terms stated is intended to encompass any microprocessor capable of executing that instruction set. As known to persons skilled in the applicable arts, early personal computers typically used the then popular Intel 8088 or 8086 microprocessor as the system processor. These processors have the ability to address one megabyte of memory. More recently, personal computers typically use the high speed Intel 80286, 80386, and 80486 microprocessors which can operate in a virtual or real mode to emulate the slower speed 8086 microprocessor or a protected mode which extends the addressing range from 1 megabyte to 4 Gigabytes for some models. In essence, the real mode feature of the 80286, 80386, and 80486 processors provide hardware compatibility with software written the 8086 and 8088 microprocessors. Processors in the Intel family described are frequently identified by a three digit reference to only the last three digits of the full type designator, as "486".

Returning now to FIGS. 3A and 3B, the CPU local bus 42 (comprising data, address and control components, not shown) provides for the connection of the microprocessor 40, a math coprocessor 44 (if not internal to the CPU 40), a video controller 56, a system cache memory 60, and a cache controller 62. The video controller 56 has associated with it a monitor (or video display terminal) 11 and a video memory 58. Also coupled on the CPU local bus 42 is a buffer 64. The buffer 64 is itself connected to a slower speed (compared to the CPU local bus 42) system bus 66, also comprising address, data and control components. The system bus 66 extends between the buffer 64 and a further buffer 68. The system bus 66 is further connected to a bus control and timing unit 70 and a DMA unit 71. The DMA unit 71 is comprised of a central arbiter 82 and a DMA controller 72. An additional buffer 74 provides an interface between the system bus 66 and an optional feature bus such as the Industry Standard Architecture (ISA) bus 76. Connected to the bus 76 are a plurality of I/O slots 78 for receiving ISA adapter cards (not shown). ISA adapter cards are pluggably connected to the I/O slots 78 and may provide additional I/O devices or memory for the system 10.

An arbitration control bus 80 couples the DMA controller 72 and central arbiter 82 to the I/O slots 78, a diskette adapter 84, and an Integrated Drive Electronics (IDE) fixed disk controller 86.

While the microcomputer system 10 is shown with a basic 4 megabyte RAM module 53, it is understood that additional memory can be interconnected as represented in FIGS. 3A and 3B by the addition of optional higher-density memory modules 54. For purposes of illustration only, the present invention is described with reference to the basic four megabyte memory module.

Figure 6B:
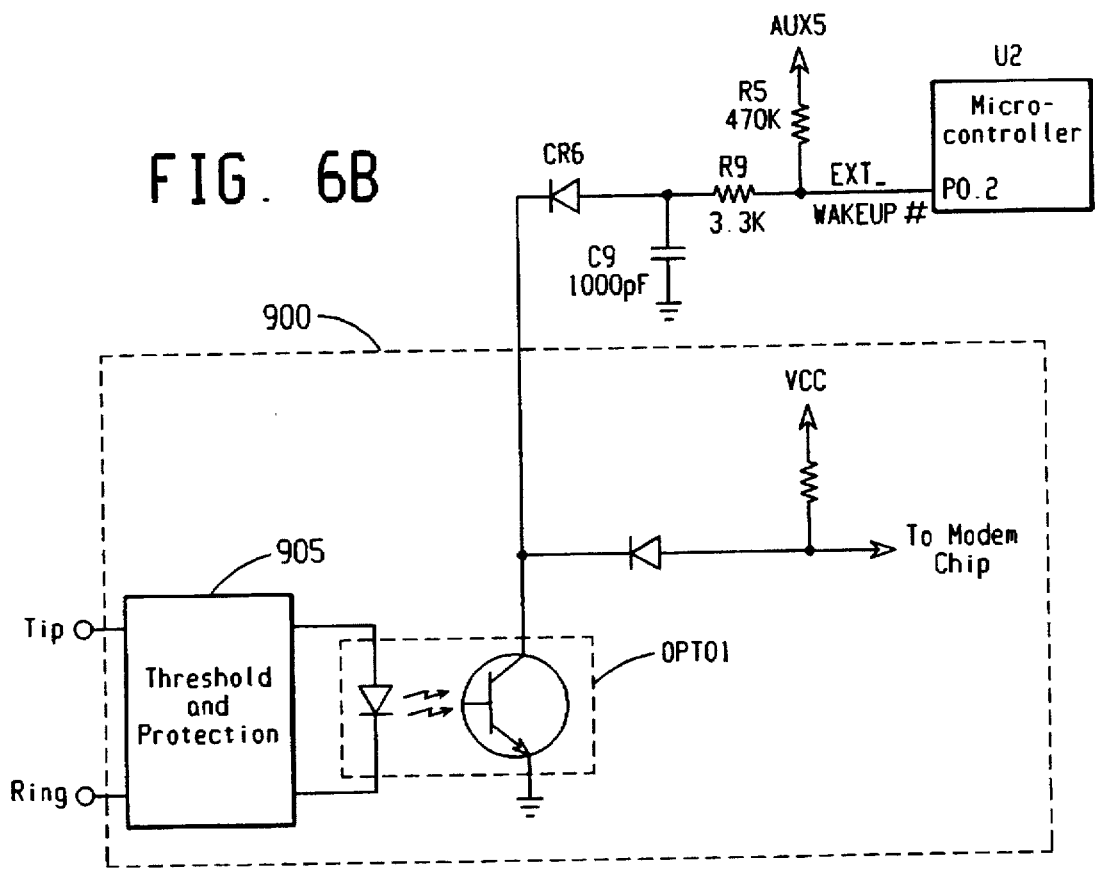
FIG. 6B is an electrical schematic diagram of the connection of the power management circuitry to the internal modem.

A latch buffer 68 is coupled between the system bus 66 and a planar I/O bus 90. The planar I/O bus 90 includes address, data, and control components respectively. Coupled along the planar I/O bus 90 are a variety of I/O adapters and other components such as the diskette adapter 84, the IDE disk adapter 86, an interrupt controller 92, an RS-232 adapter 94, nonvolatile CMOS RAM 96, also herein referred to as NVRAM, a CMOS real-time clock (RTC) 98, a parallel adapter 100, a plurality of timers 102, the read only memory (ROM) 88, the 8042 104, and the power management circuitry 106. The 8042, shown at 104, is the slave microprocessor that interfaces with the keyboard 12 and the mouse 13. The power management circuitry 106 is in circuit communication with the power supply 17, the power switch 21, the power/feedback LED 23, and an internal modem 900 and/or an external modem 902. The external modem is typically connected to a transformer 904, which is connected to a typical wall outlet, as is known to those skilled in the art. The modems 900, 902 are connected to a typical telephone outlet. The power management circuitry 106 is shown in FIG. 6A and 6B and is more fully described in the text accompanying FIGS. 6A, 6B, 6C, and 7. The read only memory 88 includes the BIOS that is used to interface between the I/O devices and the operating system of the microprocessor 40. BIOS stored in ROM 88 can be copied into RAM 53 to decrease the execution time of BIOS. ROM 88 is further responsive (via ROMSEL signal) to memory controller 48. If ROM 88 is enabled by memory controller 48, BIOS is executed out of ROM. If ROM 88 is disabled by memory controller 48, ROM is not responsive to address inquiries from the microprocessor 40 (i.e. BIOS is executed out of RAM).

The real-time clock 98 is used for time of day calculations and the NVRAM 96 is used to store system configuration data. That is, the NVRAM 96 will contain values which describe the present configuration of the system. For example, NVRAM 96 contains information describing the capacity of a fixed disk or diskette, the type of display, the amount of memory, time, date, etc. Furthermore, these data are stored in NVRAM whenever a special configuration program, such as SET Configuration, is executed. The purpose of the SET Configuration program is to store values characterizing the configuration of the system to NVRAM.

Nearly all of the above devices comprise volatile registers. To prevent the unnecessary cluttering of the drawings, the registers of a particular device will be referenced to that device. For example, the CPU registers will be referred to as the CPU 40 registers and the video controller registers will be referenced as the video controller 56 registers.

As mentioned hereinabove, the computer has a cover indicated generally at 15 which cooperates with the chassis 19 in forming an enclosed, shielded volume for containing the above identified components of the microcomputer. The cover 15 preferably is formed with an outer decorative cover member 16 which is a unitary molded component made of a moldable synthetic material and a metallic thin sheet liner 18 formed to conform to the configuration of the decorative cover member. However, the cover can be made in other known ways and the utility of this invention is not limited to enclosures of the type described.

States of Operation

Referring now to FIG. 4, a state diagram of the computer system of the present invention is shown. The computer system 10 of the present invention has four states: a normal operating state 150, a standby state 152, a suspend state 154, and an off state 156. The transitions between the states shown in FIG. 4 are meant to be descriptive of the preferred embodiment, but not limiting. Consequently, additional events may alternatively be used to cause state transitions.

The normal operating state 150 of the computer system 10 of the present invention is virtually identical to the normal operating state of any typical desktop computer. Users may use applications and basically treat the computer as any other. One difference, transparent to the user, is the presence of a power management driver in the operating system (the "APM OS driver"), which runs in the background, and various APM BIOS routines. The APM BIOS routines are discussed in the text below and include the Suspend Routine, the Resume Routine, the Boot-Up Routine, the Supervisor Routine, the Save CPU State Routine, and the Restore CPU State Routine. One APM BIOS routine not shown on any of the Figures is the APM BIOS Routing Routine. The APM BIOS Routing Routine essentially accepts commands from the APM OS driver and calls the appropriate APM BIOS routine. For example, when the APM OS driver issues the Suspend Command, the APM BIOS Routing Routine calls the Suspend Routine. As another example, whenever the APM OS driver issues the Get Event command, the APM BIOS Routing Routine calls the Supervisor Routine. These routines are located in BIOS and are shadowed when the BIOS is shadowed. The power management driver in the OS and the APM BIOS routines control the computer's transition between the four states. A reference to the word "APM" by itself generally is a reference to the APM OS driver, although the context may dictate otherwise.

The second state, the standby state 152, uses less electrical power than the normal operating state 150, yet leaves any applications executing as they would otherwise execute. In general power is saved in the standby state 152 by the code placing devices into respective low power modes. In the preferred embodiment, electrical power is conserved in the standby state 152 by ceasing the revolutions of the fixed disk (not shown) within the fixed disk storage device 31, by ceasing generating the video signal, and by putting the CPU 40 in a low power mode, as will be more fully explained below. However, this is not intended to be limiting and other methods may be used to reduce power consumption, such as slowing or stopping the CPU clock.

In the preferred embodiment, electrical power is conserved in three separate ways. First, in the normal operating state 150, the fixed disk within the fixed disk storage device 31 is constantly spinning at, e.c., 3600, 4500, or 5400 revolutions per minute (RPM). In the standby state 152, the IDE disk controller 86 is given the command to cause the fixed disk storage device 31 to enter a low-power mode (the fixed disk inside the fixed disk storage device 31 ceases spinning), thereby conserving the power the motor (not shown) inside the fixed disk storage device 31 typically consumes while spinning the fixed disk.

Second, in the normal operating state 150, the video controller 56 of the computer system constantly generates a video signal (HSYNC, VSYNC, R, G, B, etc. as is well known in the art) corresponding to the image seen on the video display terminal 11. In the standby state 152 the video controller 56 ceases generating the video signal, thereby conserving the electrical power normally consumed by the video controller 56; HSYNC, VSYNC, R, G, and B are all driven to approximately 0.00 VDC. Using a VESA (Video Electronics Standards Association) compliant monitor allows further power savings because VESA compliant monitors turn themselves off when HSYNC and VSYNC are at approximately 0.00 VDC.

Third, in the normal operating state 150, the CPU 40 constantly executes commands, thereby consuming electrical power. In the standby state 152 the BIOS issues a HALT instruction in response to the APM CPU Idle Call. Executing a HALT instruction significantly reduces CPU power consumption until the next hardware interrupt occurs. When truly idle, the CPU can remain halted more than 90% of the time.

Note that some systems have "screen-savers," which cause the screen 11 to become dark to prevent phosphor burn-in of the front surface of the video display terminal. In most of such systems, the video controller 56 is still generating a video signal; it is merely generating a video signal corresponding to a dark screen or a dynamic display. Thus, a computer system executing a screen-saver still consumes the electrical power necessary to generate the video signal.

The third state is the suspend state 154. In the suspend state 154, computer system consumes an extremely small amount of electrical power. The suspended computer consumes less than 100 milliwatts of electrical power in the preferred embodiment. The only power consumed approximately 5 watts consumed due to inefficiencies in the power supply 17 and a small amount of power used by the power management circuitry 106.

This small use of electrical power is accomplished by saving the state of the computer system to the fixed disk storage device (the hard drive) 31 prior to turning the power supply "off." To enter the suspend state 154, the CPU 40 interrupts any applications and transfers program execution control of the CPU to the power management driver. The power management driver ascertains the state of the computer system 10 and writes the entire state of the computer system to the fixed disk storage device 31. The state of the CPU 40 registers, the CPU cache 41, the system RAM 53, the system cache 60, the video controller 56 registers, the video memory 56, and the remaining volatile registers are all written to the fixed disk drive 31. The entire state of the system 10 is saved in such a way that it can be restored without significant usability penalties. That is, the user need not wait for the system to load the operating system, and load the graphical user interface, and application programs as it normally would.

The computer then writes data to the non-volatile CMOS memory 96 indicating that the system was suspended. Lastly, the CPU 40 commands the microcontroller U2 to cause the power supply 17 to stop providing regulated power to the system through the ±5 VDC and ±12 VDC lines. The computer system 10 is now powered down with the entire state of the computer safely saved to the fixed disk storage device 31.

The word "state" is used throughout this document in two similar, but possibly confusing ways. Devices can be "in" a particular state. The four system states—normal 150, standby 152, suspend 154, and off 156—refer to the general state of the computer system 10 of the present invention. These "states" describe the computer system 10 in a general way. For example, while in the normal operating state 150, the CPU 40 is still executing code and changing a plurality of registers within the system 10. Likewise, similar activity occurs while in the standby state 152. Thus, the memory and register configuration of the computer system 10 is dynamic while the system 10 is in the normal operating state 150 and the standby state 152.

Other devices can also be "in" certain states. The power management circuitry 106 preferably uses a second processor as a power management processor, such as a microcontroller U2 shown in FIG. 6A, to implement the various power management features. Many such processors are suitable; in this particular embodiment, the power management processor is a preprogrammed 83C750 microcontroller. The variables and pins of the microcontroller U2 can be in several states, as will be explained in the text accompanying FIG. 6A.

Contrast the above with the "state of" a device, for example, the "state of the computer system 10" or the "state of the CPU 40." The "state of" a device refers to the condition of that device at a particular computer cycle. All memory locations and registers will have particular binary values. The "state of" a device is a static binary snapshot of the contents of that device.

The "state of" the computer system 10 refers to operational equivalents and not necessarily exact copies. For example, a computer system in a state A may have certain memory in either CPU cache 41 or system cache 60. It is possible to "flush" the contents of either cache back to the system RAM 53, putting the computer system in a state B. Purely speaking, the state of the computer system in state A is different from the state of the computer system in state B, because the contents of cache and system RAM are different. However, from a software operational perspective, state A and state B are the same, because, aside from a slight decrease in system speed (caused by the program not having the benefit of executing out of cache), the executing programs are not affected. That is, a computer in state A and a computer in state B are software operationally equivalent, even though the computer whose cache was flushed will experience a slight decrease in performance until the cache areas are reloaded with helpful code.

As stated herein, the present invention contemplates multiple stored computer states being alternatively loaded into the computer system. The terms "stored computer state" and "system state" as used herein are to be distinguished from merely executable code stored in an executable file or an overlay to an executable file. These terms are also to be distinguished from pages or other chunks of code stored in a virtual memory scheme. The terms "stored computer state" and "system state" contemplate storing the values from volatile memory and from volatile registers in an executing computer system to another location, such as nonvolatile memory. However, reversibly altering a system state or a computer state by, e.g., compression, still results in a "stored computer state" or "system state." An example of creating a "stored computer state" and a "system state" is shown in FIG. 10, the Suspend Routine.

The word "power" is also used in two similar, but possibly confusing ways. "Power" most often refers to electrical power. However, "power" also refers to computational power occasionally. The context should make the intended usage obvious.

A "circuit" is generally a reference to a physical electronic device or a plurality of devices electrically interconnected. However, the term "circuit" also is intended to encompass CPU code equivalents of physical electronic devices. For example, on the one hand, a two-input NAND gate can be implemented via a 74LS00 or, equivalently, in a programmable device. These two devices are physical electronic devices. On the other hand a NAND gate can also be implemented by having the CPU 40 read two inputs from two CPU-readable input ports, generate the NAND result using a CPU command, and output the result via a CPU-writable output port. These CPU-interfacable ports can be simple, such as decoded latches, or their programmable device equivalent, or complex, such as PIAs, which are well-known in the art. The term "circuit" is meant to be broad enough to include all three examples of NAND gate implementations, above. In some cases, "circuit" may refer to merely an electrical pathway. Types of electrical pathways include a wire, a trace or via on a printed circuit board, etc., or any combination of types of electrical pathways that form a single electrically connected pathway.

A "signal" may refer to a single electrical waveform or a plurality of waveforms. For example, the video controller generates a video signal. The video signal is actually a plurality of signals on a plurality of electrical conductors: HSYNC, VSYNC, R, G, B, etc. as is well known in the art.

"Circuit communication" as used herein is used to indicate an electrical relationship between devices. Two devices are in circuit communication if they are in the same circuit and a signal from one is received by the other, regardless of whether the signal is modified by some other device. For example, two devices separated by a transformer or an optoisolator are in circuit communication if a signal from one reaches the other, even though the signal is modified by the intermediate device. As another example, two devices separated by an analog integrator circuit are in circuit communication if the one device receives the integrated signal from the other. As yet another example, two devices separated by a digital buffer are in circuit communication. As a final example, two devices not directly connected to each other, but both capable of interfacing with a third device, e.g., a CPU, are in circuit communication.

Returning now to FIG. 4, the fourth and final state is the off state 156. The off state 156 is virtually identical to any typical computer system that has been turned off in the ordinary sense. In this state, the primary/regulation unit 172 of the power supply 17 ceases providing regulated power to the computer system 10, (with the exception of a small amount of regulated power through AUX5, as will be more fully explained in the text accompanying FIG. 5) but the state of the computer system 10 has not been saved to the fixed disk 31. The suspend state 154 and the off state 156 are similar in that the power supply 17 no longer generates regulated power. They differ in that in the off state 156, the state of the computer system 10 is not saved to the hard drive 31, as it is in the suspend state 154. Moreover, when leaving the off state 156, the computer 10 "boots" as if it is being turned on. That is, any executing code must be started either by the user or automatically by a means such as the AUTOEXEC.BAT file. However, when leaving the suspend state 154, the computer 10 resumes executing where it was when it was interrupted.

FIG. 4 also shows a general overview of the events that cause transitions between the four states. These events will be further explained in the text accompanying FIGS. 6 through 8; however, a cursory explanation may be helpful. The power button 21, at least two timers (the inactivity standby timer and the inactivity suspend timer, see FIG. 9 and accompanying text), a minutes to wake timer, and a Suspend Enable Flag (see FIGS. 6A and 7 and accompanying text) all affect which state the computer enters. In general, the at least two timers can be either hardware or CPU code timers, executing on the CPU as a program. In the preferred embodiment, they are both CPU code timers, executing from the BIOS data segments. However, the two timers could conceivably be hardware timers, which would be a better solution, in that it would reduce the overhead of the system. The timers are more fully explained in the text accompanying FIG. 9. Both timers are active when the computer 10 is in either the normal operating state 150 or the standby state 152. The timers are in communication with other routines such that the expiration of either timer causes a transition as outlined below. Either or both timers can be configured to expire after a certain period of time, depending on the particular needs of the user. In the preferred embodiment, the inactivity standby timer and the inactivity suspend timer can be set to expire after 10 to 90 minutes. As described herein, the inactivity suspend timer also has a second level in which the system can be made to suspend itself in a much shorter period of time if the system booted in an unattended fashion and there is inactivity for a period of time, e.g., 2 to 5 minutes. That is, the inactivity suspend timer can be configured to expire after a longer period of time, as when the system is attended by the user, or can be configured to expire after a shorter period of time, as when the system is unattended by the user. The system might awaken unattended by a ring of the attached phone line associated with an incoming telephone call or by the internal alarm. In both of these cases, and possibly others, the system ought to suspend in a shorter period of time than if the system is attended by a user. In the alternative, there can be two inactivity suspend timers, with one having a shorter expiration period of time. In that case, one would be enabled while the other is disabled.

Any of the timers can be stopped, that is, configured to never expire. "Stopping" the timers can take the form of actually ceasing the incremental counting action of the timers or merely ignoring their expiration. In the preferred embodiment, setting a zero value in the timer expiration value causes the timer expiration not to be tested. The user of a networked computer may, for example, not want the computer to enter the suspend state 154 because doing so may cause the LAN to fail with respect to that computer.

In theory, the timers can count up or count down and can be reset to a fixed predetermined state and expected to count to another fixed predetermined state when the timer is started (or restarted) or the present value can be used and a difference or sum calculated as the endpoint expiration trigger. In the preferred embodiment, when the timers are reset, the present value of the minutes variable from the real-time clock 98 is stored. The timers are checked for expiration by subtracting the current minutes value from the saved minutes value and comparing the difference to the values selected by the user.

Both timers are affected by certain system activity. For example, in the preferred embodiment, user activity in the form of keyboard 12 keys being pressed, the mouse 13 being moved, mouse 13 buttons being pressed, or hard drive 31 activity causes each timer to be restarted, as more fully explained in the text accompanying FIG. 9; therefore, while a user is pressing keyboard 12 keys or using the mouse 13, or while an application is accessing the hard drive 31, neither timer will expire. In addition other system events might be used to reset the timers. Any of the hardware interrupts might alternatively be monitored for activity. Thus, it might be desirable to have printing (IRQ5 or IRQ7) or a COMM port access (IRQ2 or IRQ3) prevent the system from entering the suspend state 154.

The Suspend Enable Flag is a CPU-manipulable and readable latch within the microcontroller U2, which will be more fully explained in the text accompanying FIG. 6A. In short, putting the microcontroller U2 in one mode causes a press of the switch 21 to place the system 10 into the off state 156 and putting the microcontroller U2 into another mode causes a press of the switch 21 to place the system 10 into the suspend state 154. If the computer system 10 is in the normal operating state 150 and the power button 21 is pressed while the Suspend Enable Flag written to the microcontroller U2 is CLEARed, then the computer system 10 enters the off state 156, as shown at 158. If the computer system 10 is in the off state 156 and the power button 21 is pressed, then the computer system enters the normal operating state 150, as shown at 160. In addition, several "external events," which are explained more fully below, can cause the system to transition from the off state 156 to the normal operating state 150.

If the computer system 10 is in the normal operating state 150, one event can cause the computer to enter the standby state 152: if the inactivity standby timer expires, the computer system 10 will change to the standby state 152, as shown at 162. In the alternative, the system can provide a means, such as a dialog box, a switch, or other input device, for the user to force the system into the standby state immediately. While in the standby state 152, any system or user activity of the kind previously described, including the user pressing the power button 21, will cause the computer 10 to leave the standby state 152 and re-enter the normal operating state 150, as shown at 164.

Pressing the power button 21 causes the system to change from the standby state 152 to the normal operating state 150 to prevent user confusion. As mentioned above, while in the standby state, the monitor 11 is blanked and the power/feedback LED 23 is either on or blinking, depending on how the flags in the microcontroller U2 are configured. A user approaching the system might notice that the monitor 11 is blank and, thinking that the system is in the suspend state 154 or the off state 156, press the power button 21 in an attempt to cause the system to enter the normal operating state 150. If a press of the power button 21 causes the system to enter either the suspend state 154 or the off state have just either user above will have just either turned off or suspended the computer, which is directly contrary to the user's intention. Therefore, when in the standby state 152, a press of the power button 21 causes the system to change from the standby state to the normal operating state. Even if idle, the CPU 40 will soon test whether the switch was pressed. Hardware interrupts remove the CPU 40 from the idle state approximately 20 times per second; thereafter during the next APM Get Event, the microcontroller U2 is queried to determine whether the switch 21 was pressed.

If the computer 10 is in the normal operating state 150, two events can cause it to enter the suspend state 154. First, if the inactivity suspend timer expires, the computer system 10 will change to the suspend state 154, as shown at 166. Second, the user can cause the computer 10 to enter the suspend state 154 immediately by pressing the power button 21 while the Suspend Enable Flag written to the microcontroller U2 is SET, also shown at 166. In the alternative, additionally, the APM driver can issue a suspend request via a "Set Power State: Suspend" command, which causes the APM BIOS driver to call the Suspend Routine. While in the suspend state 154, the user changes to the normal operating state 150 by pressing the power button 21, as shown at 168.

In addition, several external events can be used to change the system 10 from the suspend state 154 to the normal operating state 150, at 168, or from the off state 156 to the normal operating state 150, at 160. For example, a telephone ring detect circuit in the microcontroller U2 in the circuitry of FIG. 6A is configured to cause the system 10 to leave the off state 156 or the suspend state 154 and enter the normal operating state 150 when an attached telephone line rings. Such a feature is useful for a system receiving telefax data or digital data. The system enters the normal operating state responsive to the telephone ring, performs the preset functions, such as accepting an incoming facsimile transmission, uploading or downloading files, allowing remote access to the system, etc., and enters the suspend mode again responsive to the expiration of the Inactivity Suspend Timer, only consuming power while the system is in the normal operating state.

Likewise the microcontroller U2 implements a minutes to wake alarm counter, which allows an alarm-type event to cause the system 10 to leave the suspend state 154 or the off state 156 and enter the normal operating state 150. Such a system is useful in sending telefax or digital data at a certain time of day to take advantage of lower telephone usage rates, and performing system maintenance functions, such as backing up the system hard drive 31 with a tape backup system. In the latter case, the minutes to wake alarm is set to turn the machine on a fixed period of time before the scheduler causes the tape backup program to be executed. In the alternative, the APM BIOS scheduler can be used to cause the execution of the tape backup program.

Lastly, if the computer system 10 is in the standby state 152 and the inactivity suspend timer expires, then the computer 10 changes to the suspend state 154 as shown at 170. The computer system 10 cannot change back from the suspend state 154 to the standby state 152, but may only transition to the normal operating state 150 as described in the text accompanying transition 168.

Obviously, the computer system 10 cannot instantaneously change states. In each transition from one of the four states, a certain period of time will be required to make the necessary system changes. The details of each transition period will be explained in the text accompanying FIGS. 6 through 15.

System Hardware

Figure 5:
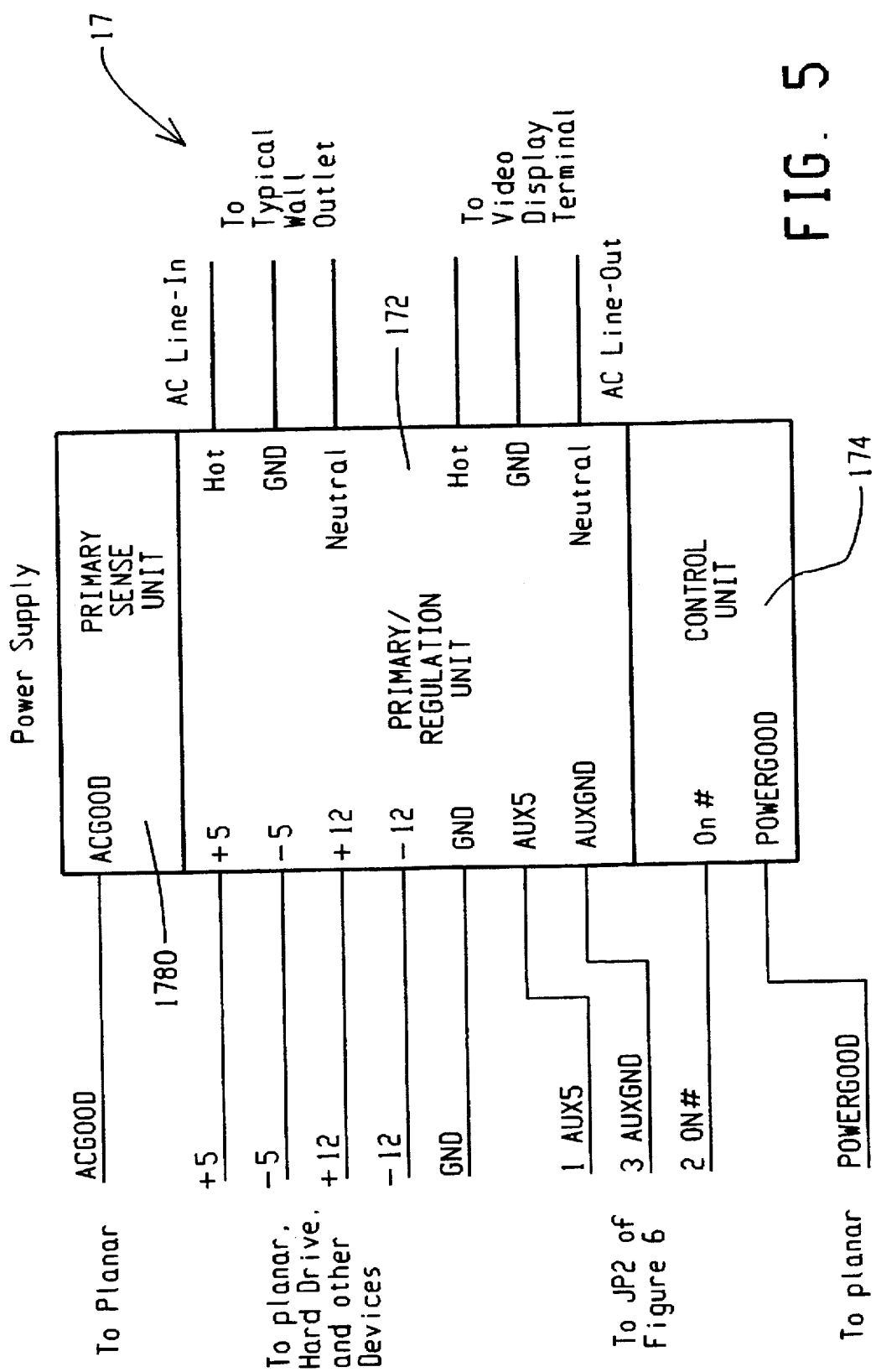
FIG. 5 is a block diagram showing the relevant portions of the power supply.

Before discussing the details of the code executing on the CPU 40, it may be helpful first to discuss the hardware required to achieve the four states. A block diagram of the power supply 17 is shown in FIG. 5. The power supply 17 has two units: a control unit 174 and a primary/regulation unit 172. The power supply 17 has several inputs: Line-In, which accepts either 115 VAC or 220 VAC from a typical wall outlet, and $\overline{ON}$, which controls the regulation activity of the power supply 17. The power supply 17 has several outputs: AC Line-Out, ±5 VDC, ±12 VDC, AUX5, GND, and POWERGOOD. The AC Line-Out is 115 VAC that is typically passed to the electrical power input (not shown) of the video display terminal 11. The control unit 174 accepts the $\overline{ON}$ input and generates the POWERGOOD output. The primary/regulation unit 172 selectively regulates the 115 VAC from the Line-In input down to ±5 VDC, ±12 VDC.

Whether the primary/regulation unit 172 regulates power at the ±5 VDC and ±12 VDC lines depends on the value of $\overline{ON}$, as interfaced by the control unit 174. In the preferred embodiment, the control unit 174 should provide isolation for the circuitry generating the $\overline{ON}$ signal using, for example, an appropriate optoisolator.

The Line-In input and the AC Line-Out, ±5 VDC, ±12 VDC, GND, and POWERGOOD outputs are well known in the art. When the power supply 17 is "off," that is, not providing regulated voltages from the Line-In, the POWERGOOD signal is a logical ZERO. When the power supply 17 is "on," the power supply 17 generates the ±5 VDC and ±12 VDC regulated voltages from the 115 VAC Line-In. These four regulated voltages and their associated GND are the "system power" as is commonly known in the art. When the regulated voltages attain levels within acceptable tolerances, the POWERGOOD signal changes to a logical ONE. Whenever either the +5 or +12 Volt lines fall out of tolerance, the POWERGOOD signal becomes a logical ZERO, thereby indicating this condition.

The AUX5 output provides an auxiliary +5 VDC to the planar. When the power supply 17 is plugged into a typical wall outlet supplying a nominal 115 VAC, the primary/regulation unit 172 provides regulated '5 VDC at AUX5, whether the power supply is "on" or "off." Thus, while receiving AC power, the power supply 17 is always providing a nominal +5 VDC at AUX5. The AUX5 output differs from the +5 output in that the primary/regulation unit 172 only generates regulated +5 VDC through the +5 output while the power supply 17 is "on." The AUX5 output further differs from the +5 output in that in the preferred embodiment, the primary/regulation unit 172 supplies several amps of current at +5 VDC through the +5 output, while the primary/regulation unit 172 supplies less than an amp at +5 VDC though the AUX5 output.

Typical prior power supplies use a high-amperage double-throw switch to connect and disconnect the Line-In input to and from the regulation section of the power supply. The power supply 17 in the present invention does not use a high-amperage double-throw switch. Rather, the switch 21 controls circuitry that generates the $\overline{ON}$ signal. In the preferred embodiment, the switch 21 is a momentary single pole, single throw pushbutton switch; however, those skilled in the art could adapt the circuitry of FIG. 6A to make use of other types of switches such as a single-pole, double throw switch. The AC Line-In is always connected to the primary/regulation unit 172 from the wall outlet. When $\overline{ON}$ is a logical ONE (approximately AUX5, nominally +5 VDC), the primary/regulation unit 172 does not regulate the 115 VAC Line-In to ±5 VDC or ±12 VDC through the ±5 or ±12 outputs. The primary/regulation unit 172 merely provides a low-amperage nominal +5 VDC at the AUX5 output. On the other hand, when $\overline{ON}$ is a logical ZERO (approximately GND), the primary/regulation unit 172 does regulate the 115 VAC Line-In to ±5 VDC and ±12 VDC through the four ±5 and ±12 outputs, respectively. Thus, when $\overline{ON}$ is a ONE, the power supply 17 is "off" and when $\overline{ON}$ is a ZERO, the power supply 17 is "on."

If specified, power supplies having an AUX5 output and an $\overline{ON}$ input, like the power supply 17 described above, can be obtained from suppliers of more conventional power supplies.

Referring now to FIG. 6A, a schematic drawing of the electronic circuitry of the computer system 10 of the present invention is shown. The circuitry in FIG. 6A is responsible for interfacing between the switch 21, the power/feedback LED 23, the power supply 17, the video display terminal 11, and code executing on the CPU 40.

The circuitry comprises four (4) integrated circuits—U1, a first preprogrammed PAL16L8; U2, a preprogrammed 83C750 microcontroller; U3, a 74LS05, which is well known in the art; and U4, a second preprogrammed PAL16L8 (not shown)—and the various discrete components in circuit communication as shown in FIG. 6A. In general, the PALs U1 and U4 (not shown) interface between the planar I/O bus 90 of FIGS. 3A and 3B and the microcontroller U2, which interfaces to the remaining circuitry of FIG. 6A, which interfaces to the switch 21, the power supply 17, the video display terminal 11, and a programmable clock synthesizer 906. The clock synthesizer 906 can be one of many such devices known to those of ordinary skill in the art. One such part is the CH9055A, which is manufactured by Chrontel, and widely available from numerous sources.

The circuitry of FIG. 6A further comprises the switch 21, a 16 MHz crystal Y1, eighteen resistors R1-R18, eight capacitors C1-C8, three N-type MOSFETs Q1-Q3, which are standard low-current NMQS FETs suitable for acting as a logic switch in the preferred embodiment, and six (6) 1N4148 small signal diodes CR1-CR6, all configured and connected as shown in FIG. 6A. The resistors R1-R18 are ¼ Watt resistors and are of values shown in FIG. 6A, ±5%. The capacitor C1 is a 10 µF (±10%) electrolytic capacitor. The capacitors C2 & C3 are 22 pF (±10%) tantalum capacitors. The capacitors C4-C8 are 0.1 µF (±10%) ceramic capacitors. Finally, the capacitor C9 is a 1000 pF (±10%) ceramic capacitor.

The crystal Y1 and the capacitors C2 and C3 generate signals used by the microcontroller U2 to control the timing of operations, as is known in the art. The diodes CR1 and CR3 and the resistor R14 isolate the AUX5 signal from the VBAT signal, while at the same time allowing the AUX5 signal to supplement the VBAT signal in that while the power supply 17 generates the AUX5 signal, the battery 171 is not drained. Rather, the AUX5 signal is stepped down through the diodes CR1 and CR3 to supply the proper voltage to the devices connected to VBAT. In the alternative, the VBAT line is isolated from the AUX5 line.

The second PAL U4 (not shown) is connected to address lines SA(1) through SA(15) and the AEN (address enable) line. SA(1) through SA(15) and AEN are part of the planar I/O bus 90 shown in FIGS. 3A and 3B. The second PAL U4 is programmed to be merely an address decoder, presenting an active low signal DCD# when a predetermined address is presented on address lines SA(1) through SA(15) and the AEN (address enable) line is active. In this particular embodiment, the second PAL U4 is preprogrammed to decode two consecutive 8-bit I/O ports at addresses OECH and OEDH. In the alternative, the DCD# signal can be generated by another electronic device, such as a memory controller or an ISA controller chipset, as is known to those skilled in the art.

The first PAL U1 is programmed to provide several functions: (i) a read/write interface between the CPU and the microcontroller U2 to allow commands and data to be transferred between the CPU 40 and the microcontroller U2, (ii) a logical ORing of the mouse interrupt INT12 and the keyboard interrupt INT1; and (iii) a reset output to reset the microcontroller U2 responsive to commands from the CPU 40.

The first PAL U1 makes use of two consecutive I/O ports, also herein referred to as the "power management ports." The first PAL U1 has eight (8) inputs from the planar I/O bus 90: SD (4), SD (0), SA (0), I0W#, I0R#, RST_DRV, IRQ1, and IRQ12. The first PAL U1 is reset to a known initial condition by the active high signal RST_DRV input at pin 7 (I6), which is generated by the memory controller 46, as is well known to those skilled in the art.

A reset line RST751 of the microcontroller U2 is at pin 9. A reset subcircuit 920 is responsible for generating the RST751 signal and comprises the four resistors R4, R16, R17, and R18, the two capacitors C1 and C8, and the two MOSFETS Q2 and Q3, in circuit communication with the first PAL U1 and the microcontroller U2 as shown in FIG. 6A. The reset subcircuit 920 interfaces the reset output signal RESET from the first PAL U1 to the reset input signal RST751 of the microcontroller U2 such that when the RESET single is at a logical ONE, the RST751 line is pulled to a logical ONE, thereby resetting the microcontroller U2.

The first PAL U1 resets the microcontroller U2 responsive to the CPU 40 writing a logical ONE to bit 0 of control port 0EDH. Writing a logical ONE to bit 0 of control port OEDH causes the first PAL U1 to pull the RESET line to a logical ONE, which pulls the RST751 line to a logical ONE, thereby resetting the microcontroller U2. The CPU 40 clears the reset request by writing a logical ZERO to bit 0 of control port OEDH.

Figure 6D:
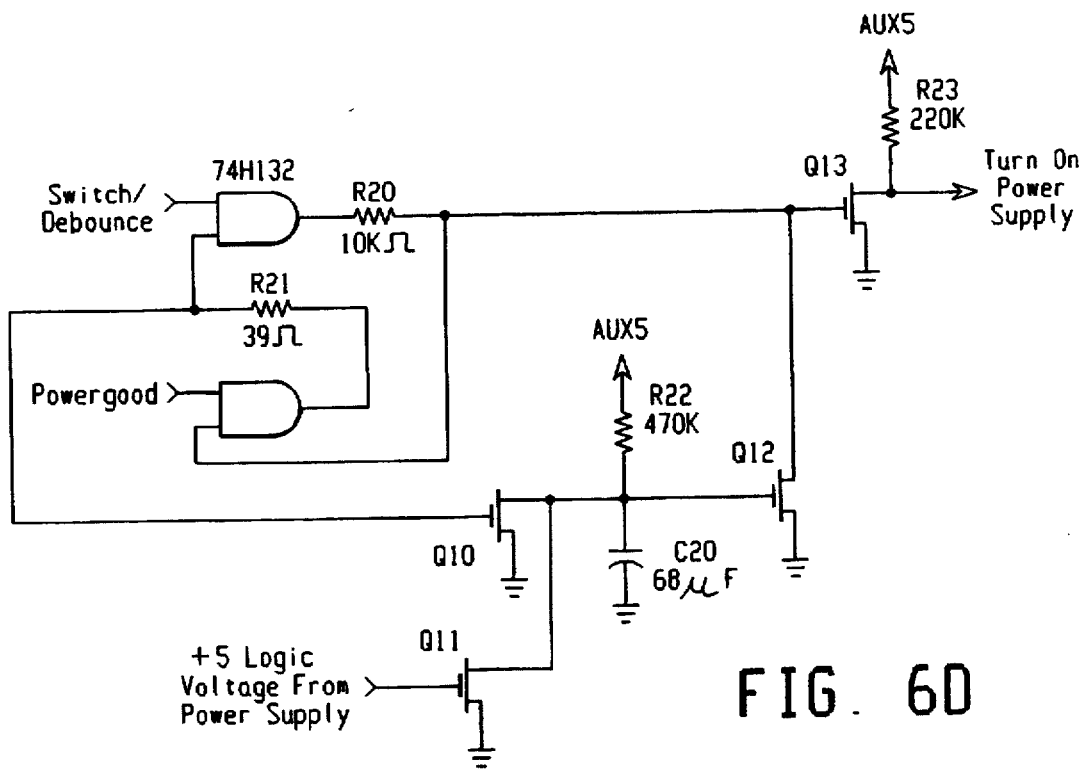
FIG. 6D is an electrical schematic diagram of a second embodiment of the power supply fault detection and correction circuit.
Figure 6C:
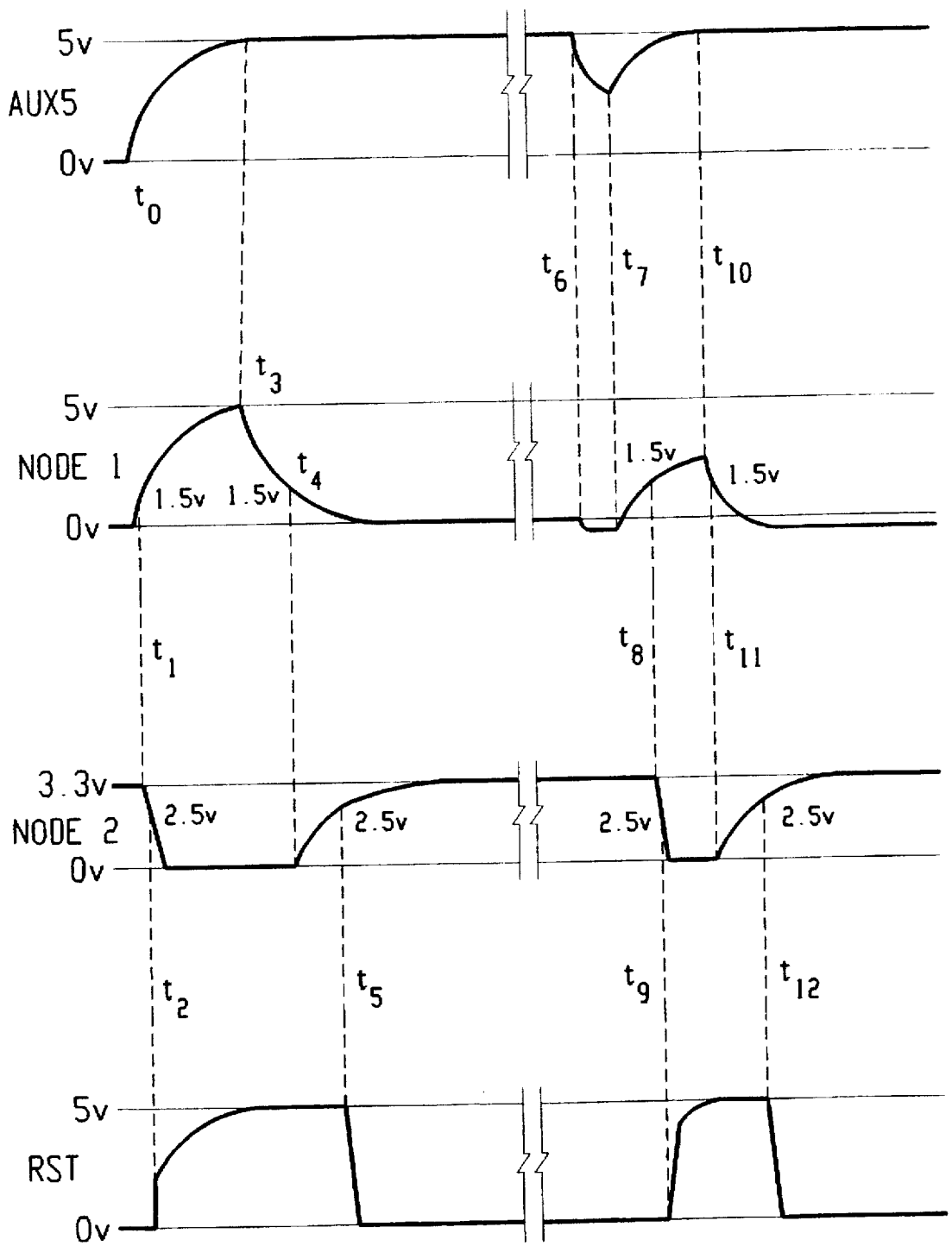
FIG. 6C is a waveform diagram showing the various signals within the reset circuit for the power management circuitry.

In addition, the reset subcircuit pulls the RST751 line to a logical ONE, thereby resetting the microcontroller U2, whenever the voltage of AUX5 signal raises by a given amount, as would occur after the AUX5 voltage lowers during a "brownout" or "blackout" of the AC source to the power supply 17 occurs, as shown in FIG. 6C. The manufacturer of the 83C750, Philips, suggests using a simple RC circuit to prevent reset problems; however, a simple RC circuit can allow the 83C750 to latch up during power supply brownouts. In the particular configuration of FIG. 6A, the RST751 line is pulled to a logical ONE for a period of time determined by R17 and C8 (thereby resetting the microcontroller U2) when the AUX5 voltage raises by a threshold amount in a period of time greater than the time constant determined by R4, R16, and C1. This would occur after a typical brownout or blackout. The threshold value is approximately 1.5 VDC in the embodiment shown in FIG. 6A.

Referring now to FIG. 6C waveforms for the reset circuit 920 are shown for a period of time as AUX5 rises as AC power is applied to the power supply 17 and a period of time during which a "brownout" occurs. Before t0, the power supply is not generating AUX5, VBAT is at approximately 3.3 Volts, Q3 is conducting and pulling the RST751 line to ground. At t0, the power supply begins generating AUX5 and the voltage begins rising at a rate based on the load and the capacitors in the power supply affecting AUX5. Node1, the node between C1 and R4, is capacitively coupled to AUX5; therefore, it rises as AUX5 rises.

At t1, Node1 reaches approximately 1.5 Volts, which is sufficient to trigger Q2, which pulls Node2 to ground. At t2, as Node2 passes 2.5 Volts, Q3 ceases conducting and the RST751 line jumps to the level of AUX5 via R18 and rises with AUX5 to approximately 5 Volts. As the RST751 line becomes approximately 3 Volts, the microcontroller U2 is reset.

At t3, AUX5 stops rising, therefore, Node1 stops rising and begins discharging to ground (the RESET line of the first PAL U1 is LOW) at a rate determined by C1 and R4. At t4, as Node1 passes through approximately 1.5 Volts, Q2 stops conducting and Node2 charges at a rate determined by C8 and R17. At t5, as Node2 passes approximately 2.5 Volts, Q3 conducts, pulling the RST751 line to ground Thus, the reset on power-on is complete; the system is usually in the state with AUX5 at 5 Volts, VBAT at 3.3 Volts, and Node1 at ground and Node2 at VBAT.

At t6, a brownout starts at the AUX5 line and AUX5 discharges. Being capacitively coupled to AUX5, Node1 tries to follow AUX5, but cannot, because diodes in the first PAL U1 prevent it from going much lower than −0.5 Volts. At t7, AUX5 is at its lowest point and starts rising again. Again, Node1 follows AUX5 and rises. At t8, Node1 reaches approximately 1.5 Volts, which is sufficient to trigger Q2, which pulls Node2 to ground. At t9, as Node2 passes 2.5 Volts, Q3 ceases conducting and the RST751 line jumps to the level of AUX5 via R18 and rises with AUX5 to approximately 5 Volts. As the RST751 line becomes approximately 3 Volts, the microcontroller U2 is reset.

At t10, AUX5 stops rising, therefore, Node1 stops rising and begins discharging to ground (the RESET line of the first PAL U1 is LOW) at a rate determined by C1 and R4. At t11, as Node1 passes through approximately 1.5 Volts, Q2 stops conducting and Node2 charges at a rate determined by C8 and R17. At t12, as Node2 passes approximately 2.5 Volts, Q3 conducts, pulling the RST751 line to ground. Thus, the brownout-induced reset cycle is complete. Notice that during this particular brownout, Node1 did not rise above 3 Volts and, therefore, could not have reset the microcontroller if connected to the RST751 pin. However, the voltage of AUX5 lowered below 4 Volts, which would have been enough to cause the microcontroller U2 to enter an undefined state.

The threshold for triggering a reset is tied to the reference value; therefore, to raise or lower the threshold voltage, the value of the reference (in this case VBAT), must be raised or lowered, respectively. The reset circuit provides the benefits of increased reset protection for the microcontroller U2, while being very inexpensive and consuming virtually no power when not resetting the microcontroller U2.

Referring back to FIG. 6A, the microcontroller U2 is interfaced to the CPU 40 via the first PAL U1 and has a number of inputs, outputs, and internally controllable functions.

The SWITCH signal is input at pin 8 (P0.0) and reflects the current state of the pushbutton 21. The pushbutton 21 is normally open. While the pushbutton 21 is open, the SWITCH line is pulled to a logical ZERO (ground) through resistor R1. When the pushbutton 21 is pressed, thereby causing a closure event, the SWITCH line is pulled up to a logical ONE (AUX5) through resistor R13. Capacitor C6 acts to debounce the switch closure event; any further debouncing of closure events of the switch 21 are performed within the microcontroller U2 by reading the SWITCH a predetermined number of times, e.g., 50 times, and assuring that the SWITCH line is the same for all those reads, as is known to those skilled in the art.

The regulation of the power supply 17 is directly controllable by the microcontroller U2. As shown in FIG. 6A, the ON signal is output at pin 5 (P3.0) and is wire-ORed with the SWITCH signal via resistor R6 to control the ON# signal of the power supply. When the ON signal is a logical ONE, MOSFET Q1 conducts, thereby pulling the ON# line (pin 2 of JP2) to a logical ZERO (GND), thereby causing the power supply 17 to begin providing regulated power to the system through the ±5 VDC and ±12 VDC lines. on the other hand, when the $\overline{ON}$ line is a logical ZERO, MOSFET Q1 does not conduct, therefore the ON# line (pin 2 of JP2) is pulled to a logical ONE (AUX5) by resistor R7, thereby causing the power supply 17 to cease providing regulated power through the ±5 VDC and ±12 VDC lines.

The state of the ON line is controlled by the microcontroller U2 responsive to a closure event of the switch 21 and responsive to the CPU 40 via a writable register bit within the microcontroller U2, which can be written by the CPU 40. The microcontroller U2 is powered by AUX5; therefore, the microcontroller U2 is always powered, executing code, and controlling the system. If the power supply 17 is not providing regulated power to the system through the ±5 VDC and ±12 VDC lines and either (i) the switch 21 is pressed or (ii) one of the external events occurs, then the microcontroller U2 asserts the ON signal, thereby causing the power supply 17 to provide regulated power to the system through the ±5 VDC and ±12 VDC lines. The microcontroller continues asserting the ON signal after the switch 21 is released.

As a backup system, the power supply 17 can also be turned on under the direct control of the user via the pushbutton 21. This option will typically only be used if the microcontroller U2 ceases functioning as expected, as will be evidenced by the system not powering up responsive to a press of the power button 21. As shown in FIG. 6A, the switch 21 also controls the ON# line of the power supply 17 via the diode CR2, the MOSFET Q1, the resistor R7, and the connector JP2. Normally the pushbutton 21 is open and the SWITCH line is pulled to a logical ZERO through R1 and MOSFET Q1 does not conduct; therefore the ON# line (pin 2 of JP2) is pulled to a logical ONE (AUX5) by resistor R7, and the power supply 17 is not providing regulated power through the ±5 VDC and ±12 VDC lines. When the pushbutton 21 is pressed and held by the user, the SWITCH line is pulled to a logical ONE and MOSFET Q1 conducts, thereby pulling the ON# line (pin 2 of JP2) to a logical ZERO (GND), thereby causing the power supply 17 to begin providing regulated power through the ±5 VDC and ±12 VDC lines. With the button 21 still held in, after the system is powered, the BIOS causes the CPU 40 to test whether the microcontroller U2 is still functioning. If not, the CPU 40 resets the microcontroller U2, which, after being reset, detects that the switch 21 is being pressed. Consequently, with the button 21 still held, the microcontroller asserts the ON signal and the user can finally release the switch 21 with the knowledge that the microcontroller is now controlling the power supply 17. To use this backup option, the user must press the button 21 for a period of time on the order of seconds—approximately two seconds after the logo appears.

The microcontroller U2 only turns off the system responsive to either (i) the switch 21 being pressed or (ii) the CPU 40 commanding the microcontroller to turn off the system. To the microcontroller, these events are the same, because the microcontroller is configured such that a switch press can be caused either by a closure event of the switch 21 or by the CPU 40; a hardware button press/release is treated virtually the same as a software button press/release. The microcontroller U2 only turns off the system without a command by the CPU if the Suspend Enable Flag in the microcontroller U2 is cleared. In this case, when the system is powered and the Suspend Enable Flag is CLEARed, responsive to a closure event of the switch 21, the microcontroller U2 clears the ON signal, thereby causing the power supply 17 to cease providing regulated power to the system through the ±5 VDC and ±12 VDC lines. The ON signal remains cleared after the switch 21 is released.

The microcontroller U2 also turns off the system responsive to a command by the CPU, as would be issued after a the system state has been successfully saved to the hard disk drive (suspended). Responsive to such a command, the microcontroller U2 clears the ON signal, thereby causing the power supply 17 to cease providing regulated power to the system through the ±5 VDC and ±12 VDC lines.

The microcontroller U2 can also detect and affect the system when certain external events occur. The EXT_RING signal is input at pin 7 (P0.1) and allows the microcontroller U2 to detect a ring from the powered external modem 902. As known to those skilled in the art, typical external modems supply a ring signal that toggles to a logical ONE in the well known RS-232C format when a ring signal is detected across the tip and ring telephone lines. This signal is interfaced to the microcontroller U2 via diode CR6 and divided with resistors R10 and R11 and finally input into the microcontroller U2 via the EXT_RING line. The toggling signal is sampled every 25 milliseconds and analyzed by the microcontroller U2, which deems that a ring is present whenever this input is a logical ONE for two consecutive samples. Responsive to this condition being met, the microcontroller U2 asserts the ON signal, thereby causing the power supply 17 to being providing regulated power to the system through the ±5 VDC and ±12 VDC lines. For the EXT_RING signal to be used to detect an incoming telephone call, an externally powered modem 902 must be present.

In the alternative, another device that provides a binary signal conforming to the RS-232 specification (or close enough that it asserts the EXT_RING signal) can be interfaced to the EXT_RING line and used to awaken the system, for example, motion sensors, burglar alarm sensors, voice activated sensors, light sensors, infrared light sensors, "clapper" type sensors, etc.

As shown in FIGS. 6A and 6B, the present embodiment also has a provision for detecting a telephone ring signal from an internal modem 900 having an optoisolator OPTO1 based ring-detect circuit. Many suitable optoisolators are manufactured by e.g. , Hewlett Packard, and widely available from numerous sources. The internal modem 900 can either be designed into the circuitry of the system planar 20 or placed into one of the expansion slots 78. In the latter case, the modem 900 must be modified to provide a Berg or similar connector to allow the signal from the optoisolator OPTO1 to be electrically connected to the circuitry of the power management circuitry of FIG. 6A. Many manufacturers of modems are modifying their internal modems to provide a connector suitable for use with the circuitry of the present invention. The EXT_WAKEUP# signal is input at pin 4 (P0.2) of the microcontroller U2 and is used to input a signal from the ring-detect optoisolator OPTO1 from the internal modem 900. This signal is interfaced via resistors R9 and R5, diode CR6, and capacitor C9 and finally input into the microcontroller U2 via the EXT_WAKEUP# line.

The threshold and protection portion 905 of the internal modem 900 is connected to the standard Tip and Ring telephone lines, and (i) provides protection from lightning and other electrical events that might damage the modem 900 and (ii) sets the ring threshold voltage, as known to those skilled in the art of modem design.

The toggling signal from the optoisolator OPTO1 is detected and analyzed by the microcontroller U2, which deems that a ring is present whenever three (3) consecutive signal periods of the signal on EXT_WAKEUP have a frequency of between 15.1 Hz and 69.1 Hz. Unlike the EXT_RING signal circuit, which must be powered to provide the ring signal along EXT_RING, the internal modem 900 need not be powered for the optoisolator OPTO1 to supply a suitable signal along the EXT_WAKEUP# line, which is normally pulled up to AUX5 by R5.

The microcontroller U2 can interrupt the CPU 40 via the CPU's system management interrupt (SMI), if the CPU 40 has an SMI (the CPU 40 need not have an SMI for the system to take advantage of many of the benefits of the present invention). The SMI_OUT# signal is output at pin 3 (P3.2) of the microcontroller U2 and allows the microcontroller U2 to immediately interrupt the CPU 40 without waiting for the operating system to validate or otherwise allow the interrupt. The state of the SMI_OUT# line is controlled by a writable register bit, which can be written by the CPU 40, located within the microcontroller U2. In addition the microcontroller U2 can assert the SMI_OUT# signal and thereby interrupt the CPU 40 (i) responsive to activity being detected on the ACTIVITY# line or (ii) before the microcontroller U2 causes the power supply 17 to stop providing regulated power to the system. Either or both of these events can be enabled and disabled by commands from the CPU to the microcontroller U2.

Each SMI, the microcode in the CPU 40 saves the state of the CPU to the special CPU state save area to or from memory. Thereafter, the CPU 40 executes the SMI interrupt handler, which performs the functions below. To restore the state of the CPU, the SMI interrupt handler issues the RSM (resume) instruction, which causes the CPU 40 to restore its own state from the special save area.

Before the CPU 40 causes the microcontroller U2 to interrupt the CPU 40 via the CPU's SMI, the CPU 40 writes a value to a variable in CMOS NVRAM indicating the reason for the SMI. This value in CMOS NVRAM defaults to 00H, which indicates to the CPU 40 that the microcontroller U2 is interrupting the CPU 40 asynchronously, as occurs before the microcontroller U2 causes the power supply 17 to stop providing regulated power. After each SMI, the CPU 40 sets that variable in CMOS NVRAM to 00H. Responsive to this value, the CPU 40 performs certain tasks under the assumption that the system is going to be powered down imminently by the microcontroller U2. The CPU 40 can extend the period of time before which the microcontroller U2 powers down the system by periodically restarting the power down extend timer within the microcontroller U2.

During this period of time before the system powers down, the CPU 40 can perform numerous tasks. For example, since the user may have changed one or more of the parameters that affect the wake alarm, the CPU recalculates and writes to the microcontroller U2 a fresh minutes to wake value. In addition, the CPU writes to the CMOS NVRAM certain information that is to be written to the hard drive 31 later, such as the period of time the computer system was operating since its last power on, as described in the text accompanying FIG. 23.

Other values written by the CPU 40 include 01H, which indicates that the CPU 40 is to jump to the Suspend Routine at 254; 02H, which indicates that the CPU 40 is to jump to the Resume Routine at 454; and 0FFH, which indicates that the CPU 40 is to set up the special CPU state save area in the segment E000H data structure.

In the present embodiment, the microcontroller is given control over blanking the display 11. The DISP_BLANK signal is output via pin 1 (P3.4) of the microcontroller U2 and directly controls the blanking of the display 11. Two inverters U3D and U3E interface the DISP_BLANK signal with the ESYNC# and BLANK# lines. With the ESYNC# and BLANK# lines at a logical ONE (VCC), the video controller 56 generates a video signal. When BLANK# and ESYNC# are at a logical zero (GND) the video controller 56 ceases generating the video signal. The state of the DISP_BLANK line is controlled by a writable register bit, which can be written by the CPU 40, located within the microcontroller U2. The CPU 40 instructs the microcontroller U2 to blank the display when the system enters the standby state 152. In addition, the DISP_BLANK line is sequentially SET then CLEARed responsive to closure events of the switch 21. Similarly, activity at any one of the activity interrupts, in this case INT1 and INT12, causes the microcontroller to CLEAR the DISP_BLANK line, thereby allowing the video controller 56 to generate the video signal.

In addition, the microcontroller U2 controls the frequency of the clock signals generated by the clock synthesizer 906. Three Berg-type jumpers (not shown) JP0, JP1, and JP2 control the clock synthesizer as follows: when JP0=0, JP1=1, and JP2=0, the clock synthesizer generates a 33 MHz clock signal; when JP0=1, JP1=1, and JP2=0, the clock synthesizer generates a 25 MHz clock signal; and when JP0=0, JP1=1, and JP2=1, the clock synthesizer generates an 8 MHz clock signal. The clock synthesizer 906 is further controlled by three clock lines CLK0, CLK1, and CLK2, which correspond to JP0, JP1, and JP2. As shown in FIG. 6A, these clock lines CLK0, CLK1, and CLK2 are controlled by the microcontroller U2 via the CLK_SLOW# signal, which is output at pin 2 (P3.3) of the microcontroller U2. As shown, the CLK_SLOW# signal is doubly inverted by the inverters with open collector outputs U3A, U39, and U3C. Also, resistors R15 and R8 are pullup resistors used to pull the open collector output of U3A and the CLK0 input to the clock synthesizer 906 to a logical ONE, respectively.

The three clock signals CLK0, CLK1, and CLK2 and the three jumpers JP0, JP1, and J22 control the clock synthesizer as follows: when the CLK_SLOW# signal is a logical ONE, the CLK1 and CLK2 signals are also a logical ONE and, consequently, the clock synthesizer 906 is controlled by the jumpers JP1, JP2 and generates the higher 25 MHz or 33 MHz clock signal for use by the system. On the other hand, when the CLK_SLOW# signal is a logical ZERO, the CLK1 and CLK2 signals are also a logical ZERO and, consequently, the clock synthesizer 906 generates the lower 8 MHz signals for use by the system, thereby causing the system to consume less power. As shown in FIG. 6A, a Berg-type jumper separates the CLK_SLOW# line from the CLK0 line. If a jumper is in place, the CLK0 line follows the CLK_SLOW# signal, on the other hand, if no jumper is in place, the CLK0 line remains pulled to a logical ONE by resistor R8 regardless of the state of the CLK_SLOW# signal. The state of the CLK_SLOW# line is controlled by a writable register bit, which can be written by the CPU 40, located within the microcontroller U2. In addition, the CLK_SLOW# line can be cleared by the microcontroller U2 in response to activity at the ACTIVITY# line. As is apparent to those skilled in the art, other clock synthesizers can be used in the present invention; the interconnections between the microcontroller U2 and the clock synthesizer might need to be changed to match the specific specifications of the particular synthesizer used.

Additionally, the microcontroller U2 directly controls the illumination of the power/feedback LED 23. The LED_CNTRL signal is output at pin 22 (P3.6) and allows direct control of the power/feedback LED 23 by the microcontroller U2. The resistors R2 and R3 and diodes CR4 and CR5 allow the power/feedback LED 23 to be driven by either the AUX5 power line or the VCC power line in response to the LED_CNTRL line being at a logical ZERO. When the LED_CNTRL line is at a logical ONE, the power/feedback LED 23 is not illuminated. As described more fully below, the state of the LED_CNTRL line is controlled by the microcontroller U2 in response to a closure event of the switch 21, in response to the wake alarm, in response to one or more rings at either ring-detect input, or in response to the system being placed in the standby mode.

The microcontroller U2 can control the LED 23 to be a simple power LED. As such, the LED 23 is illuminated after a closure event of the switch 21 that causes the system to change from either the off state 156 or the suspend state 154 to the normal operating state 150. Likewise, the microcontroller U2 extinguishes the LED 23 after a release event of the switch 21 that causes the system to change from the normal operating state 150 to either the suspend state 154 or the off state 156.

In addition, the LED 23 can be selectively flashed at a particular rate, e.g., every second, by the microcontroller U2 to indicate that the system is in the standby state 152. In addition, the LED 23 can be selectively flashed at a different rate, e.g., every half-second, by the microcontroller U2 to indicate that the system was awakened by a ring or by the alarm and the system is in either the off state or the suspend state. In the alternative, while in the suspend state, the LED 23 can be selectively flashed in groups of flashes by the microcontroller U2 to indicate the number of times the system was powered up by external events, such as a ring, alarm, etc., and was powered back down by the expiration of the inactivity suspend timer. In this case, the BIOS is provided with one or more functions to allow the OS and application programs to modify the number of times the microcontroller U2 is to flash the LED 23. For example, if the system is awakened by a ring and an incoming facsimile transmission is received, the telecommunications application program can call the particular BIOS function to add one to the number of flashes. Thereafter, the BIOS causes the CPU 40 to write the new flash value to the microcontroller U2, which then causes the LED 23 to flash the commanded number of times.

The POWERGOOD signal is input at pin 4 (P3.1) of the microcontroller U2 and allows this signal to be used by the microcontroller U2 and the CPU 40. Specifically, the microcontroller uses the POWERGOOD signal to implement a feedback-based fault detection and correction circuit to determine if the power supply 17 has faulted and to clear the faulted condition. As described elsewhere in this specification, if the ON signal has been asserted for a period of time (e.g., three seconds) and the POWERGOOD signal is at a logical zero, indicating that the power supply 17 is not providing regulated voltages at proper levels, then the microcontroller U2 assumes that the power supply 17 has faulted from, e.g, an overcurrent condition. Consequently, to possibly clear the faulted condition, the microcontroller U2 ceases asserting the ON signal for a period of time (e.g., five seconds) to allow the fault to clear. Thereafter, the microcontroller U2 reasserts the ON signal and waits for the POWERGOOD signal to become a logical ONE, indicating that the power supply 17 is now providing regulated power to the system. Without this feedback-based fault detection and correction, the power supply 17 would remain faulted and the microcontroller U2 would continue to assert the ON signal in an attempt to cause the power supply 17 to begin generating regulated power. The only solution would be to remove AC power from the power supply to clear the fault.

An alternative embodiment of the power supply fault detection and correction circuit is shown in FIG. 6D. This embodiment uses four FETs Q10–Q13, resistors R20–R23, a capacitor C20, and a 74HC132 to detect when the power supply 17 is faulted and clear the fault. Q12 pulls the ON signal LOW for a period of time determined by R22 and C20, when the ON signal is HIGH, AUX5 is being powered, and VCC is below the threshold for triggering Q11, thereby clearing the fault condition in the power supply.

The ACTIVITY# signal is input at pin 19 (INT1) of the microcontroller U2 and is used by the microcontroller U2 to respond to activity at the keyboard 12 and mouse 13. JRQ1 is the keyboard hardware interrupt signal, which is input at pin 8 (I7) of the first PAL U1; pressing a key on the keyboard 12 causes the IRQ1 signal to pulse. IRQ12 is the mouse hardware interrupt signal, which is input at pin 11 (I9) of the first PAL U1; moving the mouse 13 or pressing a button on the mouse 13 causes the IRQ12 signal to pulse. The IRQ1 and IRQ12 signals are logically Ored in the first PAL U1 and output as the ACTIVITY# signal. Using the ACTIVITY# signal allows the microcontroller U2 to never miss activity of either the keyboard 12 or the mouse 13.

While in the standby state, activity on either interrupt causes the microcontroller to restore immediately the video display. Using the interrupts IRQ1 and IRQ12 in this manner gives the user immediate feedback in the form of a restored video display when returning from the standby state 152 to the normal operating state 154. Without it, the user might not receive feedback until possibly seconds later when the APM checks for user activity, as explained in the text accompanying FIG. 9.

Communications between the CPU 40 and the microcontroller U2 are performed using SD (0), which is input at pin 18 (I/O6) of the first PAL U1 and input to the microcontroller U2 via the RWDO line, which is output at pin 13 (I/O3) of the first PAL U1 and input at pin 13 (p1.0) of the microcontroller U2, SD (1), which is input at pin 14 (p1.1) of the microcontroller U2, SD (2), which is input at pin 15 (p1.2) of the microcontroller U2, SD (3), which is input at pin 16 (p1.3) of the microcontroller U2, SD(4), which is input at pin 6 (I5) of the first PAL U1, IO_STROBE#, which is input at pin 18 (INTO) of the microcontroller U2, and PROC_RDY, which is output at pin 20 (P1.7) of the microcontroller U2. The first PAL U1 and the microcontroller U2 are configured and programmed to provide (i) four-bit parallel writes from the CPU 40 to the microcontroller U2 along SD (0) via RWDO, SD (1), SD (2), and SD(3), with one address being essentially a one-bit write to reset the microcontroller U2 and the other being a nibble written to the microcontroller U2 that is only valid when data bit SD(4) is HIGH, and (ii) serial (one-bit) reads from the microcontroller U2 by the CPU 40 along SD (0) via RWD0, with one address corresponding to the status bit and the other corresponding to the data bit from the microcontroller U2.

Referring now to FIG. 19, several of the routines executing on the microcontroller U2 are shown beginning at 1160. The microcontroller U2 is usually executing one of two main routines: the Power On Routine, at tasks 1168 through 1216, or the Power Off Routine, at tasks 1260 through 1308. The Power On Routine is executed by the microcontroller U2 when the power supply 17 is providing regulated power at the ±5 and ±12 lines or power supply 17 is not providing regulated power at the ±5 and ±12 lines, but the system is in the process of powering on. The Power Off Routine is executed by the microcontroller U2 when the power supply 17 is not providing regulated power at the ±5 and ±12 lines or the power supply 17 is providing regulated power at the ±5 and ±12 lines, but the system is in the process of powering off. In addition, there are three interrupt-driven routines: one for communicating with the CPU 40, at 1220 through 1232, one for detecting activity of the mouse 13 or keyboard 12, at 1236 through 1244, and one that provides a time-base with 25 millisecond, half-second, second, and minute resolutions, at 1248 through 1256.

First, the microcontroller U2 is initialized, at 1164, during which time all the variables are initialized, the counter variables are initialized, the timer interrupt is initialized and enabled, and external interrupts, which control the communication routine and the activity routine, are initialized.

The communication routine is an interrupt-driven routine beginning at 1220 that executes responsive to the IO_STROBE line being pulled to a logical ZERO by the first PAL U1, which indicates that the CPU 40 is beginning a command or query. In short, this routine receives a one-or more nibble command or query from the CPU 40, at 1224, implements the command and/or returns the data responsive to the query, at 1228, and returns program execution control to the interrupted code, at 1232.

The microcontroller sequentially receives the nibbles from the CPU that form the command or query. After receiving a nibble, the microcontroller pulls the PROC_RDY LOW. When it is ready for the next nibble, it pulls PROC_RDY HIGH again. Upon seeing this LOW to HIGH transition at PROC_RDY, the CPU 40 then can write the next command nibble.

While the microcontroller U2 is implementing the command or query from the CPU 40, it cannot receive another command; therefore, the microcontroller U2 asserts the PROC_RDY line to a logical ZERO, indicating to the CPU 40 (via reads of the status port) that the microcontroller cannot accept the next command/query yet. When the implementation is finished, the PROC_RDY line is asserted at a logical ONE, indicating to the CPU 40 (via reads of the status port) that the microcontroller U2 is ready to accept the next command/query.

The activity routine is an interrupt-driven routine beginning at 1236 that executes responsive to the ACTIVITY# line being pulled to a logical ZERO by the first PAL U1, which indicates that the user has used either the mouse 13 or the keyboard 12. In short, responsive to receiving the interrupt, this routine (i) SETs a bit indicating that there was either mouse 13 or keyboard 12 activity, (ii) restores the clock speed if clock slowing is enabled, (iii) unblanks the screen 11 if blanking is enabled, (iv) restarts the failsafe timer, and (v) generates an SMI to the CPU, if enabled, at 1240. Thereafter, the routine returns program execution control to the interrupted code, at 1244. The bit set by this routine is then queried by the Supervisor Routine every APM "get event," as detailed elsewhere in this specification.

The timer routine is an interrupt-driven routine beginning at 1248 that executes responsive to the internal timer interrupt, which is based on a 16-bit free-running counter configured to generate the interrupt every 25 milliseconds to provide a time-base for the microcontroller U2. The timer routine provides the following time-bases: 25 milliseconds, half-seconds, seconds, and minutes. In short, this routine receives the interrupt, determines when the various times have occurred, performs the appropriate activity, at 1252, and returns program execution control to the interrupted code, at 1256.

Every tick (every 25 milliseconds), if the power supply is not providing regulated power and the microcontroller is configured to respond to rings, the timer routine checks for an RS-232 ring on the EXT_RING line and SETs a bit if one occurred.

Every half-second while in either the off state or the suspend state, the timer routine determines whether it should toggle the LED 23 to implement the awake on external ring indicator flashing sequence, detailed elsewhere in this specification.

Every second while in either the standby state, the timer routine determines whether it should toggle the LED 23 to implement the suspend indicator flashing sequence, detailed elsewhere in this specification.

Also, every second, the timer routine decrements the failsafe timer, decrements the APM fail-suspend timer, and decrements the power supply fault timer, if appropriate, and SETs a corresponding bit if any have expired. The failsafe timer is a 20-second timer that causes the microcontroller to turn the system power off when it expires. The failsafe timer is frequently restarted (reset) by the Supervisor Routine in response to APM get events; therefore, as long as the code executing on the CPU 40 is executing properly, the failsafe timer never expires. However, if the code ceases executing properly, the failsafe timer expires and, responsive to a press and release of the power button 21, the microcontroller U2 causes the power supply 17 to stop providing regulated power at the ±5 and ±12 lines under the assumption that the BIOS and other routines have failed.

The APM fail-suspend timer is an 18-second timer that is enabled when the switch 21 is in the off/release state (indicating that the user is trying to turn the system off) and that causes the system to attempt to suspend when it expires, hopefully before the failsafe timer expires, causing the microcontroller to turn the system off. Like the failsafe timer, the APM fail-suspend timer is frequently restarted (reset) by the code executing on the CPU 40, e.g., APM Get Events, APM Working on Last Request, and APM Reject Last Request; therefore, as long as the code executing on the CPU 40 is executing properly, the APM fail-suspend timer never expires. However, if the code ceases executing properly, the APM fail-suspend timer expires.

When the APM fail-suspend timer expires, the microcontroller U2 SETs a bit. This bit is checked during each timer level 0 interrupt, which occurs approximately every 55 milliseconds, as is known to those skilled in the art. In addition, the timer level 0 interrupt service routine restarts the failsafe timer. If the timer level 0 interrupt service routine detects that the APM fail-suspend timer has expired, it jumps to the Suspend Routine in an attempt to suspend the system, as described in the text accompanying FIG. 10.

The suspend started by the timer level 0 interrupt service routine is not the preferred method of suspending. Many application programs and adapters are APM aware and perform tasks in response to the system being suspended. A suspend started by the timer level 0 interrupt service routine cannot use APM to indicate to these APM aware entities that a suspend is imminent. Consequently, the system is suspended without these entities being properly prepared. As such, the system will be saved by a suspend started by the timer level 0 interrupt service routine, therefore data in memory will not be lost; however, the user may need to reboot the machine to place the system into its proper state after saving the desired data.

The APM fail-suspend timer is particularly helpful in patching "holes" in the APM driver in the OS. For example, when a Microsoft Windows 3.1 modal dialog box is displayed, the Windows APM driver ceases issuing APM get events. Consequently, if a modal dialog box is displayed when the user presses the power button 21 in an attempt to suspend the system, the system will not suspend. The microcontroller U2 will notice that the switch is in the off/release state, but the Supervisor Routine will not be called because all APM get events have ceased. The switch press will not be acted upon until the modal dialog box is cleared by the user. However, once the APM fail-suspend timer expires and its expiration is detected by the timer level 0 interrupt service routine, the system state will be saved to the extent possible without indicating to APM aware entities that the system is being suspended.

Every minute, the timer routine decrements the minutes to wake alarm timer and the activity timer. When the minutes to wake timer expires, if enabled, the microcontroller causes the power supply 17 to begin providing regulated power at the ±5 and ±12 lines.

After the microcontroller U2 is initialized, the power supply is tested, at 1168, to determine whether the power is off. If the power is still on, the microcontroller 17 checks to see of the power supply 17 is faulted, at 1172. The power supply 17 has several internal protections that cause it to shut down or "fault." The microcontroller U2 determines whether the power supply 17 is faulted as follows: if the microcontroller is operating (indicating that AUX5 is powered, i.e., AC power is being provided to the power supply 17), AND the microcontroller U2 is asserting the ON signal in an attempt to cause the power supply 17 to provide regulated power at the ±5 and ±12 lines, AND the POWERGOOD line is not asserted (indicating that the power supply 17 is not providing regulated power at the ±5 and ±12 lines), then the power supply 17 is faulted and must be reset.

At task 1172, the power supply 17 is actually tested twice. The microcontroller U2 asserts the ON signal and then waits for three seconds, as measured by the internal time-base. If the POWERGOOD signal is not asserted after ON has been asserted for three seconds, then the microcontroller U2 clears the ON signal and waits for another five seconds. Then it asserts the ON signal again and waits for another three seconds. If the POWERGOOD signal is not asserted after ON has been asserted for three seconds, then the microcontroller U2 clears the ON signal deems the power supply 17 faulted.

If the power supply is faulted, the microcontroller U2 jumps to the Power Off Routine, as indicated at 1174. On the other hand, if the power supply is not faulted or is off, the microcontroller causes the power supply 17 to begin providing regulated power at the ±5 and ±12 lines, at 1175, and initializes the I/O ports, turns on the LED 23, and enables external interrupts, at 1176.

Figure 7:
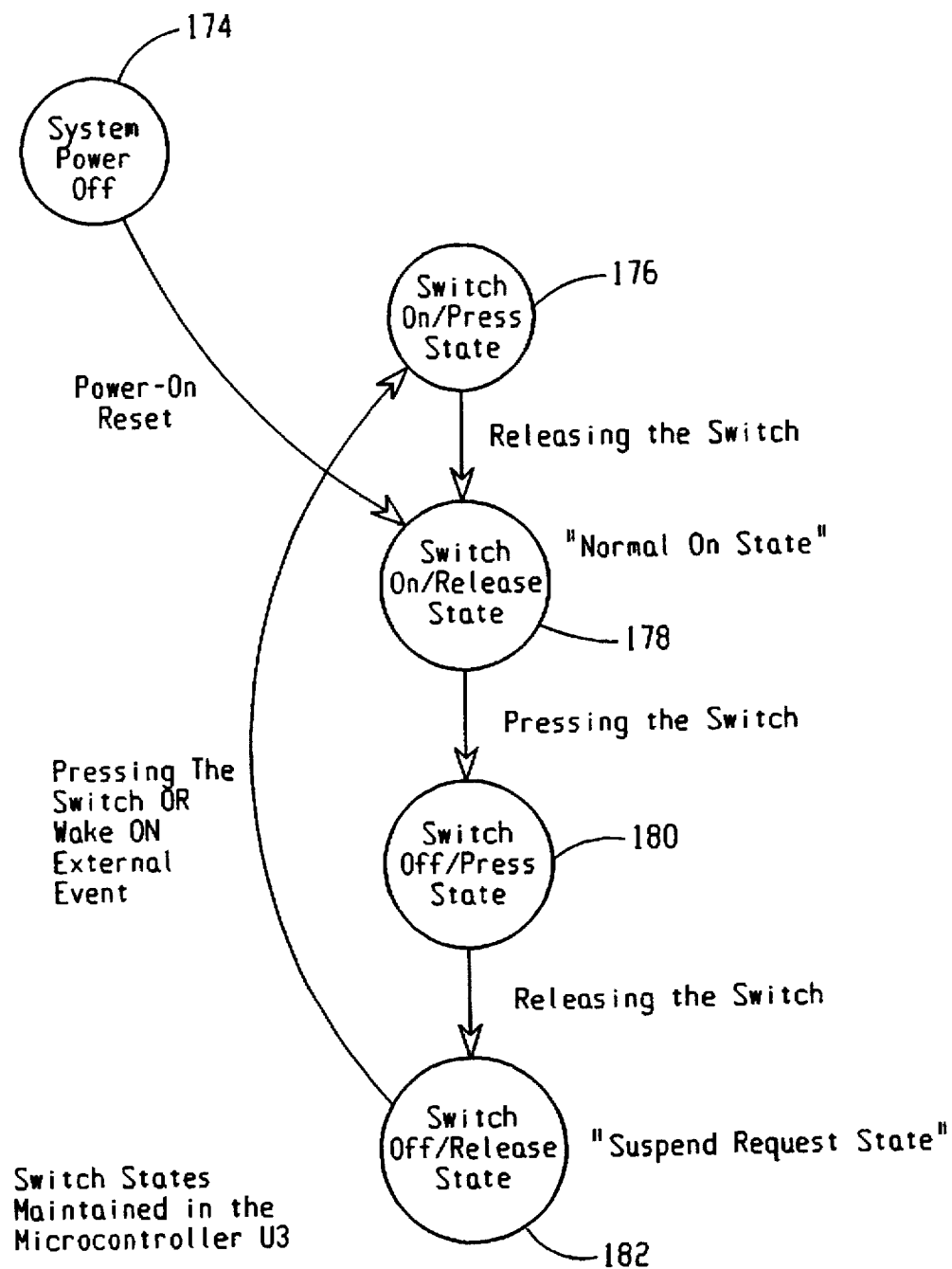
FIG. 7 is a state diagram of one of the switch states maintained by the power management processor of the present invention.

FIG. 7 shows the switch state machine maintained within the microcontroller U2. As shown in that figure, the states change in response to closure events of the switch 21 and other events, such as resetting of the computer system 10 and writes by the CPU 40. With AUX5 not being provided by the power supply 17, the microcontroller U2 is not being powered and, therefore, the switch state is meaningless, at 174. A press of the switch 21, a telephone ring from either source, the minutes to alarm timer expiring, and a command from the CPU 40 cause microcontroller to cause the power supply 17 to begin providing system power, as described in the text accompanying FIG. 6.

As shown in FIG. 7, the switch 21 has four states monitored by the microcontroller U2: (i) the on/press state 176 (in which the user is holding in the button and is trying to turn on the machine), (ii) the on/release state 178 (in which the user has released the button and is trying to turn on the machine), (iii) the off/press state 180 (in which the user is holding in the button and is trying to turn off the machine), and (iv) the off/release state 182 (in which the user has released the button and is trying to turn off the machine). Next, at 1180, the microcontroller U2 tests whether the switch is in the off/release state, indicating that the user has released the button and is trying to turn off the machine.

When in state 182 and the switch 21 is pressed, the microcontroller U2 enters the on/press switch state 176. Releasing the switch 21 causes the microcontroller U2 to enter the on/release switch state 178. Similarly, when the microcontroller U2 is reset, the microcontroller U2 exits state 174 and enters the on/release state 178. Pressing the switch 21 again causes the microcontroller U2 to enter the off/press switch state 180. Releasing the switch 21 again causes the microcontroller U2 to enter the off/release switch state 182. Subsequent closures of switch 21 causes the microcontroller U2 to cycle through the four states, as shown in FIG. 7. The microcontroller U2 is in the on/release switch state 178 when the computer system 10 is in the normal operating state 150. Application programs will execute while in that state. The system 10 may enter and leave the standby state 152 in that state. This state also corresponds to a user-generated suspend abort request. The off/release switch state is the switch state corresponding to a suspend request by the user. That is, starting with the system in the off state 156, pressing and releasing the switch 21 once places the computer system in the normal operating state 150. Pressing and releasing the switch 21 once again generates a suspend request, which is read by the Supervisor Routine, which is discussed more fully in the text accompanying FIG. 9. Pressing and releasing the switch 21 a third time, before the system 10 is in the suspend state 154, generates a suspend abort request, which is read by the Suspend Routine.

Referring back to FIG. 19, if the user has released the button and is trying to turn off the machine, then the microcontroller U2 jumps to the Power Off Routine, as indicated at 1184.

On the other hand, if the button is in the off/press state, indicating that the user is holding in the button and is trying to turn off the machine, then, the microcontroller tests whether the switch has been masked by the BIOS, at 1192. The BIOS masks the switch 21 once on entry into standby to prevent a switch press from forcing the system from the standby state to the suspend state, to prevent user confusion, as explained elsewhere.

If the switch 21 has been masked by the BIOS, then the microcontroller code jumps back to task 1176 and clears the mask bit to allow the next switch press to cause the system to enter either the off state or the suspend state. On the other hand, if the switch 21 has not been masked, or if the switch 21 is not in the off/press state, the microcontroller executes the heartbeat routine, at 1196.

The heartbeat routine is used to indicate to the CPU 40 that the microcontroller U2 is functioning properly. The CMD_STATE# line output of the microcontroller (pin 17, P1.4) is normally a logical ONE. Every 50–60 microseconds, the microcontroller U2 pulls that line to a logical ZERO for approximately 1.5 microseconds and then raises it back to a logical ONE. Since the power management status port read by the CPU 40 is the logical AND of the CMD_STATE# and PROC_RDY lines, this transition from HIGH to LOW and back to HIGH can monitored every so often by the CPU 40, e.g., as the system boots, to ensure the microcontroller U2 is functioning properly.

Next, the microcontroller U2 tests whether the BIOS has commanded a power-off, at 1200. The CPU 40 can access and alter virtually every variable in the microcontroller U2. If the BIOS has set the variable indicating that the system should be powered off, as e.g., after the state of the system is written to the hard drive 31 during a suspend, the microcontroller U2 jumps to the Power Off Routine, as indicated at 1204.

On the other hand, if the BIOS has not commanded a power off, then the microcontroller executes the Failsafe Routine, at 1208. The failsafe timer is a 20-second timer that is enabled when the power supply 17 is providing regulated power at the ±5 and ±12 lines. This routine checks whether the failsafe timer has expired and SETs a bit if it has. This routine also restarts the failsafe timer if commanded by the BIOS to do so.

Next, at 1212, as a safety measure and to synchronize the microcontroller to the power supply 17, the microcontroller checks the POWER_GOOD line to detect whether the power supply 17 is still providing regulated power at the ±5 and ±12 lines.

If the power supply 17 is not providing regulated power at the ±5 and ±12 lines, then the microcontroller U2 jumps to the Power Off Routine, as indicated at 1216. On the other hand, if the power supply 17 is providing regulated power at the ±5 and ±12 lines, then the microcontroller code jumps back to task 1180 and continues execution.

The Power Off Routine begins at task 1260. First, the microcontroller U2 disables the activity interrupt at 1264 to prevent the display from being unblanked.

Next, at 1268, the microcontroller checks the POWER_GOOD line to detect whether the power supply 17 is still providing regulated power at the ±5 and ±12 lines. If the power supply 17 is providing regulated power at the ±5 and ±12 lines, then the microcontroller U2 tests whether the display should be blanked and/or the LED 23 turned off, at 1272. If so, the microcontroller U2 causes the video controller 56 to cease generating the video signals and/or turns off the LED 23.

Thereafter, or if the LED and display are not to be blanked, the microcontroller next tests whether (i) the BIOS has commanded that the system should be turned back on by setting a bit, or (ii) the user has commanded that the system should be turned back on by pressing the power button 21 again. If either of these have occurred, then the system is to be powered back up and the microcontroller U2 jumps to the Power On Routine, as indicated at 1284.

Next, the microcontroller determines whether a ring has occurred at the EXT_WAKEUP# line from the optoisolator OPTO1. With the RS-232 line this involves merely checking if the EXT_RING line is HIGH. For the signal from the optoisolator OPTO1, this involves more checking by the microcontroller U2. The EXT_WAKEUP# line is normally pulled HIGH by the resistor R5. The optoisolator OPTO1 pulls this line LOW when the voltage across Tip and Ring is higher than the voltage threshold set by the threshold and protection portion 905, e.g., 60 V, as when the telephone line rings. However, this condition can also be met when the phone line is tested or from noise on the line. Therefore, merely waiting for a LOW at the EXT_WAKEUP# line might permit a false "ring" to awaken the system.

Consequently, the microcontroller determines whether the signal is a ring by measuring the frequency of the ring. A ring within standards is a signal between 16 Hz to 58 Hz. The microcontroller U2 measures the three periods of time between four rising edges of the EXT_WAKEUP# signal and if all three correspond to a frequency of between 15.1 Hz and 69.1 Hz, the microcontroller U2 deems that a proper ring has occurred at that line and SETs a corresponding bit.

The checking routine is started by a LOW being detected at the EXT_WAKEUP# line. If that line is LOW for three consecutive reads, then the microcontroller U2 waits for the line to return HIGH for three consecutive reads. Immediately thereafter, the 16-bit counter that forms the basis for the timer interrupt is read and the value stored and the microcontroller U2 waits for the line to transition LOW for three consecutive reads. The microcontroller next tests whether the time between the first two rising edges is between 15 milliseconds and 66 milliseconds, indicating that the signal is between 15.1 Hz and 69.1 Hz. If so, the high-resolution counter is sampled again and the microcontroller calculates the difference between the two counter samples as it waits for the next LOW to HIGH transition. The process repeats for the next two LOW to HIGH transitions on the EXT_WAKEUP# line. If all three periods of time are within the range, then the microcontroller U2 deems that a proper ring has occurred at that line and SETs a corresponding bit. If there is no LOW at the EXT_WAKEUP# line or if any of the periods of time are out of that range, the microcontroller code continues without setting the bit.

Next, the microcontroller tests whether there has been a ring or the minutes to wake alarm has expired, at 1286. For the RS-232 ring, the optoisolator ring, or the minutes to wake alarm, this involves the microcontroller U2 testing whether the associated bit is SET.

If either there has been a ring or the minutes to wake alarm has expired, then the system is to be powered back on and the microcontroller U2 jumps to the Power On Routine, as indicated at 1287.

Thereafter, at 1288, the microcontroller tests whether the power supply 17 is providing regulated power at the ±5 and ±12 lines. If not, the code jumps back to task 1280 and begins the loop again. On the other hand if the power supply 17 is providing regulated power at the ±5 and ±12 lines, then the microcontroller U2 executes the heartbeat routine, at 1292, and the failsafe routine, at 1296. These two routines were discussed in the text accompanying tasks 1196 and 1208, respectively.

The microcontroller U2 only causes the power supply 17 to stop providing regulated power at the ±5 and ±12 lines under three situations: (i) the BIOS has commanded an immediate power-off, which is implemented in the communications routine, (ii) the failsafe timer has expired, or (iii) the user presses the power button and the Suspend Enable flag in the microcontroller U2 is not SET, a condition for which the microcontroller U2 tests every time the SWITCH input is read. Therefore, the microcontroller tests whether the failsafe timer has expired, at 1300. If not, the code jumps back to task 1280 and begins the loop again.

On the other hand, if the failsafe timer has expired, indicating that the system is to be powered down, the microcontroller U2 generates an SMI to the CPU 40, at 1304, if enabled. This allows the CPU to perform certain tasks under the assumption that the system is going to be powered off immediately thereafter. For example, the CPU 40 recalculates and writes to the microcontroller U2 an updated minutes to wake alarm value.

If no further action is taken by the CPU 40, the microcontroller powers off the system after a programmable SMI timer expires. The CPU 40 can extend this period of time by restarting the SMI timer by writing an appropriate value to the microcontroller U2.

Thereafter, and if the test at 1268 indicates that the power supply is not supplying good power, the microcontroller U2 powers the system down, at 1308. This involves (i) causing the power supply 17 to stop providing regulated power at the ±5 and ±12 lines, (ii) disabling the communications interrupt since the CPU 40 is about to lose power, (iii) setting the output ports (except ON) HIGH to minimize their power consumption (SWITCH, EXT_RING, EXT_WAKEUP, etc. can still be read by the microcontroller U2 in this mode), (iv) setting the power-off variable so the remaining routines are aware that the power to the system is off, and (v) changing the switch state to off/release so that the next switch press will turn the system back on.

Thereafter, the code jumps back to task 1280 and begins the loop again, waiting for a ring, for a switch press, for the BIOS to command it to awaken the system, or for the minutes to wake alarm to expire.

System Software

Having described the hardware aspects of the computer system 10 of the present invention, the code aspects remain to be described.

Figure 8:
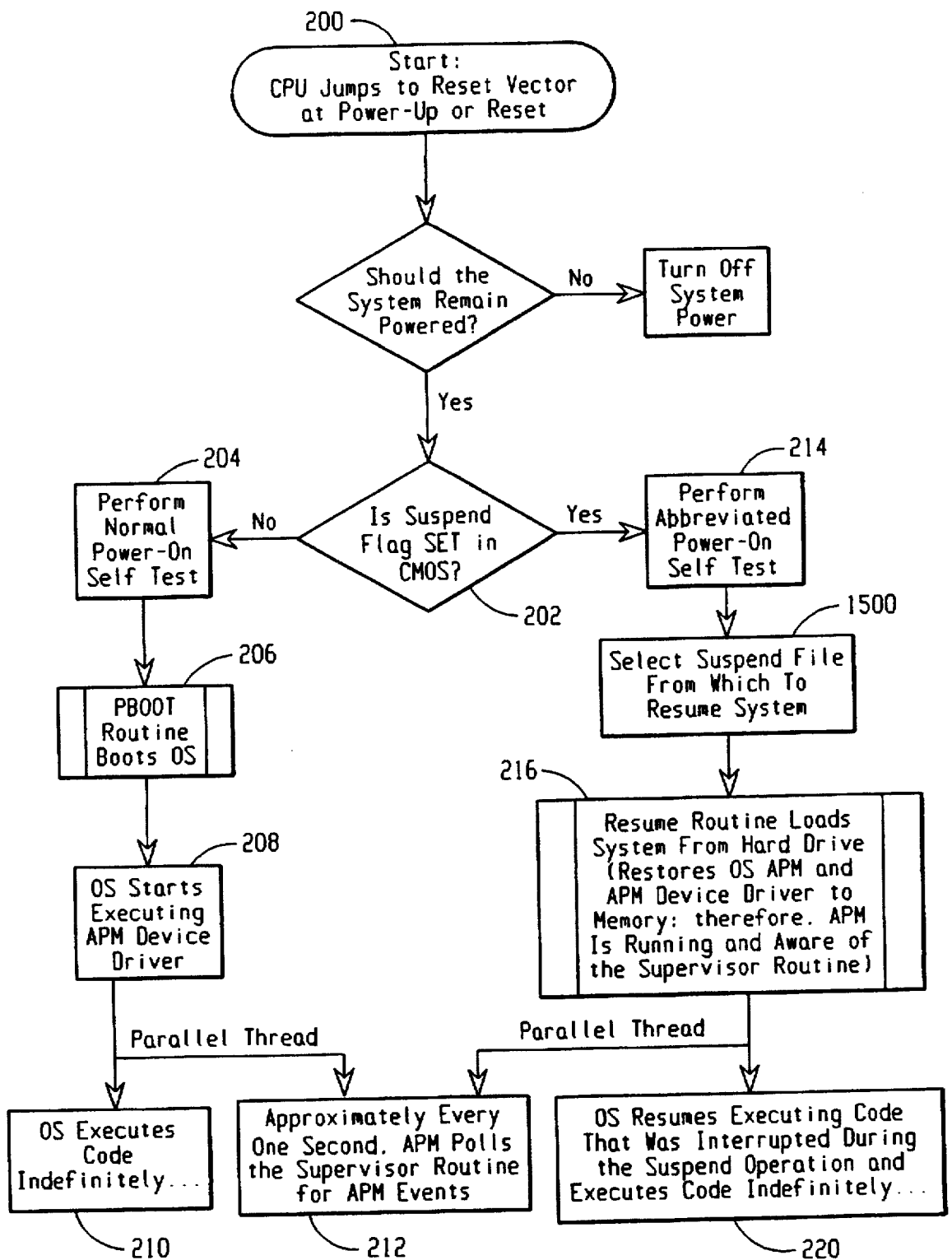
FIG. 8 is a flow chart showing generally the power-up routine of the present invention.

Referring now to FIG. 8, a general overview of the power-up routine is shown. The routine starts at 200 when the CPU jumps to and executes the code pointed to by the Reset Vector. This occurs each time the CPU is powered up and whenever the CPU is reset by either a reset hardware signal or when a RESET instruction is executed by jumping to the code pointed to by the reset vector. Such reset procedures are well known in the art.

First of all, the flow of the Power Up Routine depends on why the machine was powered up. As will be explained in more detail in the text accompanying FIG. 11, the system 10 might have been powered up by a brownout or blackout. As such, it would be improper to allow the system to remain on. Therefore, the Power Up Routine first determines if the system should remain on, at 940. If the system was improperly powered up, then the CPU 40 commands the microcontroller U2 to cause the power supply to stop providing regulated power to the system, at 942.

One test performed in determining whether the system is to remain powered is to confirm that the telephone line is ringing if the system was powered up responsive to what the microcontroller thought was a ring. Specifically, after powering the system up, if the system was awakened in response to a ring, while the system waits for the hard disk within the hard drive 31 to spin up, the CPU 40 queries the modem 900 or 902 which are now fully powered) whether it detects a ring signal as well. If not, then the system powers down. If the modem 900 or 902 also detects a ring signal, then the system is to remain the booting process continues.

Assuming the system is to remain powered, in general, the flow of the Power-Up Routine depends on whether the system is in the off state 156 or the suspend state 154. That is, whether the Suspend Flag is cleared or set, respectively, in CMOS NVRAM 96. As shown at 202, the system 10 determines whether it is in the off state 156 or the suspend state 154 by reading a Suspend Flag from the nonvolatile CMOS memory 96. When the system leaves the normal operating state 150 to either the off state 156 or the suspend state 154, each routine either SETs or CLEARs the Suspend Flag in NVRAM 96. If the Suspend Flag is SET in NVRAM 96, then the computer system 10 is in the suspend state 154 and the state of the computer system 10 was stored in the fixed disk storage device 31. On the other hand, if the Suspend Flag is CLEAR in NVRAM 96, then the computer system 10 is in the off state 156 and the state of the computer system 10 was not stored in the fixed disk storage device 31.

Thus, if the Suspend Flag is SET in NVRAM 96, then the computer executes a "normal" boot routine, shown at tasks 204–210. The first task is the power-on self-test (POST), as shown at 204, which will be explained more fully in the text accompanying FIG. 11; after returning from the POST, the CPU 40 calls the PBOOT routine to load the operating system, as shown at 206.

The PBOOT routine is a typical routine that runs on IBM computers, with slight variations, which will be explained below. PBOOT determines from where to boot (either from the hard drive 31 or from a disk inside the floppy drive 27) and loads the operating system, which analyses and implements system changes as instructed by the CONFIG.SYS file, and finally executes the AUTOEXEC.BAT batch file. The PBOOT routine is well known in the art. The OS loads an APM device driver, which queries the BIOS whether the BIOS is APM aware. If so, the BIOS APM routine and the OS APM routine perform a handshaking and thereafter cooperate to provide the various features described herein. The operating system executes code indefinitely, as instructed by the user, as shown at 210. However, the consequence of informing the API of the Supervisor Routine is that the APM BIOS and APM OS cause the Supervisor Routine to execute in "parallel" with the executing programs, as indicated at 212. That is, the system 10 is a time-multiplexed multitasking system and the APM Get Event, and consequently the Supervisor Routine, are executed periodically. The end result is that the Supervisor Routine is executed approximately every second. The Supervisor Routine will be explained fully in the text accompanying FIG. 9. After the normal boot routine 204–210 is finished, the computer system 10 is in the normal operating state 150, as discussed in the text accompanying FIG. 4.

Figure 22:
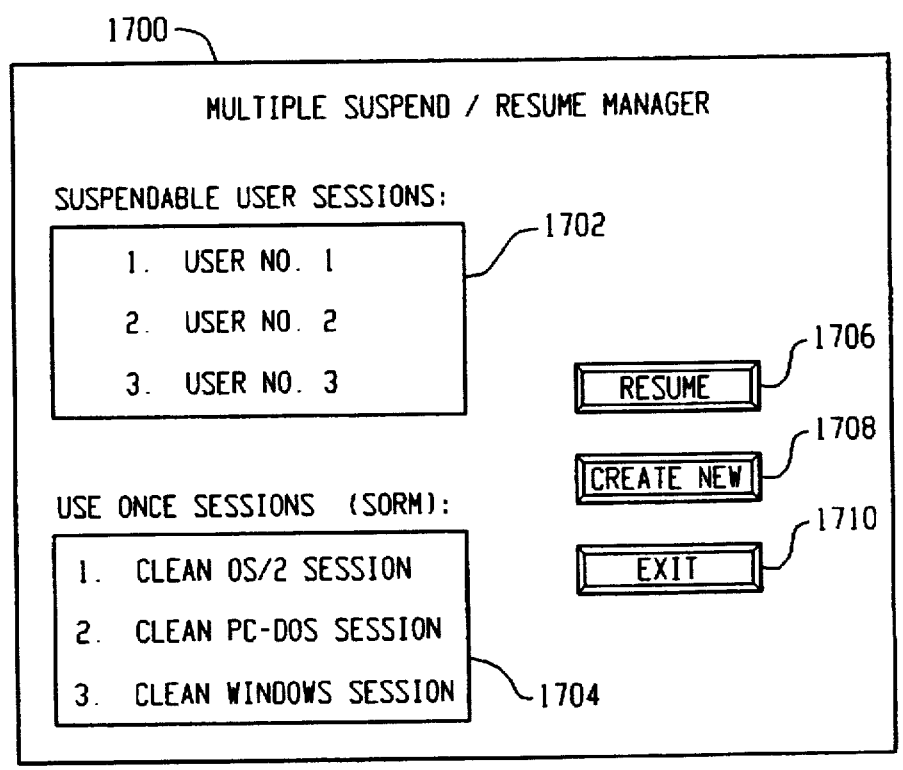
FIG. 22 is an example of a Multiple Suspend/Resume Manager of the present invention used by the user to select from which Suspend File the system should resume.

Referring again to task 202, if the Suspend Flag is SET in NVRAM 96, then the system state was saved to the hard drive 31 and the system 10, performs a resume boot routine, shown at tasks 214–220. First, the system, executes an abbreviated POST, as indicated at 214. The abbreviated POST will be explained more fully in the text accompanying FIG. 11. After the abbreviated POST, the system selects the suspend file from which to resume the system, as shown at 1500. As disclosed herein, the system of the present invention preferably has more than one suspend file. Consequently, the system must determine from which suspend file to resume the system. The suspend file can be selected by a user via the Multiple Suspend/Resume Manager, an example of which is shown in FIG. 22. In addition, the operating system can determine suspend file t suspend file the system will resume, as described herein.

After selecting the suspend file from which to resume the system, the system calls the Resume Routine, as shown at 216. The Resume Routine will be detailed in the text accompanying FIG. 12. Suffice it to say that the Resume Routine restores the state of the computer system 10 back to its configuration before the system 10 was suspended. Unlike the normal boot routine, indicated at tasks 204–210, the resume boot routine does not need to inform the APM API of the existence of the Supervisor Routine, because the APM routine must have been running to suspend the system and when the system state is restored, the APM is loaded back into memory. Thus, when the Resume Routine is finished restoring the state of the system 10, the APM is already in place and running in "parallel" with the restored code, as indicated at 212 and 220. After the resume boot routine 214–220 is finished, the computer system 10 is in the normal operating state 150, as discussed in the text accompanying FIG. 4. Thus, after either the normal boot routine 204–210 or the resume boot routine 214–220 are executed, the computer system 10 is in the normal operating state 150.

FIG. 9 is a flow chart showing the details of the Supervisor Routine, which is called by the APM approximately every second during a "Get Event." Different operating systems will perform a Get Event at different frequencies.

The Supervisor Routine starts at 222 in FIG. 9. The text below assumes that the computer system 10 starts in the normal operating state 150. The first task is to test whether the user pressed the switch 21, at 224. The switch 21 is tested by the CPU 40 querying the microcontroller U2, as described more fully in the text accompanying FIG. 6A and FIG. 7.

If the test at task 224 indicates that the user pressed the switch 21, then the Supervisor Routine next determines whether a Suspend Request was previously issued to the APM device driver in the OS, at 950.

If the test at task 950 indicates that a Suspend Request has not already been sent to the APM driver, then the Supervisor Routine issues a "Suspend Request" to the OS APM device driver, at 226, and then returns to the APM driver, at 228. In response to the SET "Suspend Request" APM Return Code, the APM driver broadcasts the imminent suspend so that APM aware devices can perform any necessary system tasks (such as synching the hard disks) and then issues the "Suspend Command," which causes the APM BIOS Routing Routine to call the Suspend Routine. The Suspend Routine is described in the text accompanying FIG. 10. The Suspend Routine essentially causes the system 10 to leave the normal operating state 150 and enter the suspend state 154 and may return control to the Supervisor Routine after several instructions (if the system is not ready to be suspended) or several minutes, hours, days, weeks, or years later (if the system is suspended and resumed). The Suspend Routine always SETs the "Normal Resume" APM Return Code, whether the Suspend Routine returns without suspending, or returns after a complete suspend and resume.

At task 224, more often than not, the switch 21 was not pressed and the Supervisor Routine then moves on to task 952 to determine if a Critical Suspend Flag is SET. Likewise, if a Suspend Request was previously sent to the APM driver in the OS, then the Supervisor Routine then moves on to task 952 to determine if a Critical Suspend Flag is SET. If the Critical Suspend Flag is SET, then the Supervisor Routine next tests whether a Critical Suspend Request was previously issued to the APM driver, at 954.

If a Critical Suspend Request was not issued to the APM driver, then the Supervisor Routine issues the Critical Suspend Request APM Return Code, at 956, and then returns to the APM driver, at 958. In response to the Critical Suspend Request, the APM driver suspends the system immediately, without broadcasting the imminent suspend; therefore, APM aware devices cannot perform their respective pre-suspend tasks.

If either the Critical Suspend Flag is not SET, at 952, or the Critical Suspend Request was already issued to the APM driver in the OS, at 954, the Supervisor Routine next determines whether a Suspend has been pending for more than 15 seconds, at 957. If so, the Supervisor Routine SETs the Critical Suspend Flag, at 958, thereby causing the test at task 954 to be tested during the next APM Get Event.

Thereafter, or if a Suspend has not been pending for more than 15 seconds, the Supervisor checks to see if a Suspend is pending, at 959. If so, the CPU 40 causes the microcontroller U2 restarts (resets) the failsafe timer and the APM fail-suspend timer, at 960.

Thereafter, or if a Suspend is not pending, the Supervisor Routine next moves on to task 230 to check to see if the system just resumed. If the Suspend Routine is called, then the system thinks it has just been resumed, whether the Suspend Routine returns without suspending, or returns after a complete suspend and resume. The resume is tested at 230 and if the system was just resumed (or the suspend was not performed due to DMA or file activity) a "Normal Resume" APM Return Code is issued at 232 and returned to the APM at 234. In response, the APM OS driver updates the system clock and other values that may have become stale during the interim.

More often than not, the system 10 was not just resumed and the Supervisor Routine then moves on to task 236 to test for any user activity. Three types of user activity are tested at task 236: hardfile 31 activity, keyboard 12 activity, and mouse 13 activity. Every APM Get Event, the Supervisor Routine reads values for the hardfile head, cylinder, and sector from the hard drive 31, queries the microcontroller U2 whether there was any activity on the either the mouse interrupt line or the keyboard interrupt line, either of which indicates user activity, and reads the minutes value from the real-time clock 98, which ranges from 0 minutes to 59 minutes then wraps back to 0 minutes at the start of each hour. The three hard drive activity variables (head, cylinder, and sector) and the minutes value are stored temporarily. The three hard drive activity variables are then compared to the hard drive activity variables saved from the previous Get Event. If the three current hard drive values are the same as the values from the previous Get Event, and if there has been no activity on either the mouse interrupt or the keyboard interrupt, then there has been no user activity. If the hard drive values are different, or there was activity on either the mouse interrupt or the keyboard interrupt, then there has been user activity and the current disk drive activity variable values are saved for comparison to the values read during the next Get Event.

The above activity-detection scheme is such that a routine executes on the CPU to determine hard drive activity and only two hardware interrupts are monitored for activity. Alternatively, activity could be monitored exclusively in a hardware fashion. For example, all the 16 hardware interrupt lines could be monitored for activity.

If there was hardfile, keyboard, or mouse activity, then the Supervisor Routine next determines, at 1502, whether the activity was by the user, or whether the system is being used in an unattended mode, as it would be if it was awakened by a ring or by the alarm. If there was user activity, then the inactivity suspend timer is set to its longer time interval (or the longer timer is activated and the shorter timer is deactivated), at 1504. The step at 1504 is needed to correct the timer length if the user begins using the system after it was awakened in an unattended mode. As discussed in the text accompanying FIG. 11, on one hand if the system is awakened in unattended mode, the shorter inactivity suspend timer interval is used. On the other hand, if the system was awakened due to user activity, the longer inactivity suspend timer interval is used. Thus, step 1504 is needed only if the user begins using the system after it was awakened in an unattended mode. In the alternative, the system can always be awakened with the inactivity suspend timer using the shorter interval and the step at 1504 can be used to correct that approximately each second when there is user activity.

Figure 18:
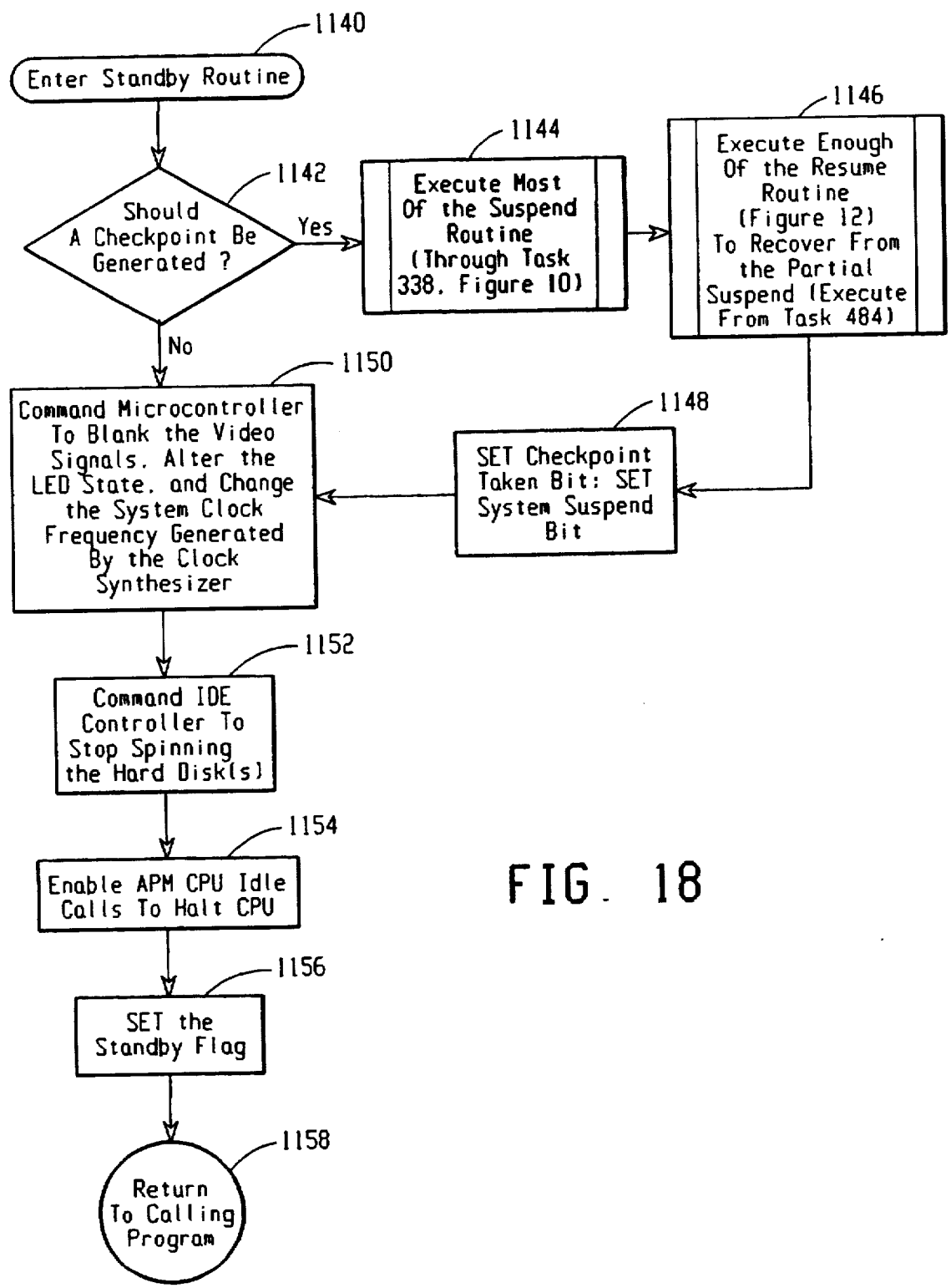
FIG. 18 is a flow chart showing the details of the Enter Standby Routine of the present invention.
Figure 19A:
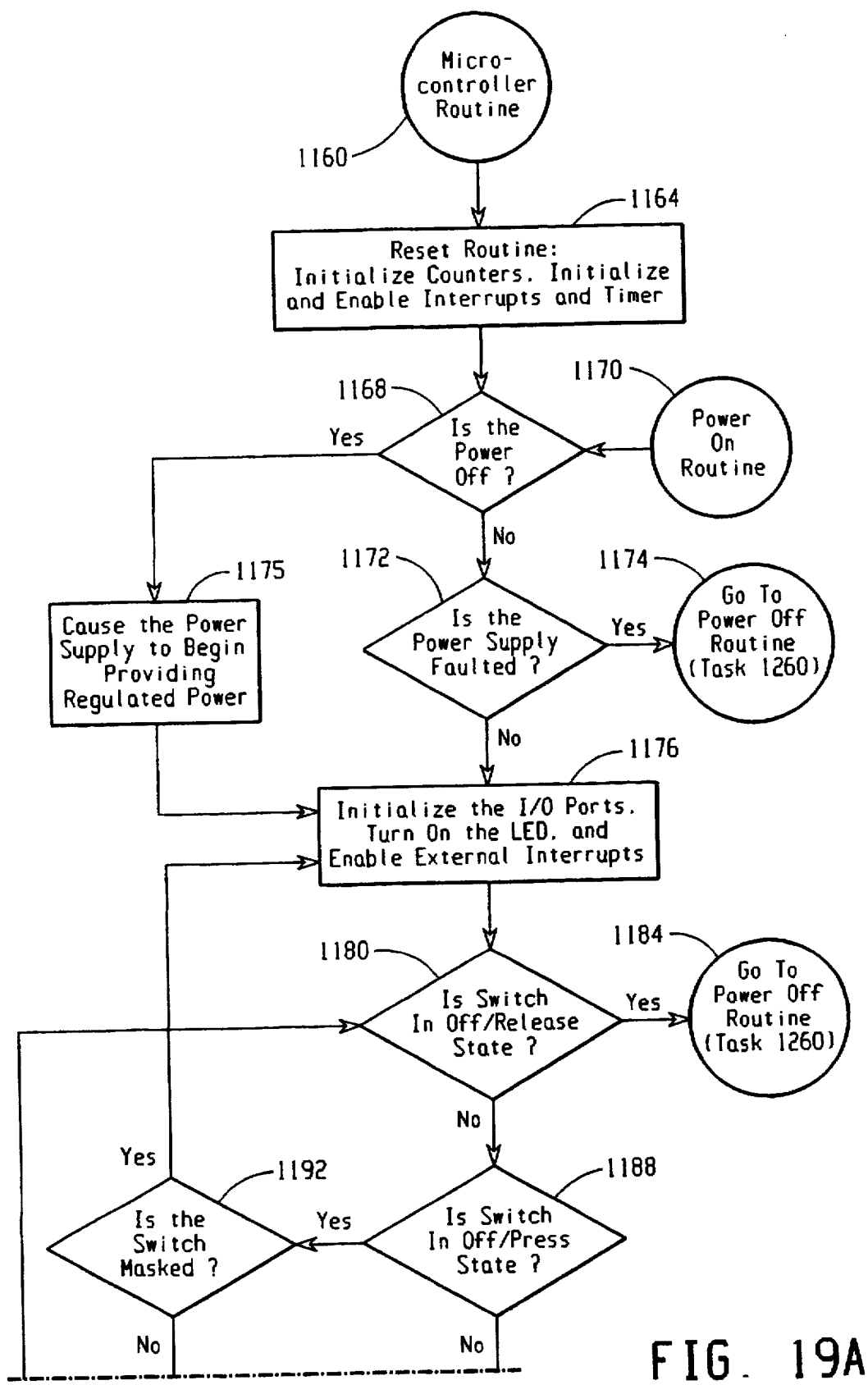
FIG. 19 is a flow chart showing the details of the Power management Processor Routines of the present invention.
Figure 19B:
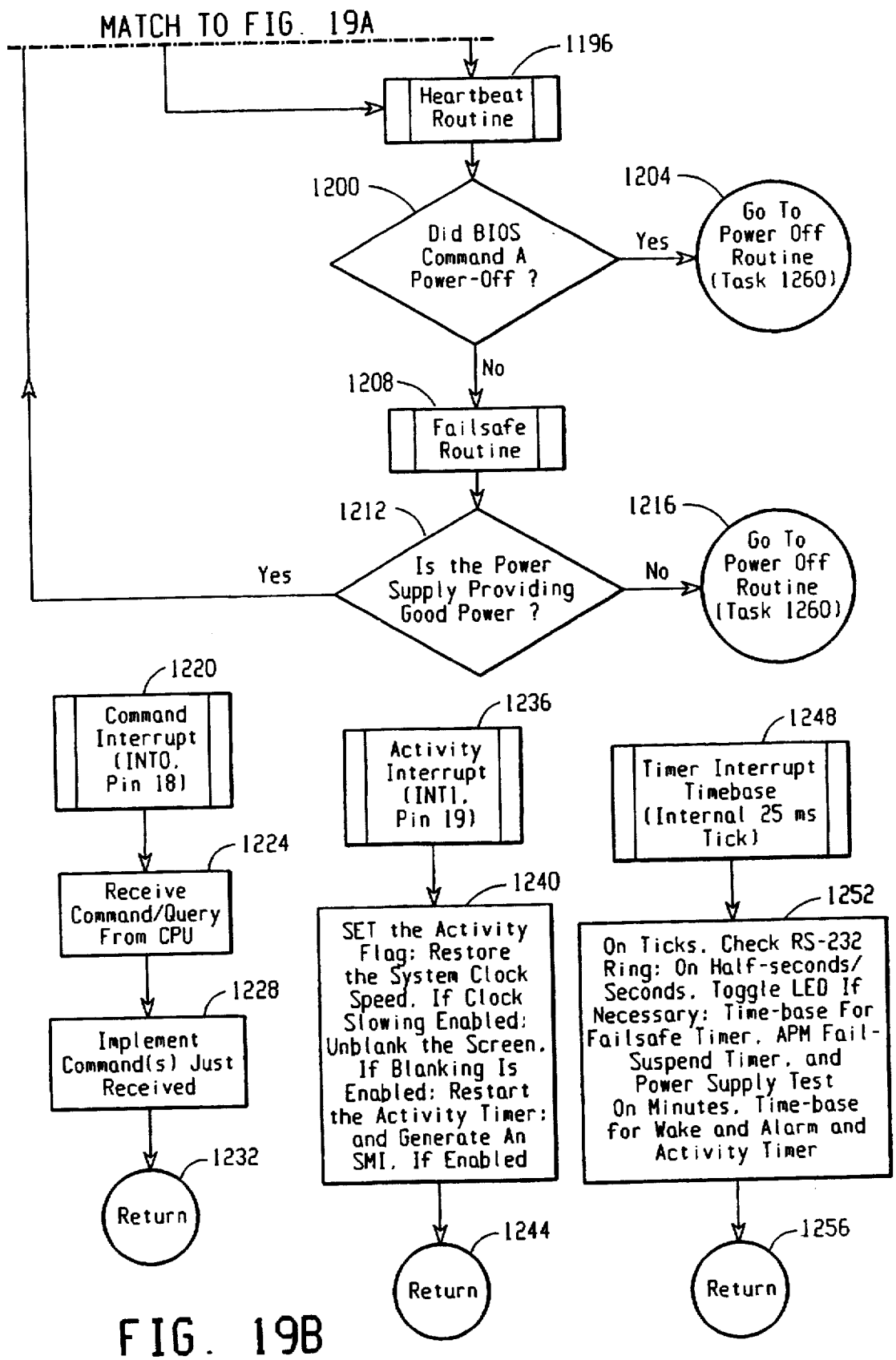
Figure 19C:
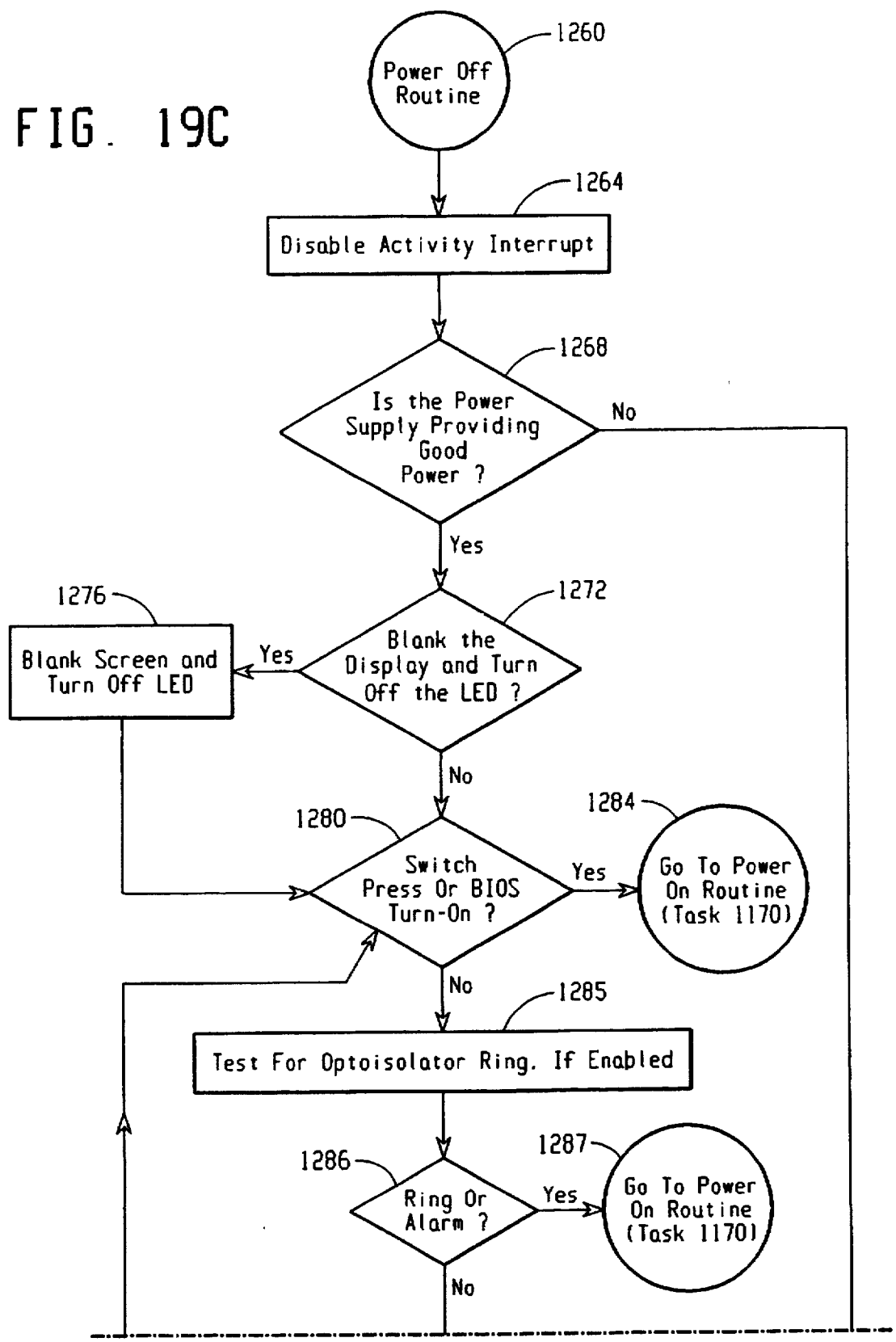
Figure 19D:
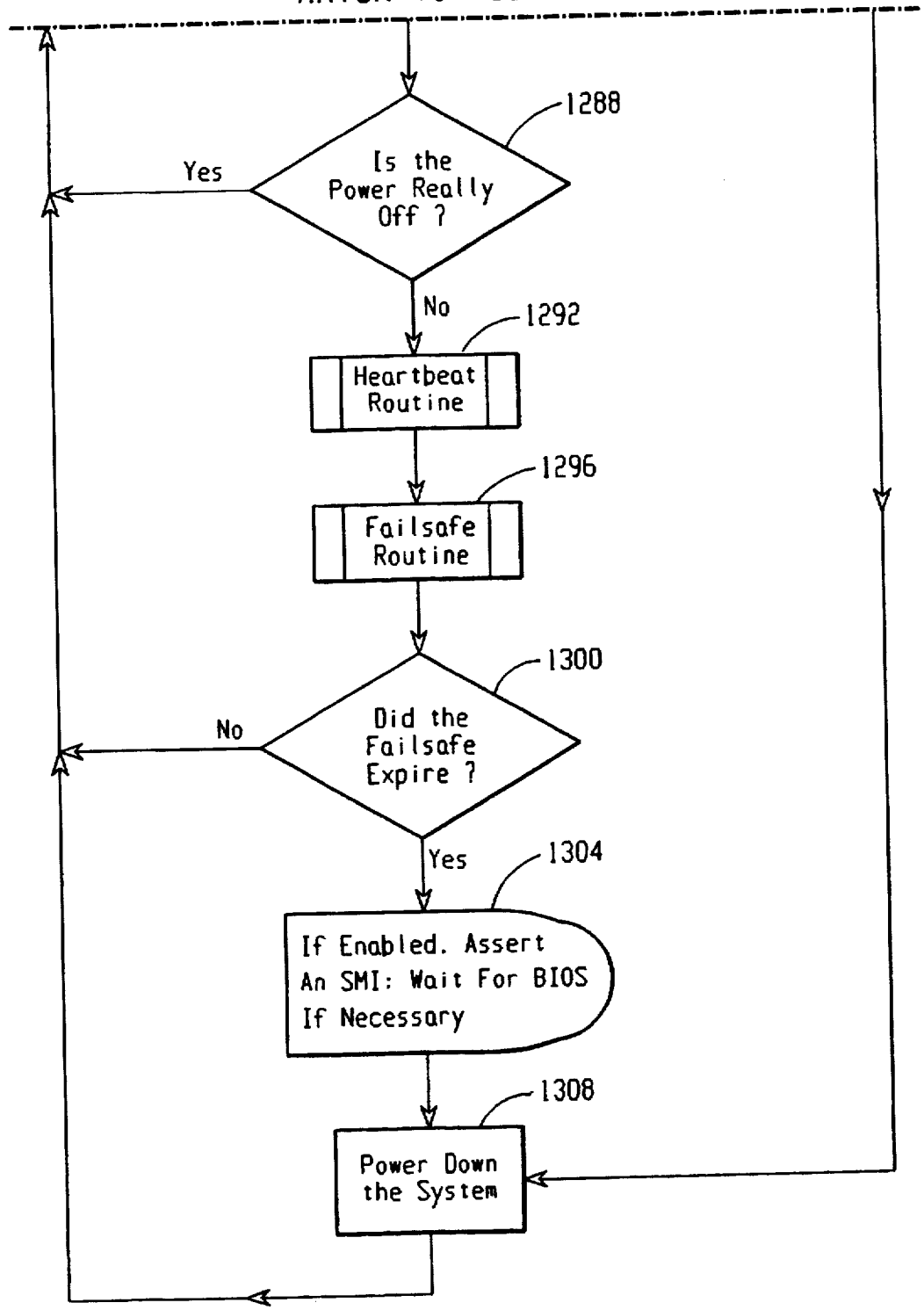

After correcting the interval for the inactivity suspend timer or if there was no user (keyboard or mouse, etc.) activity, then the Supervisor Routine next determines whether the computer system 10 is in the standby state 152 by testing the standby flag, at 238. If the standby flag is SET, indicating that the system 10 is in the standby state 152, then the Supervisor Routine exits the standby state 152 and enters the normal operating state 150, at 240. The Supervisor Routine exits the standby state 152 by powering back up the devices that were powered down when the standby state 152 was entered, as shown in FIG. 18. In short, as the system exits the standby state 152, the Supervisor Routine restores the video signal, spins up the hard disk within the hard drive 31, restores the system clock, disables APM CPU Idle calls so that CPU Idle calls from the APM driver no longer halt the CPU 40, and clears a flag indicating that the system 10 is in the Standby State 152.

Additionally, if there was activity, then the minutes value from the real-time clock 98 is also saved for comparison to the minutes value read during subsequent Get Events. Saving the current minutes value effectively resets the inactivity standby timer and the appropriate inactivity suspend timer, at 241. During normal use, there will be user activity and the Supervisor Routine SETs the "No Event" APM Return Code at 242 and returns to the APM calling code at 243. The APM does not call any more routines in response to the "No Event" Return Code.

If the test at task 236 indicates that there has been no user activity, then the Supervisor Routine next tests if the inactivity standby timer and inactivity suspend timer have expired, at 245 and 247, respectively. If the system 10 is in the standby state 152, then the inactivity standby timer is not checked for expiration; rather, the test is skipped at task 244.

The two timers are checked for expiration by subtracting the current minutes value from the saved minutes value to obtain a value corresponding to the number of minutes since there was user activity. This value is compared to the inactivity standby timeout value, at 245, and the inactivity suspend timeout value, at 247. The two timeout values are selectable by the user and may be set so that the system never enters the standby state 152, never enters the suspend state 154, or never enters either the standby state 152 or the suspend state 154 because of the expiration of one of the timers. Setting either timeout value to zero (0) indicates that the timer should never expire.

If the number of minutes since the last user activity is equal to or greater than the inactivity standby timeout value, then the Supervisor Routine causes the system 10 to enter the standby state 152, at 246. If inactivity standby timer has not expired, the Supervisor Routine next tests the inactivity suspend timer for expiration, at 247. On the other hand, if the inactivity standby timer has expired, then the Supervisor Routine causes the system 10 to enter the standby state 152 by placing certain components into their respective low-power modes, as shown in FIG. 18. In short, in the preferred embodiment, the Supervisor Routine blanks the video signal, spins down the hard disk within the hard drive 31, slows down the system clock, enables APM CPU Idle calls so that CPU Idle calls from the APM driver halt the CPU 40, and sets a flag indicating that the system 10 is in the Standby State 152. After causing the system 10 to enter the standby state 152, the Supervisor Routine tests the inactivity suspend timer for expiration, at 247.

The Supervisor Routine tests if the inactivity suspend timer has expired, at 247. If the number of minutes since the last user activity is equal or greater than the inactivity suspend timeout value, then the Supervisor Routine SETs the "Suspend Request" APM Return Code, at 248, and then returns to the APM, at 243. As described above in the text accompanying task 226, in response to the SET "Suspend Request" APM Return Code, the APM performs any necessary system tasks and then calls the Suspend Routine. The Suspend Routine is discussed more fully in the text accompanying FIG. 10 and, in short, causes the system 10 to leave the normal operating state 150 and enter the suspend state 154. As discussed in the text accompanying task 226, the Suspend Routine may return control to the Supervisor Routine with or without suspending the system 10. On the other hand, if the inactivity suspend timer has not expired, then the Supervisor Routine SETs the "No Event" APM Return Code at 242 and returns to the APM calling code at 243.

Although most often a "No Event" APM Return Code will be returned to the APM, various other events may be returned to the APM. However, only one APM Return Code may be specified for each APM Get Event. For example, after entering the standby state 152, a "No Event" is returned to APM. After leaving the suspend state 154, the "Normal Resume" APM Return Code is returned to the APM. The specific messages queued for APM will depend on the exact nature of the computer system. The Supervisor Routine also returns a "Normal Resume" APM Return Code or a "Suspend Request" APM Return Code.

Figures 9B, 9C:
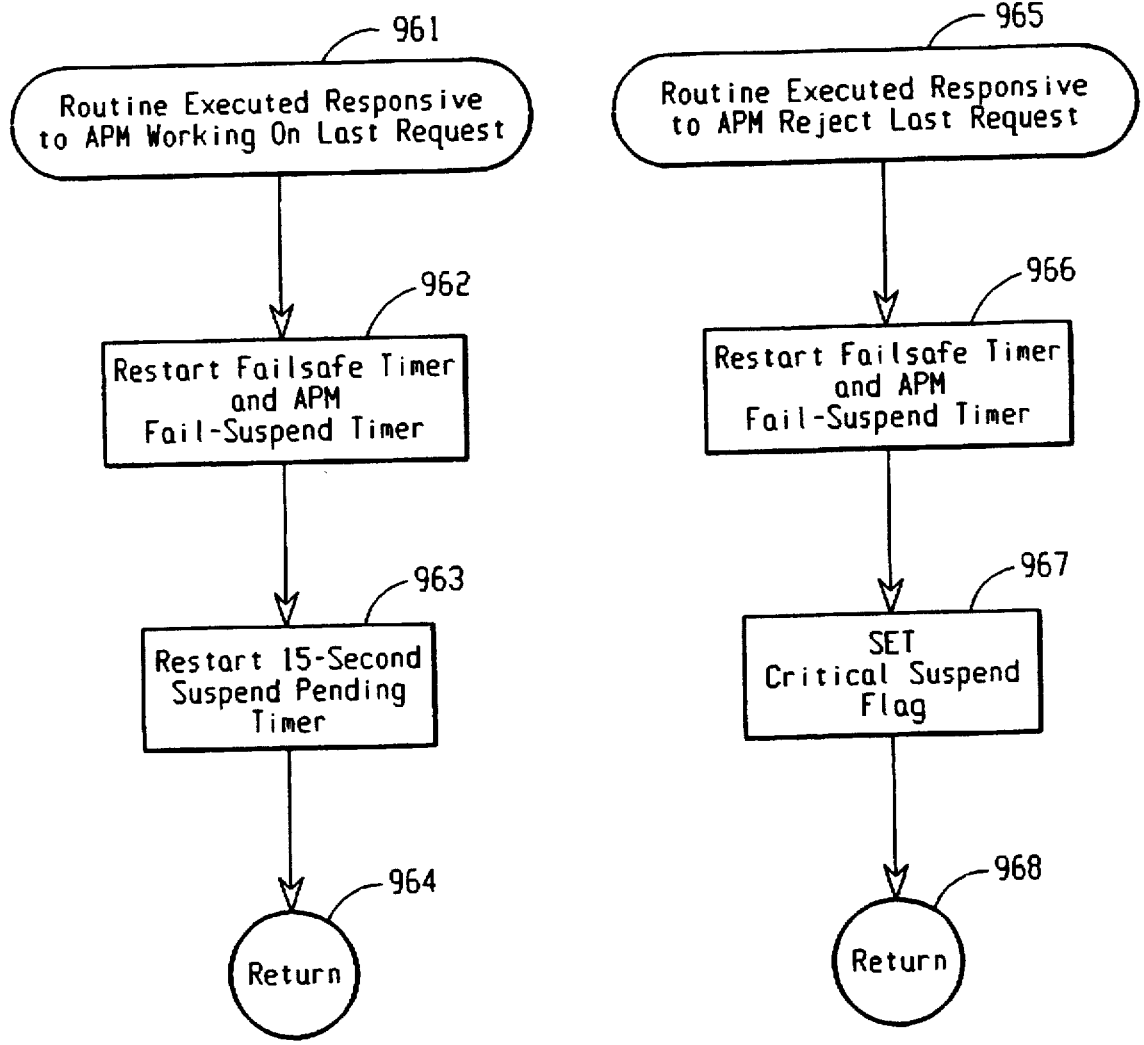
FIG. 9B is a flow chart showing the details of the APM Working On Last Request Routine.
FIG. 9C is a flow chart showing the details of the APM Reject Last Request Routine.
Figure 10A:
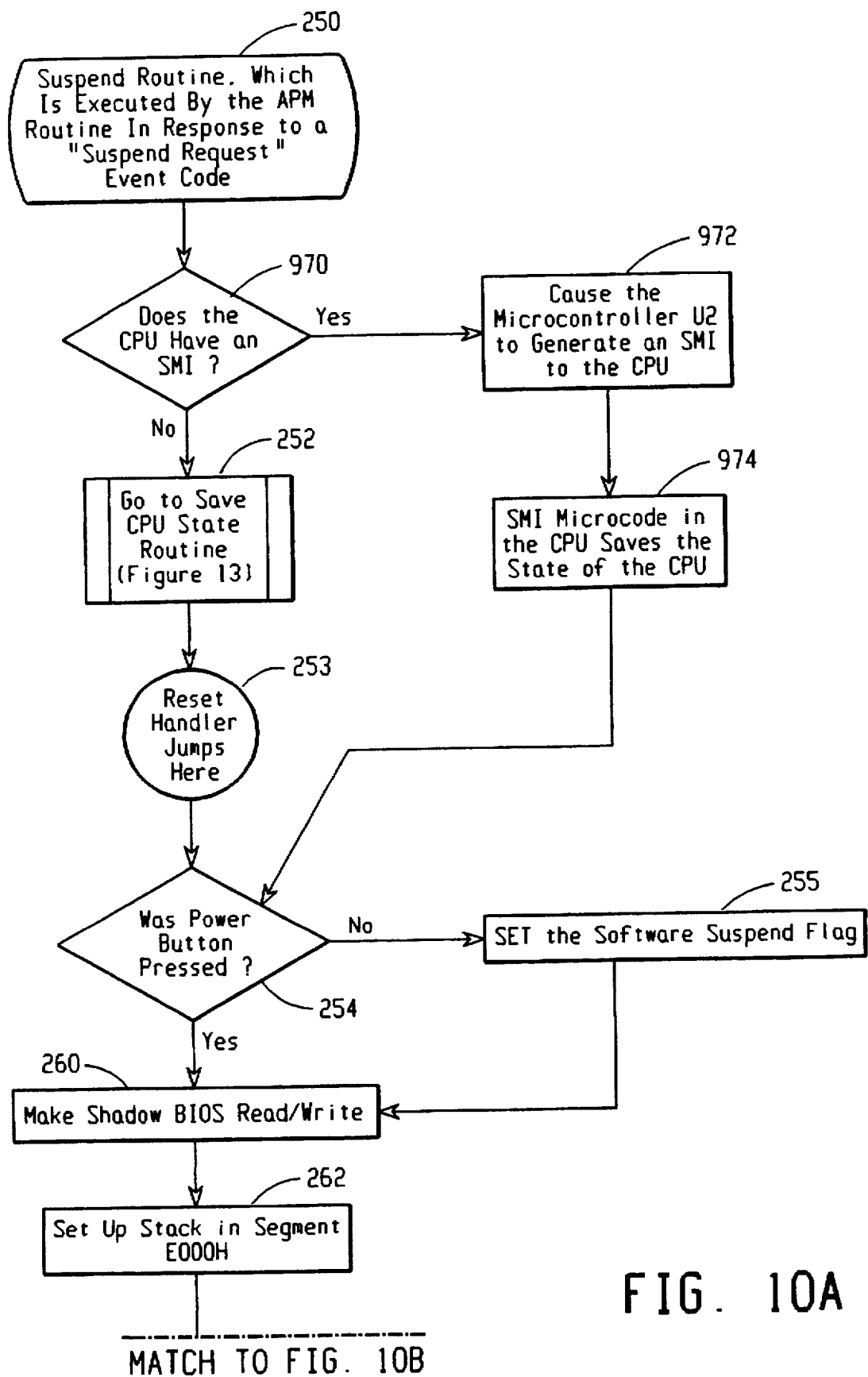
FIG. 10 is a flow chart showing the details of the Suspend Routine of the present invention.
Figure 10B:
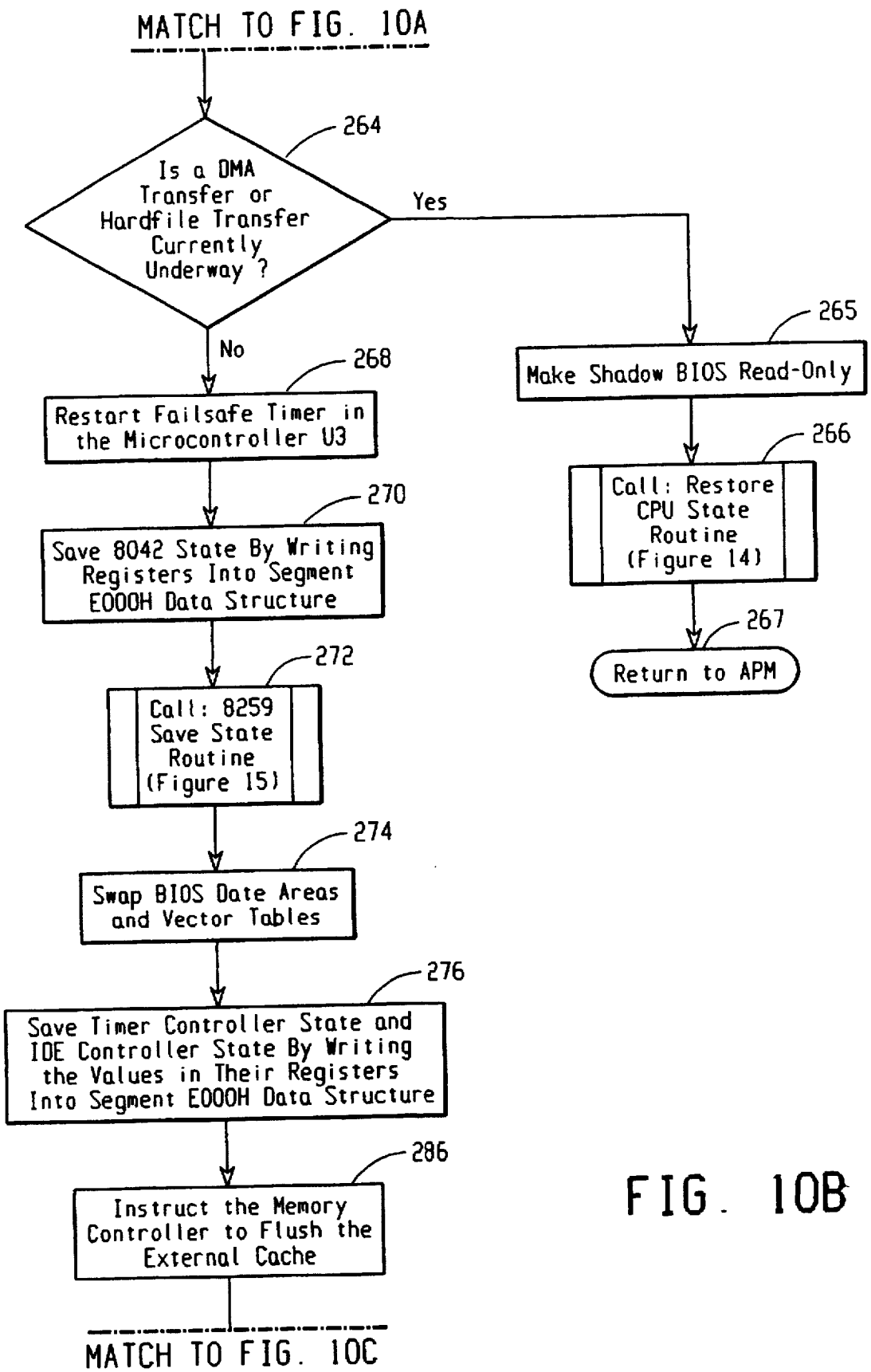
Figure 10C:
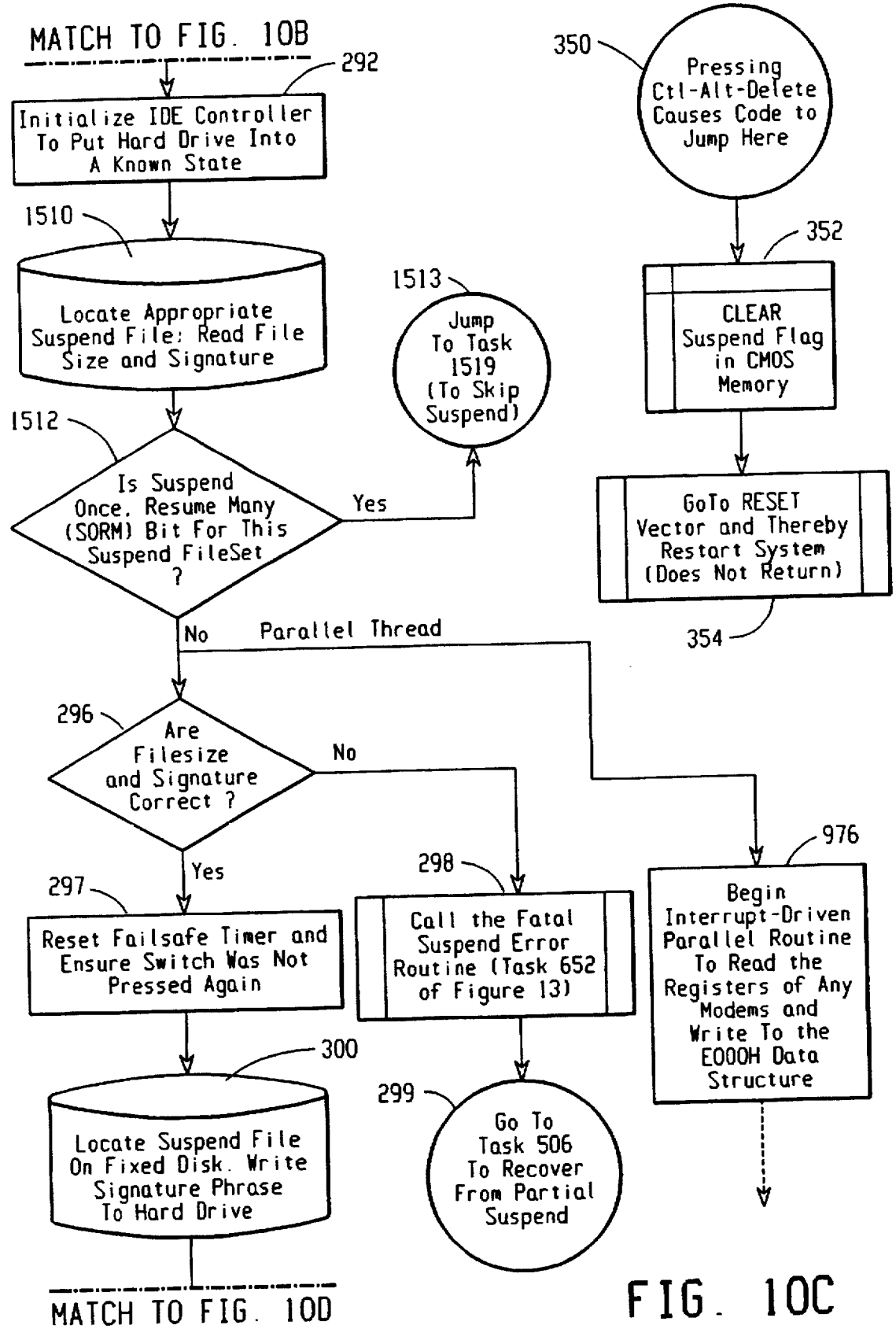
Figure 10E:
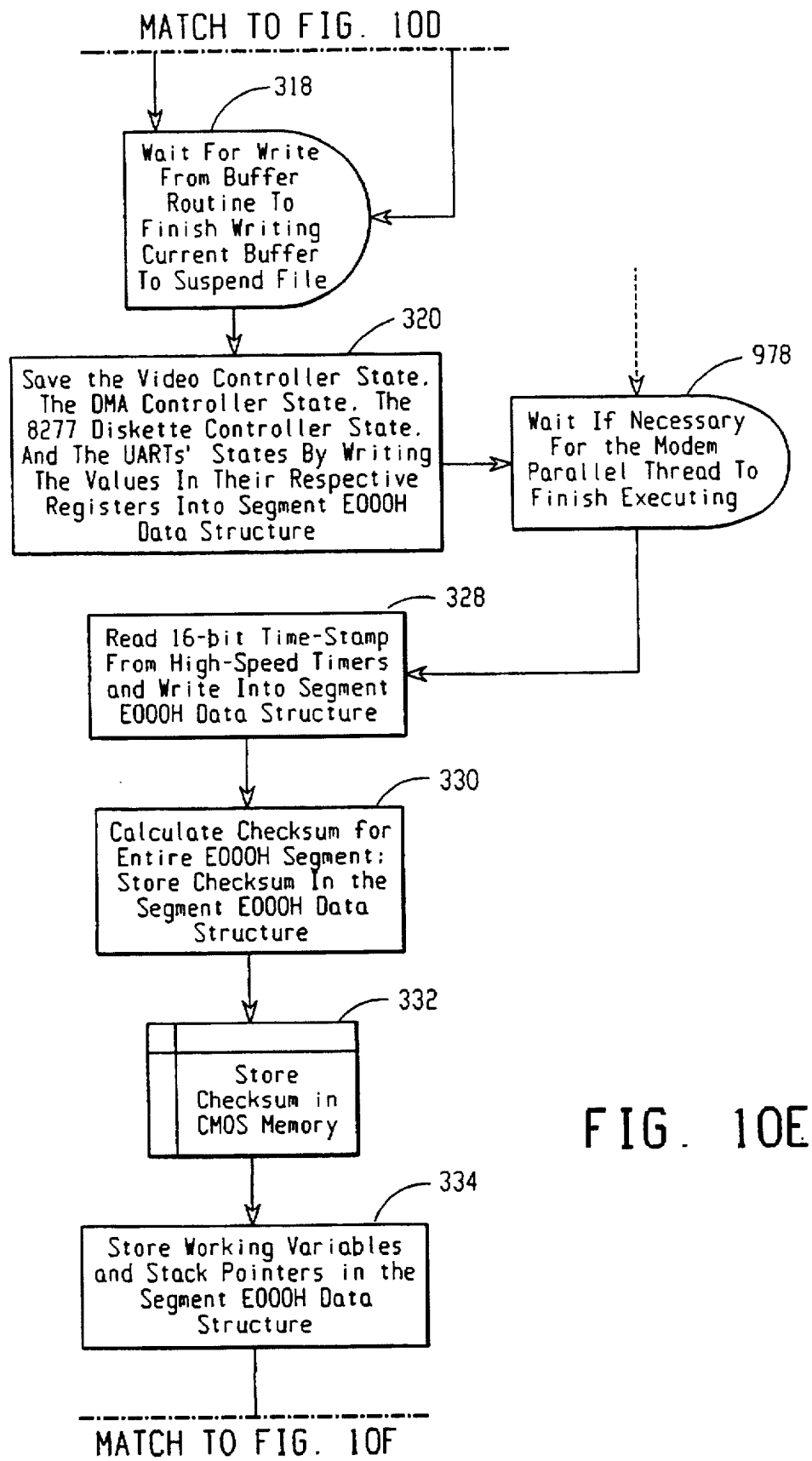
Figure 10F:
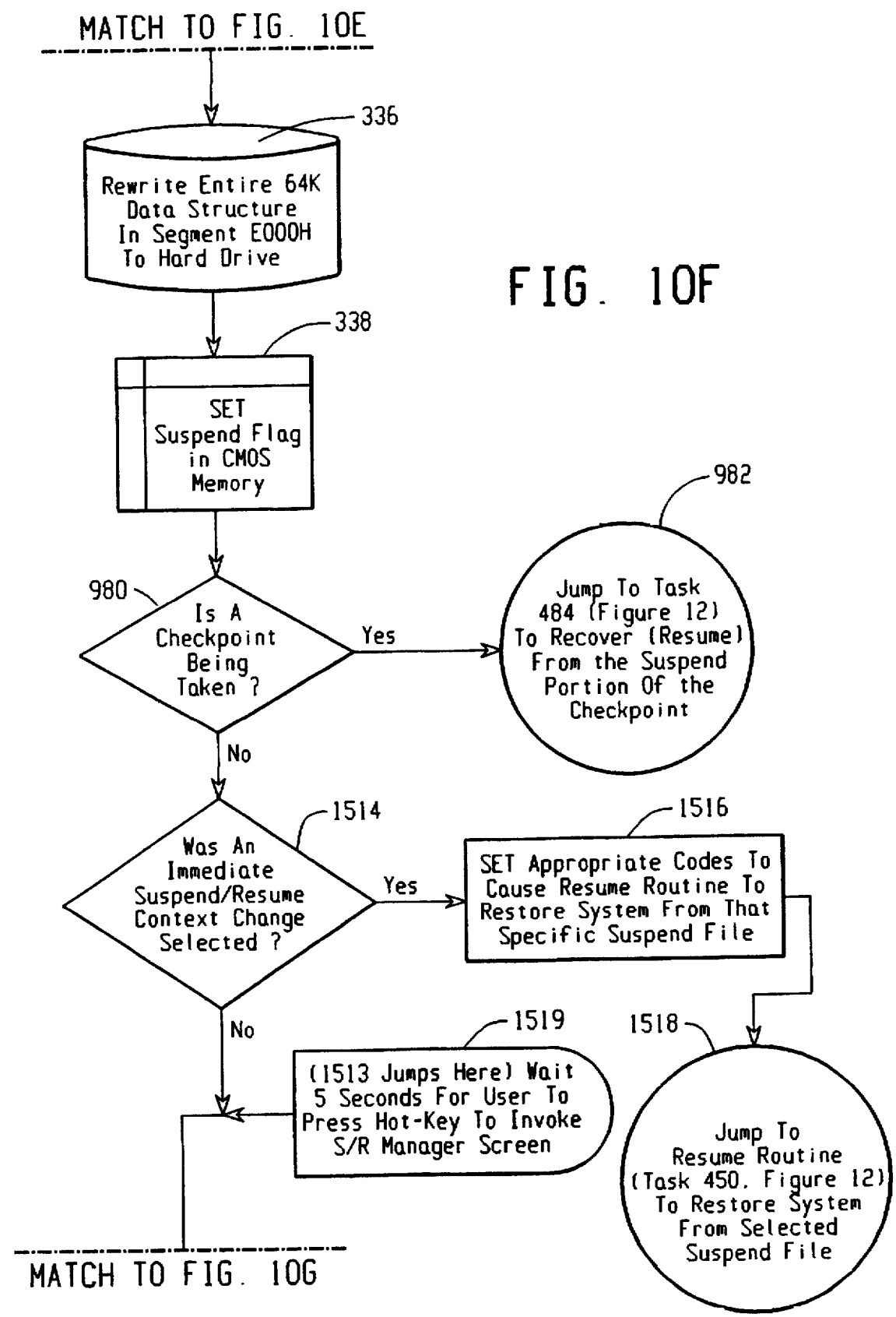
Figure 10G:
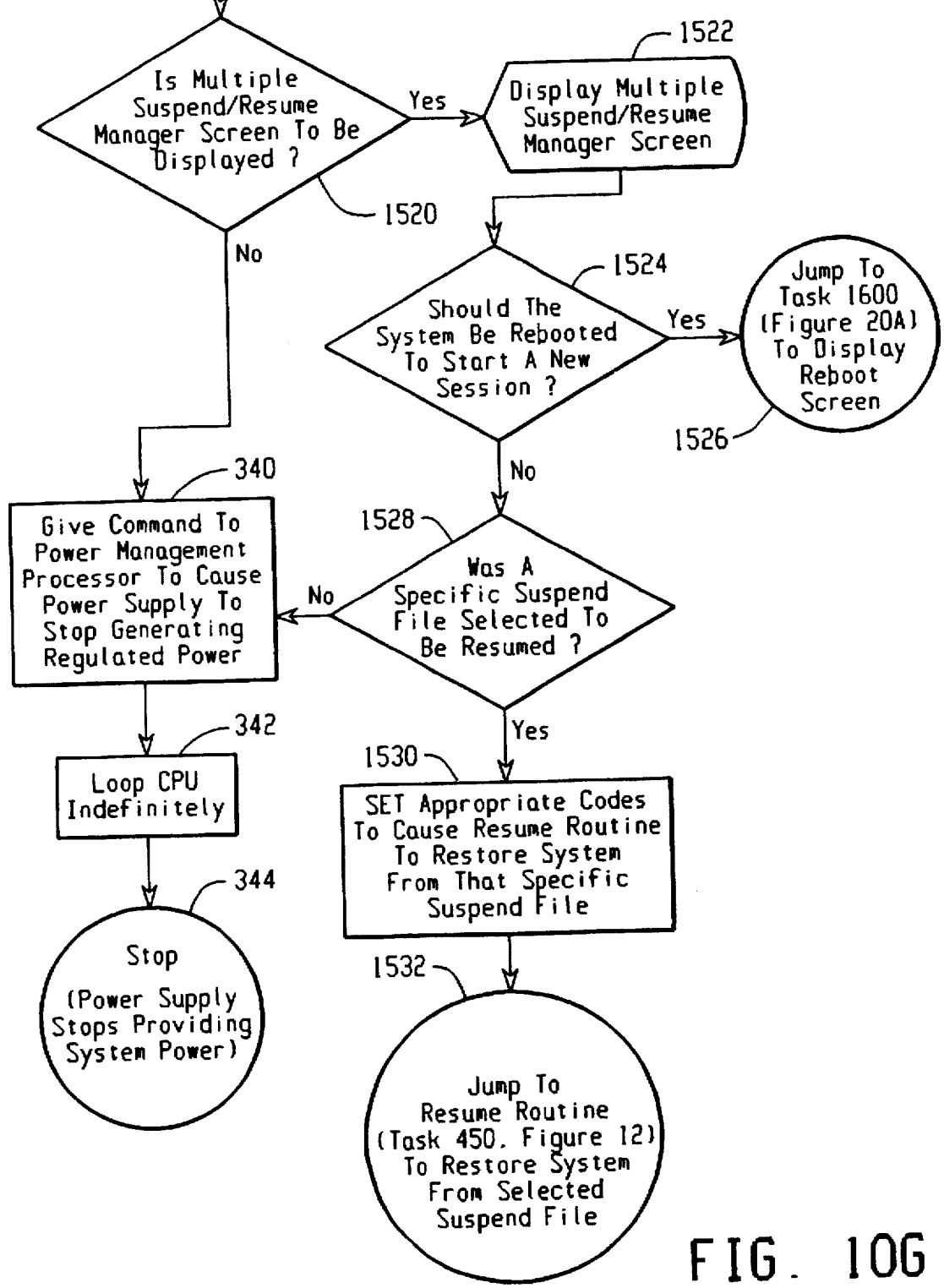
Figure 11A:
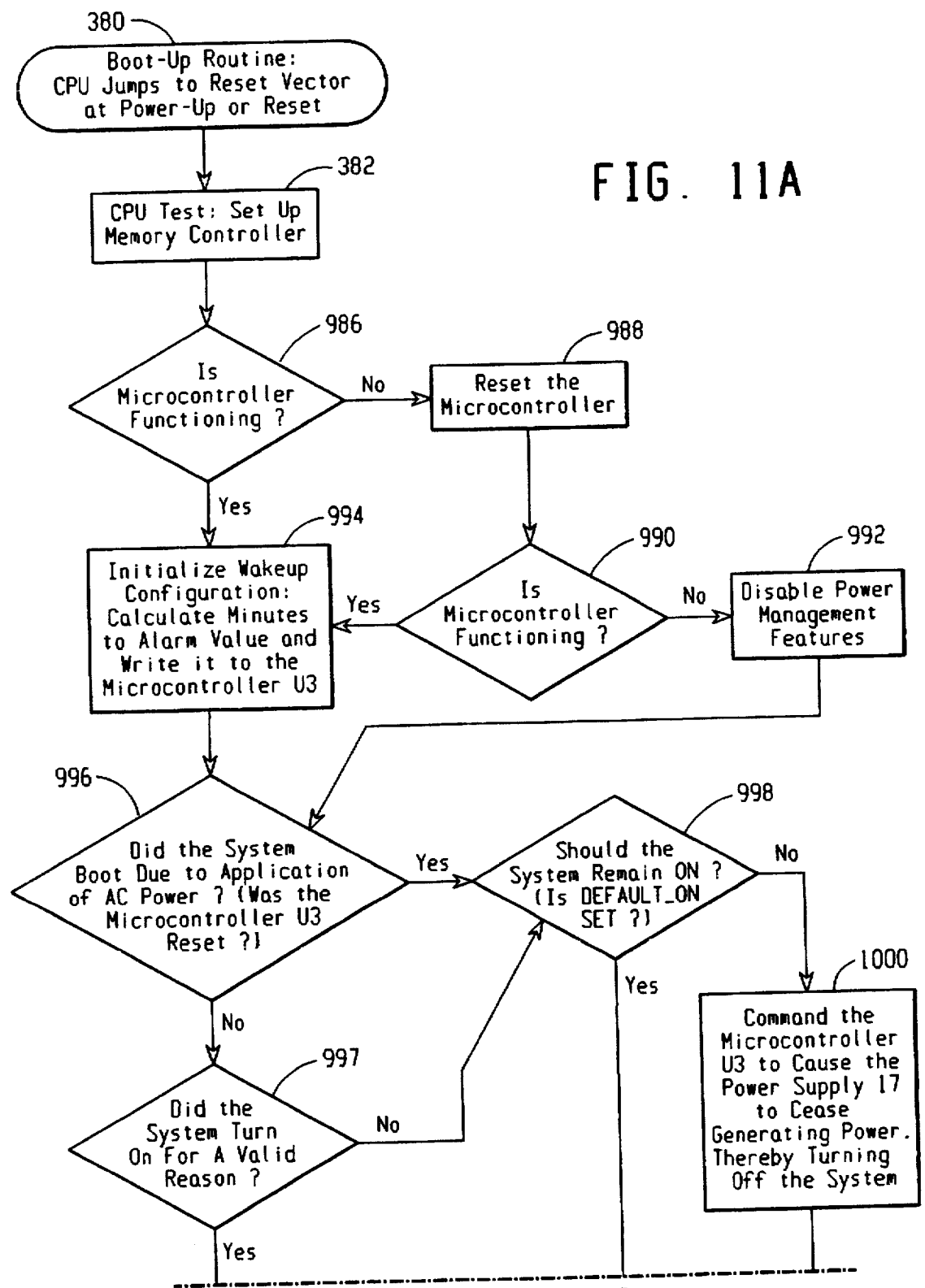
FIG. 11 is a flow chart showing the details of the Boot-Up Routine of the present invention.
Figure 11B:
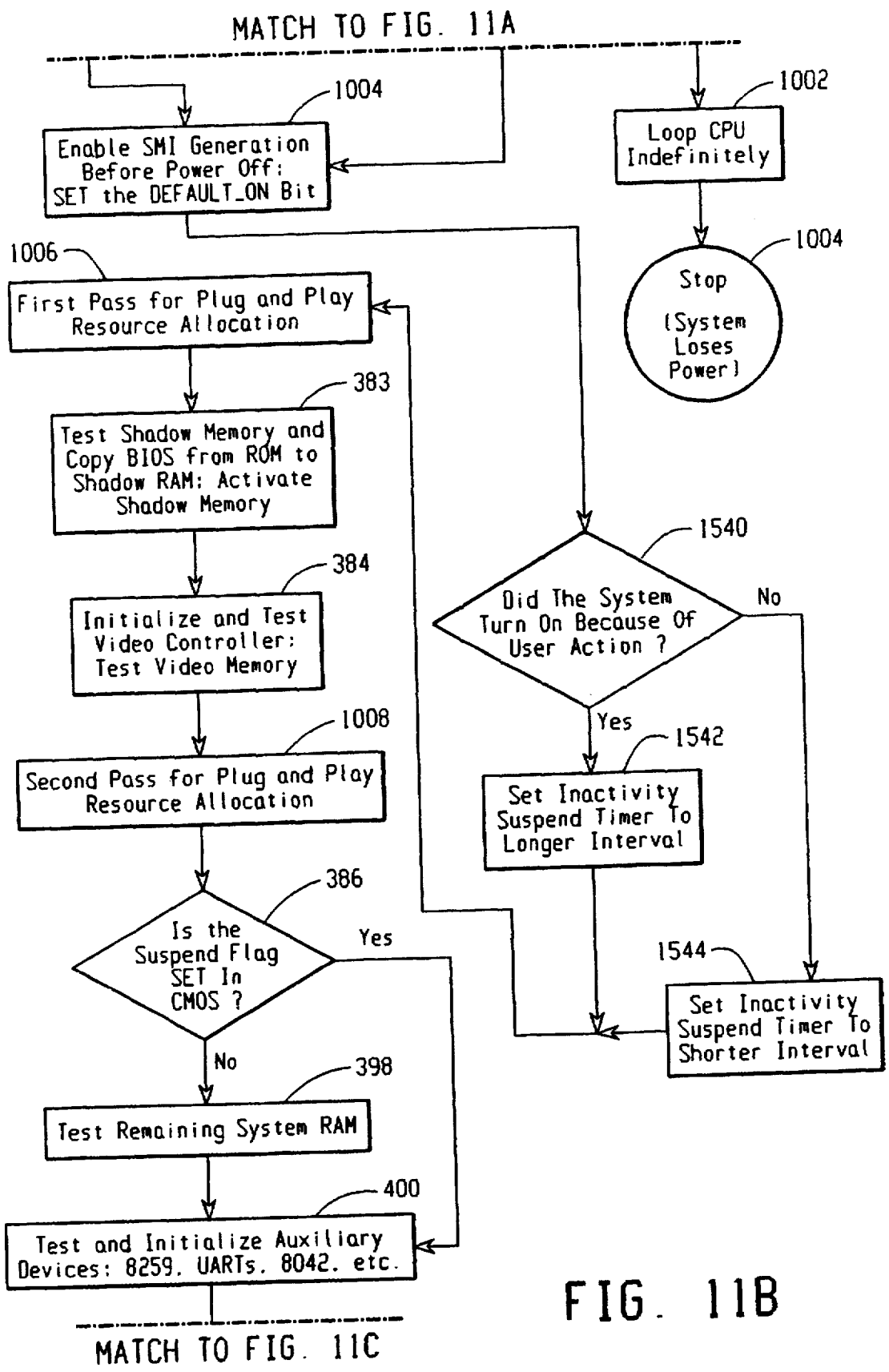
Figure 11C:
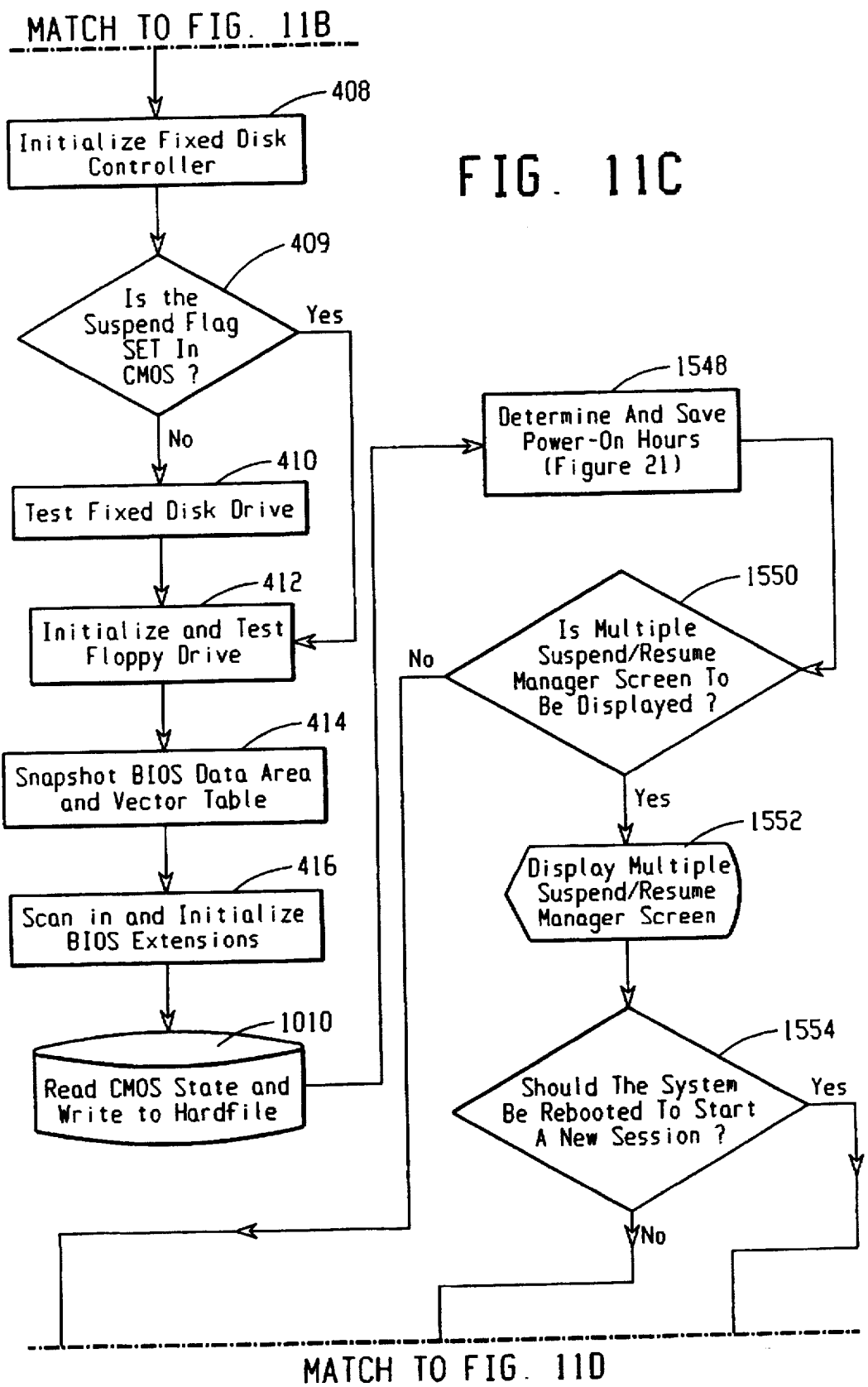
Figure 11D:
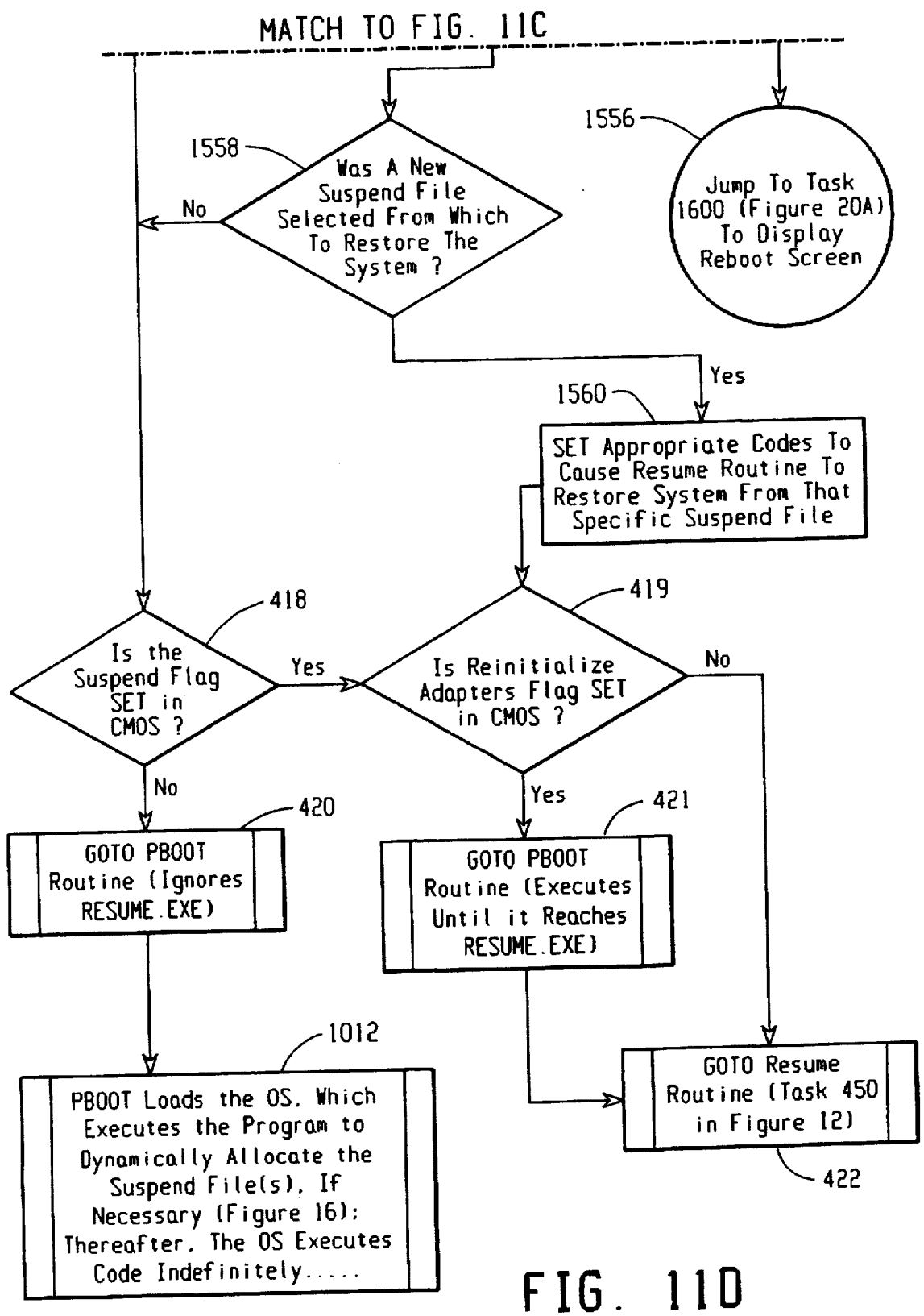
Figure 12A:
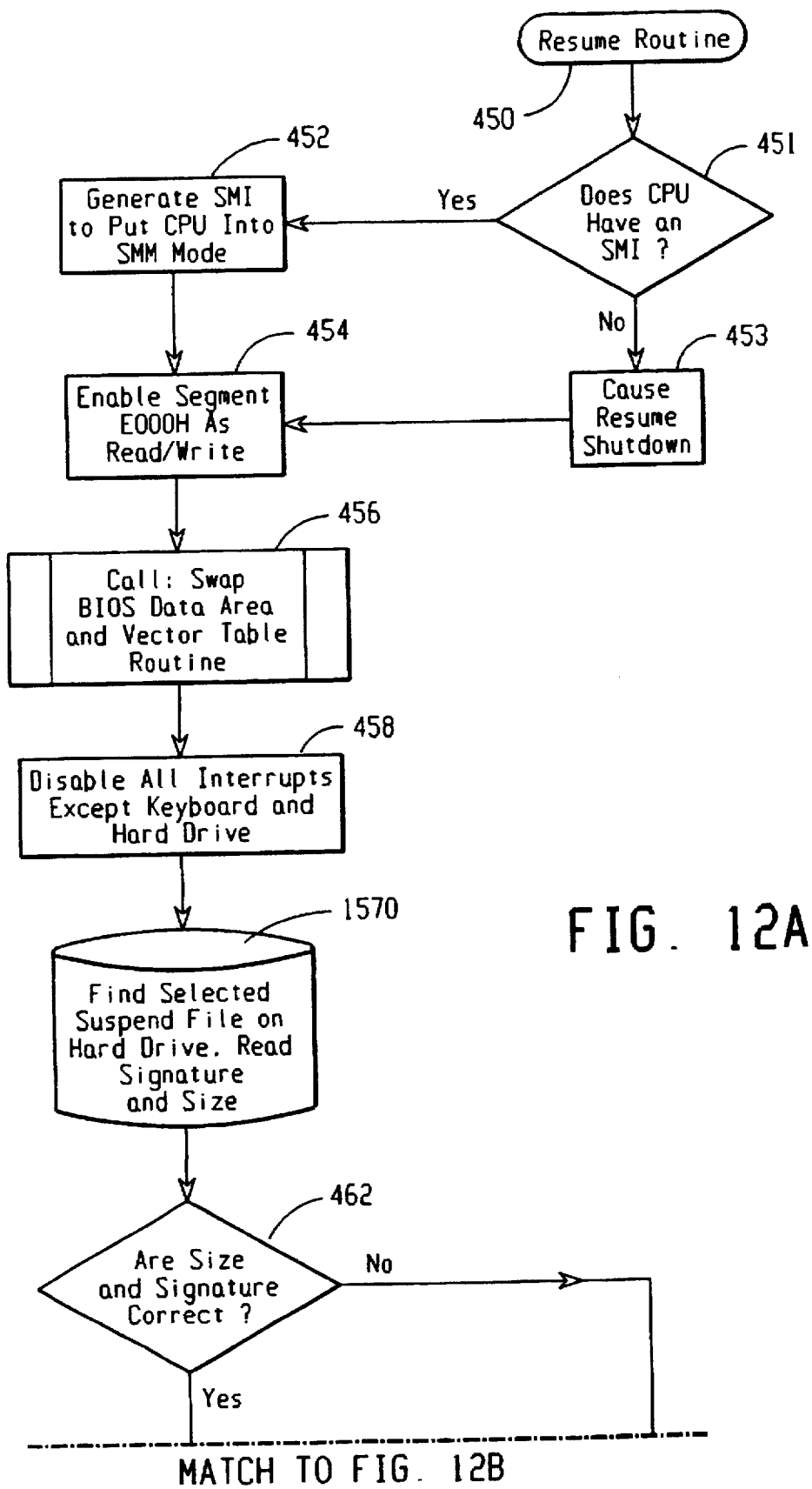
FIG. 12 is a flow chart showing the details of the Resume Routine of the present invention.
Figure 12B:
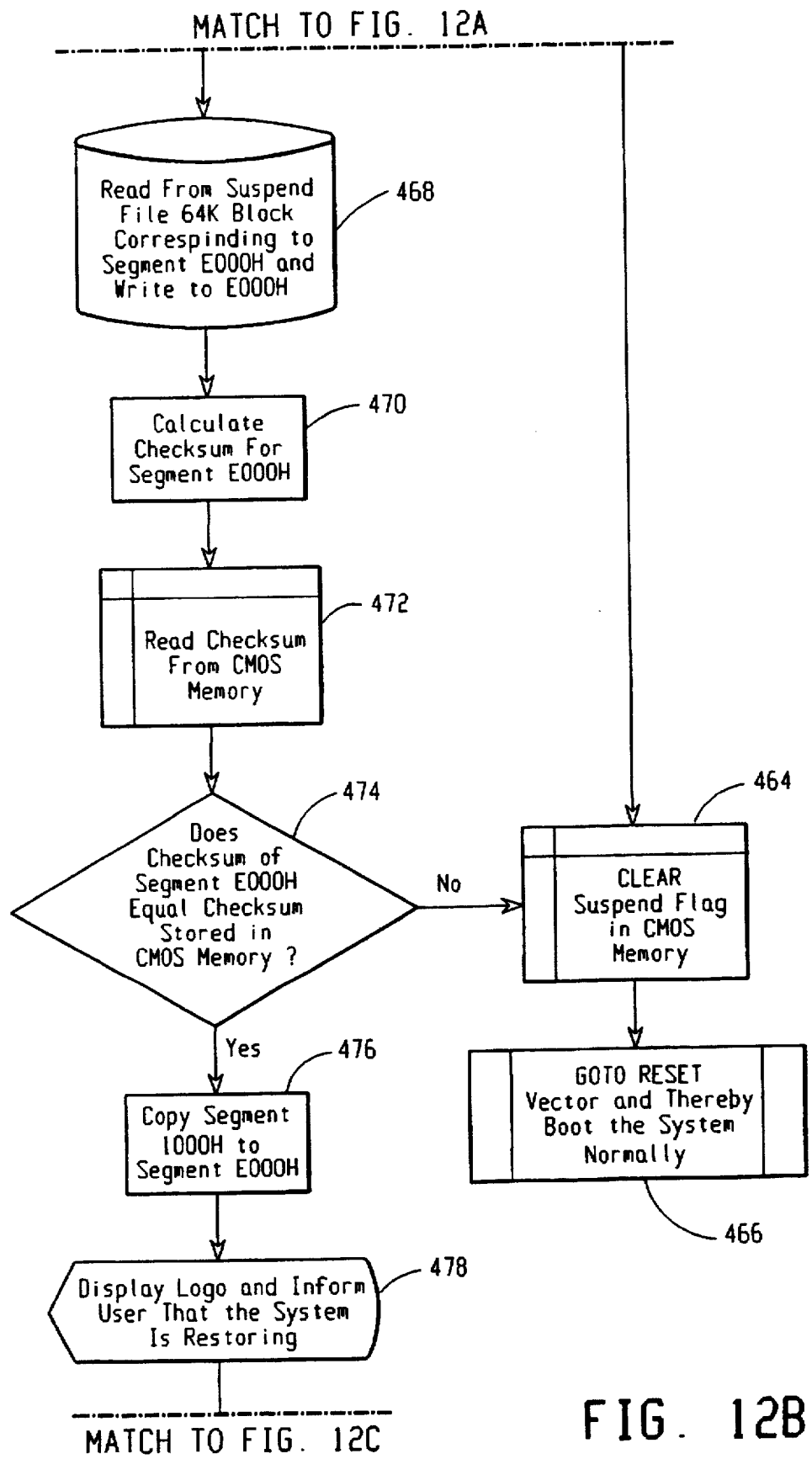
Figure 12D:
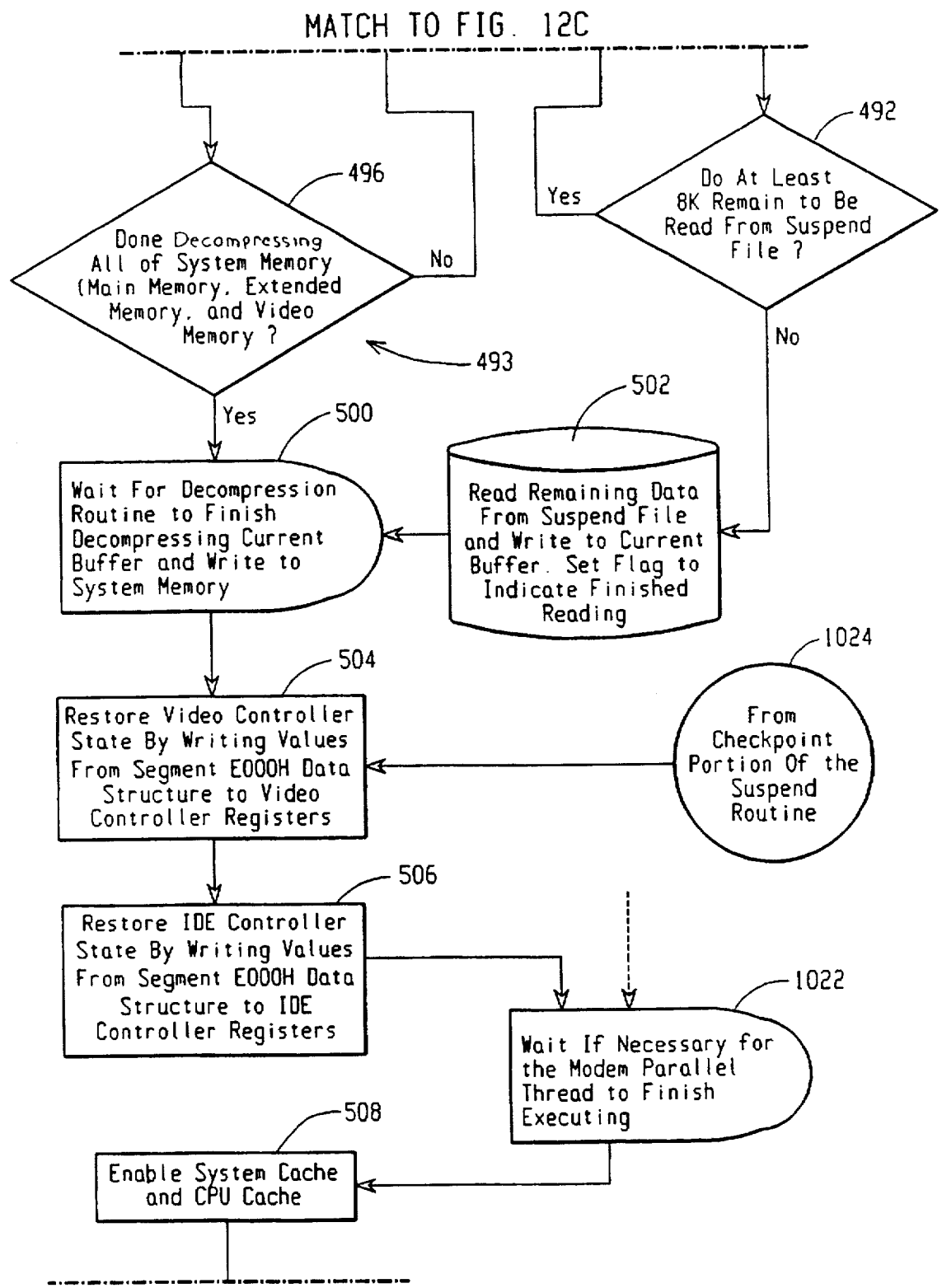
Figure 12E:
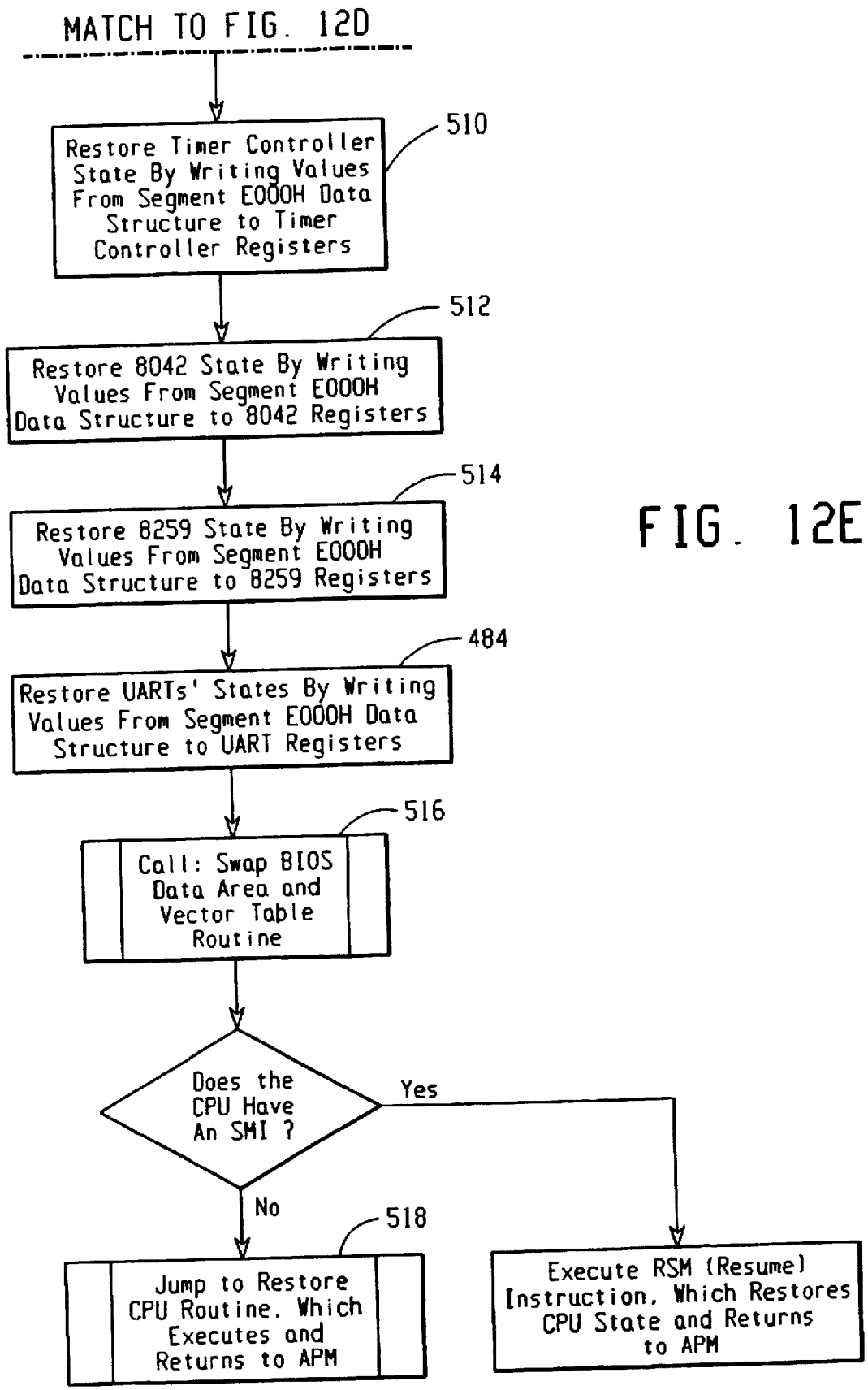
Figure 13A:
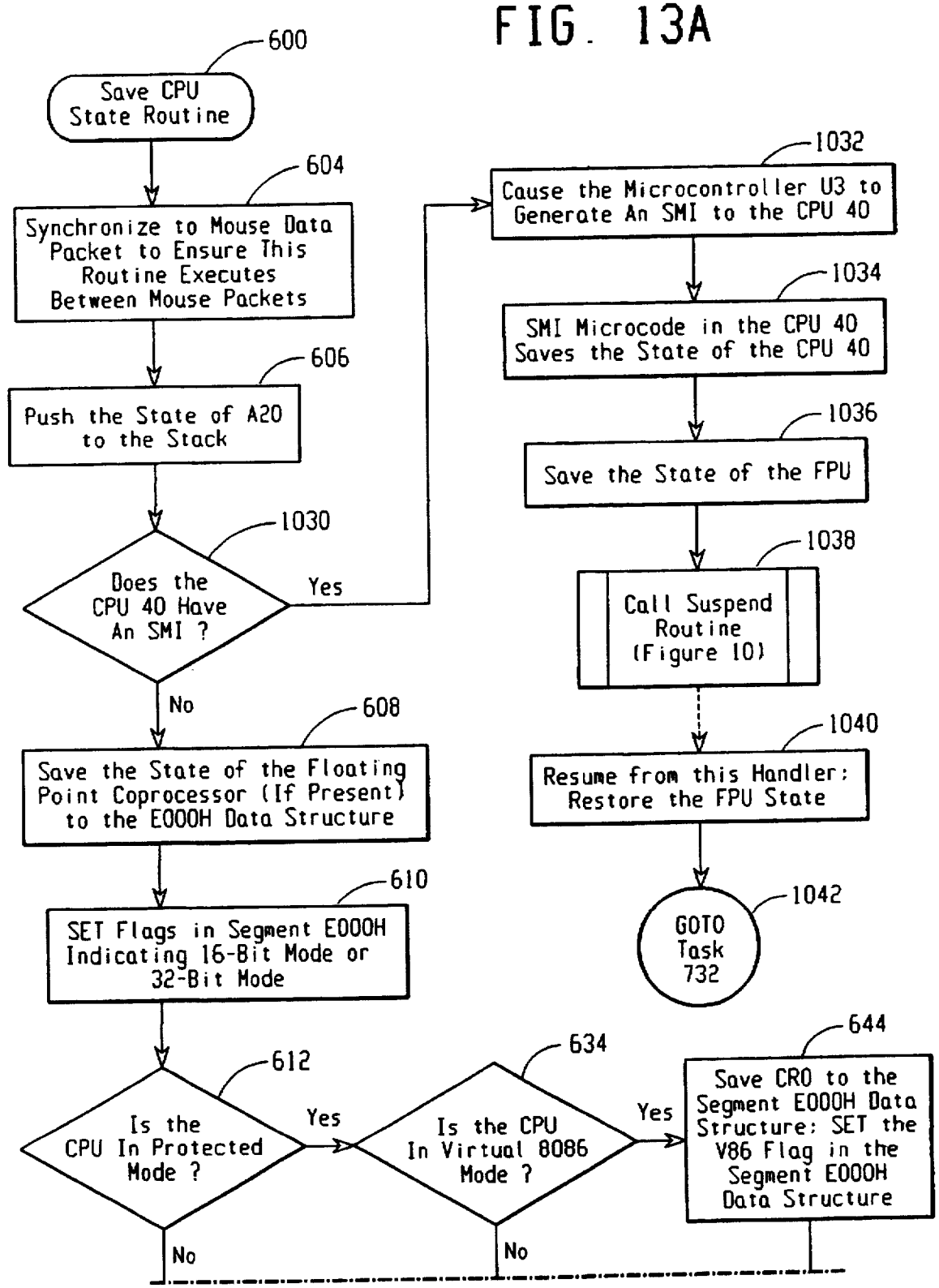
FIG. 13 is a flow chart showing the details of the Save CPU State Routine of the present invention.
Figure 13B:
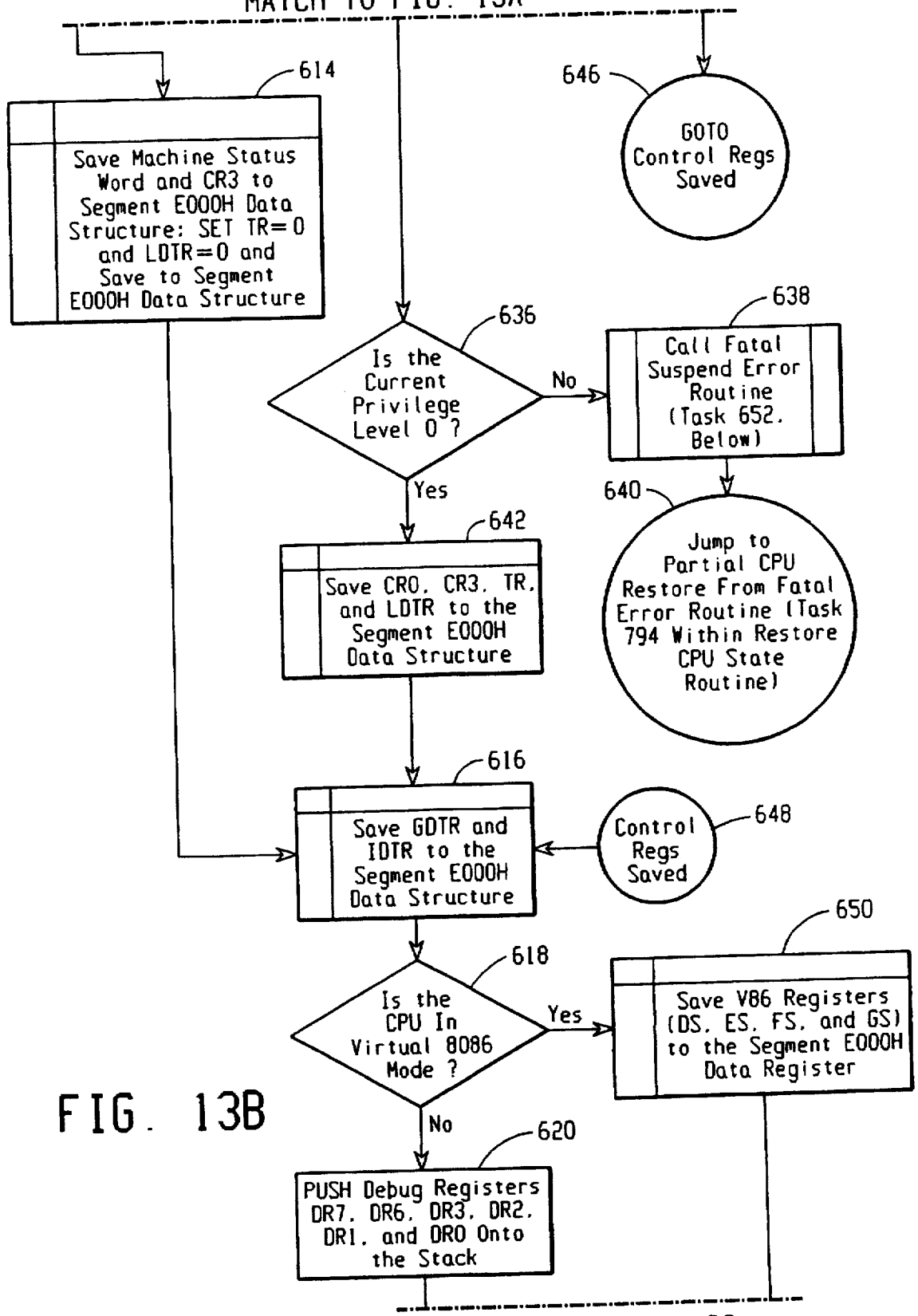
Figure 13C:
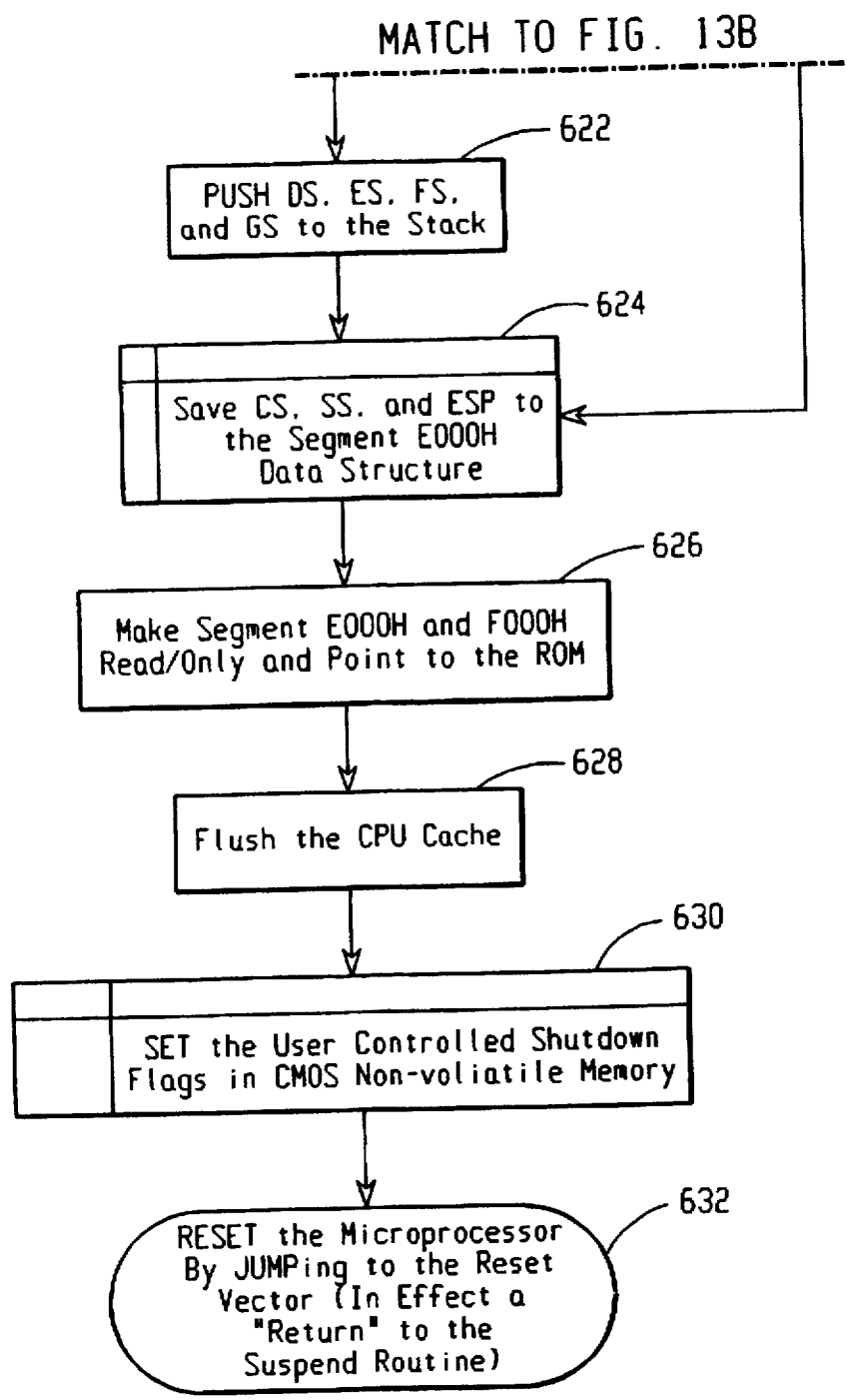
Figure 13D:
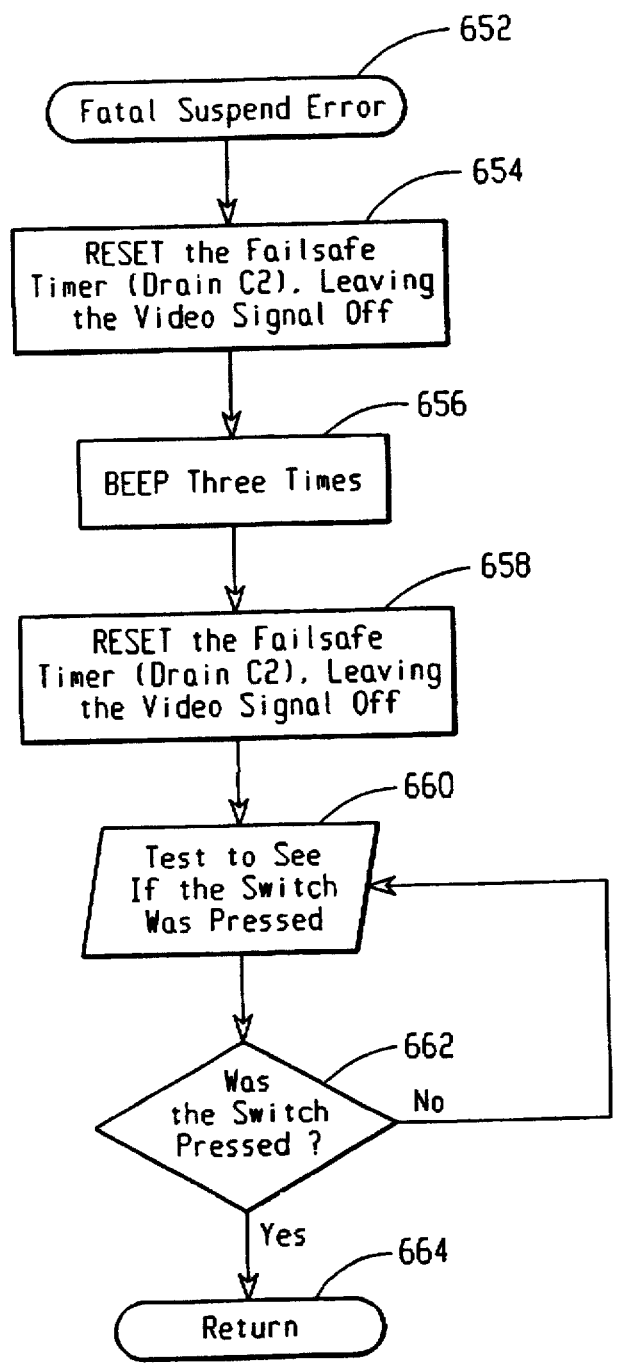
Figure 14A:
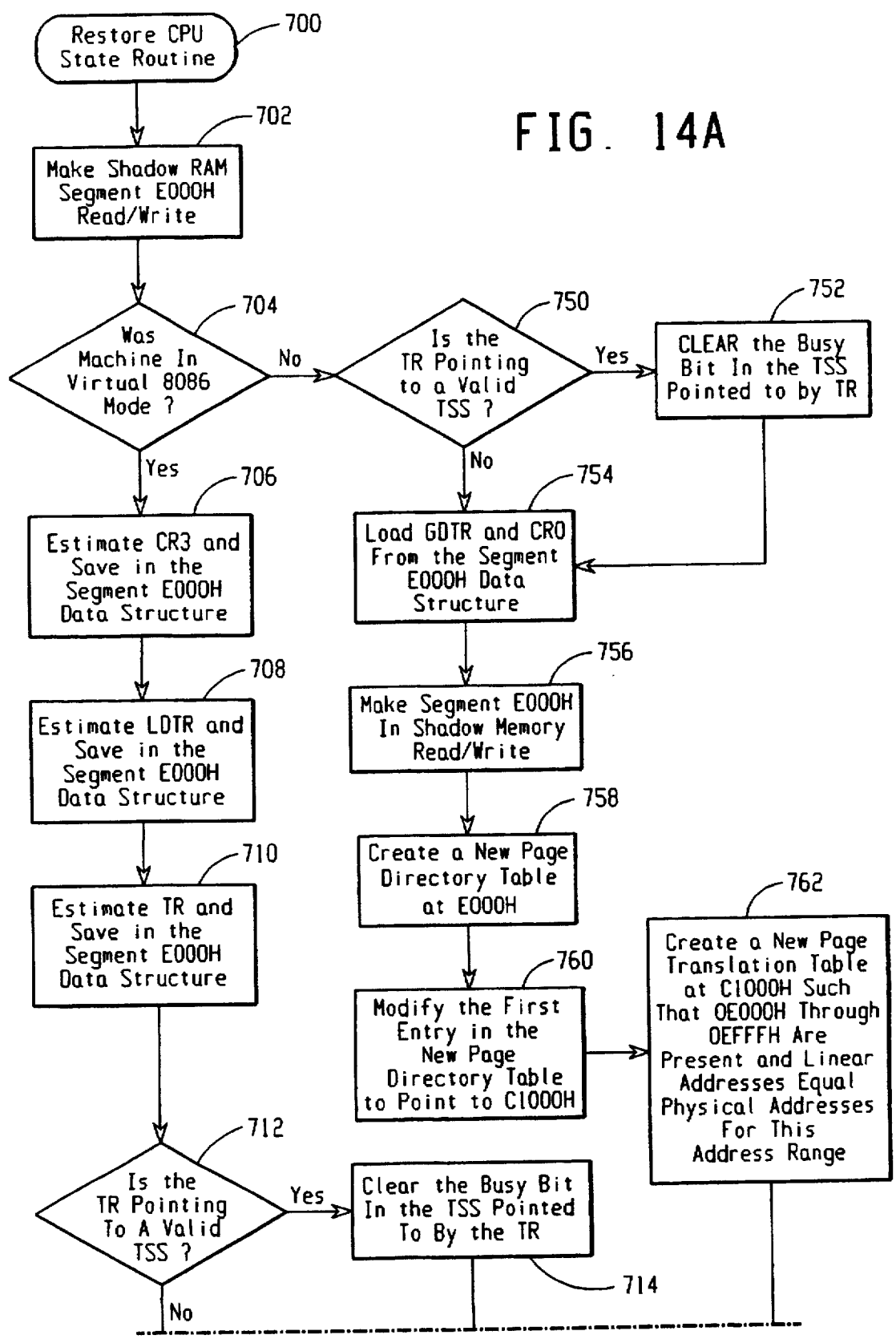
FIG. 14 is a flow chart showing the details of the Restore CPU State Routine of the present invention.
Figure 14B:
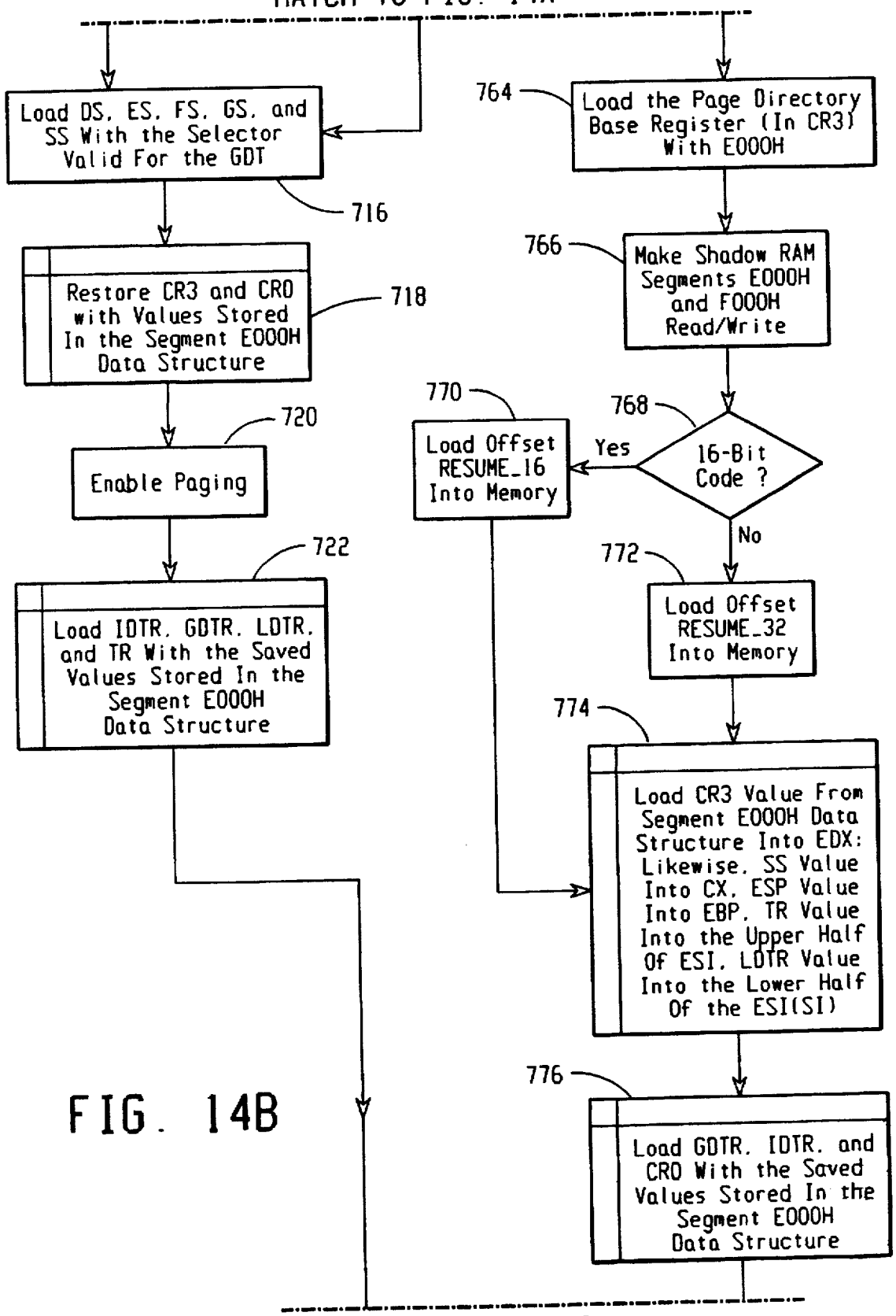
Figure 14C:
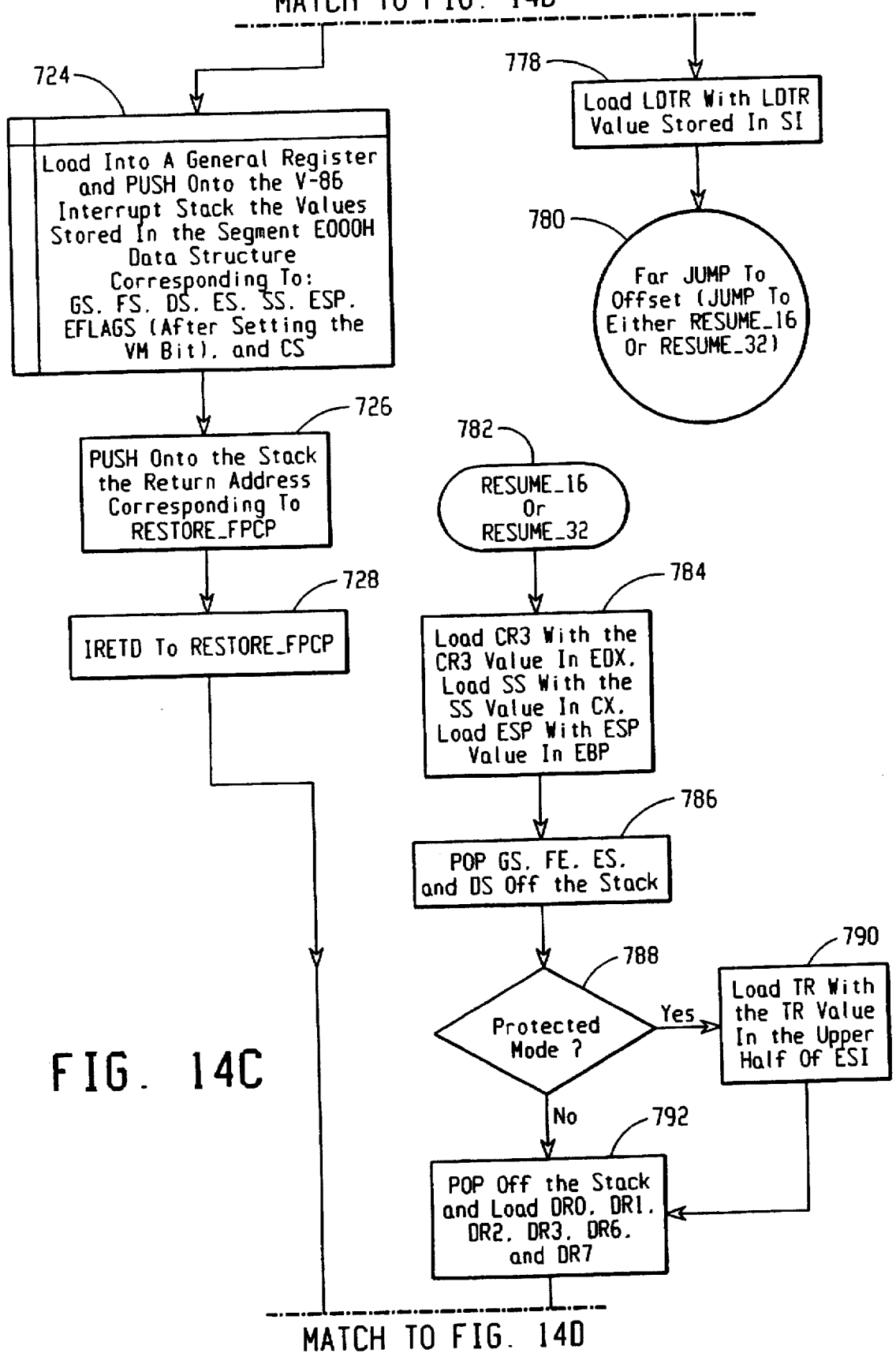
Figure 14D:
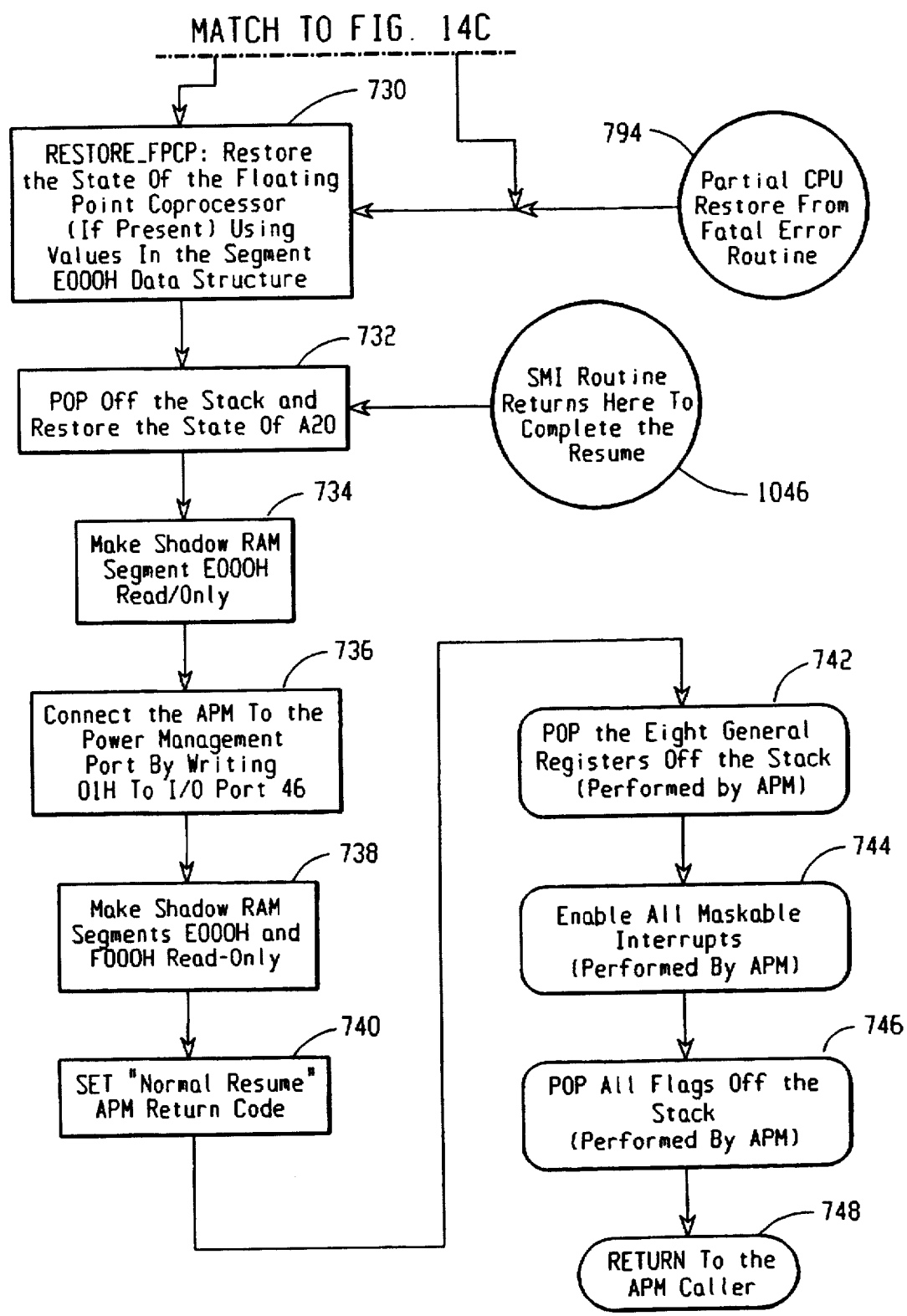

Referring now to FIG. 9B, the APM Working On Last Request Routine is shown, starting at 961. Responsive to the APM Working on Last Request being issued, the BIOS APM routines restart the failsafe timer and APM fail-suspend timer in the microcontroller U2, at 962, restarts the 15-second suspend pending timer to prevent a critical suspend request from being issued while the OS APM is still waiting for the system to properly prepare for the suspend, at 963, and returns, at 964.

Referring now to FIG. 9C, the APM Reject Last Request Routine is shown, starting at 965. Responsive to the APM Reject Last Request being issued, the BIOS APM routines restart the failsafe timer and APM fail-suspend timer in the microcontroller U2, at 966, SETs the Critical Suspend Flag thereby forcing an immediate suspend, at 967, and returns, at 968.

Figure 15A:
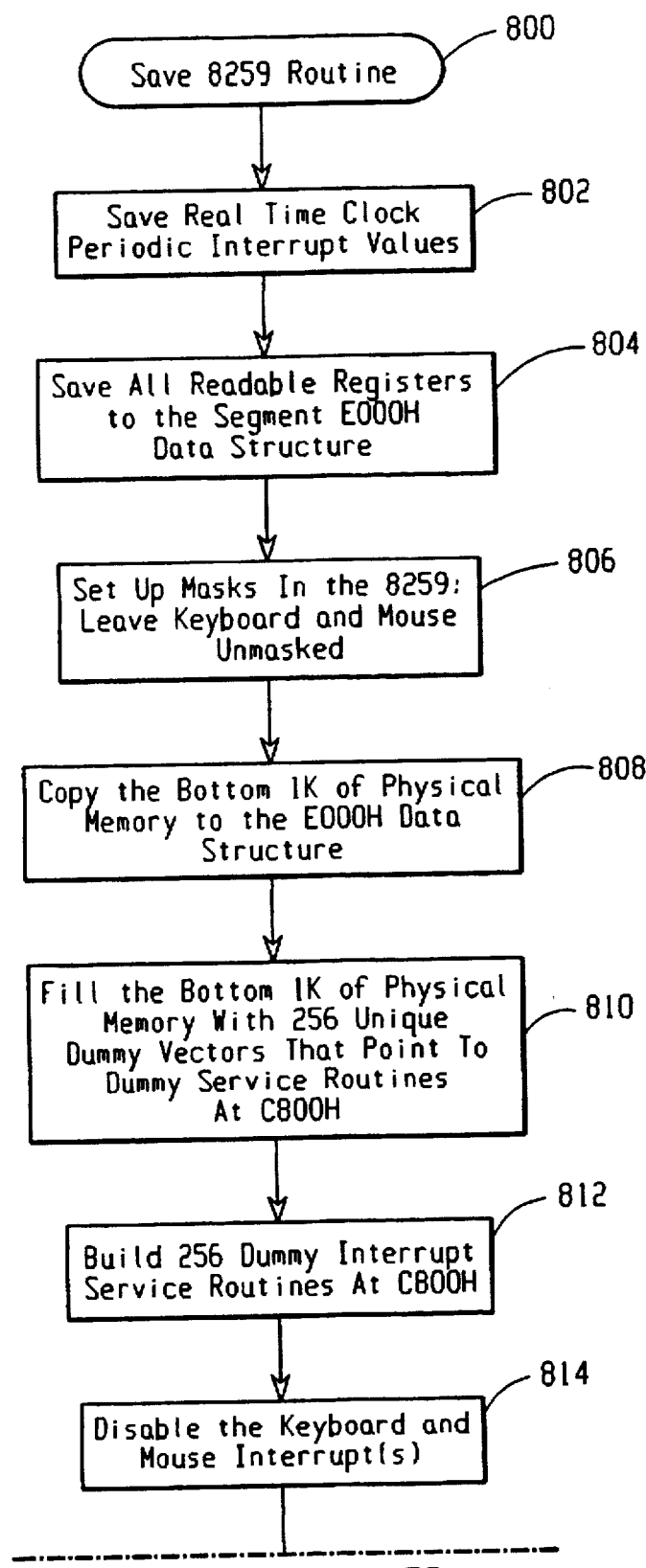
FIG. 15 is a flow chart showing the details of the Save 8959 State Routine of the present invention.
Figure 15C:
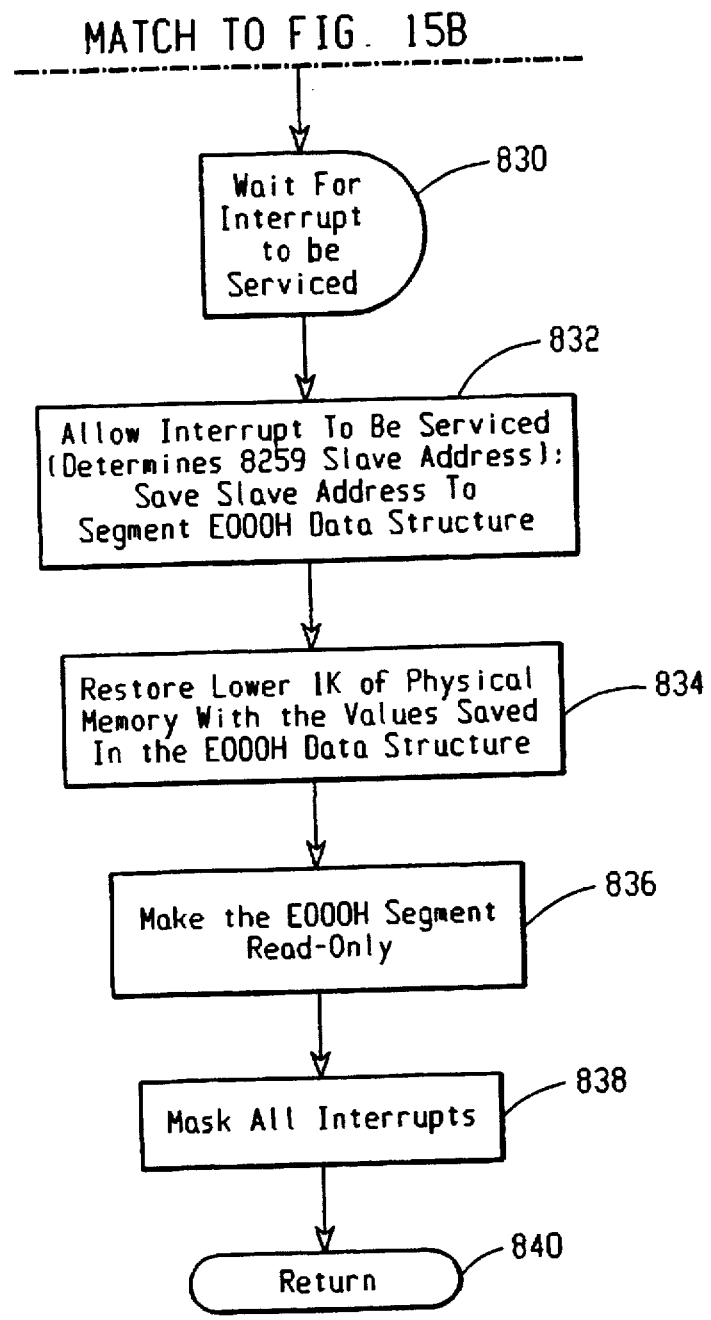
Figure 16A:
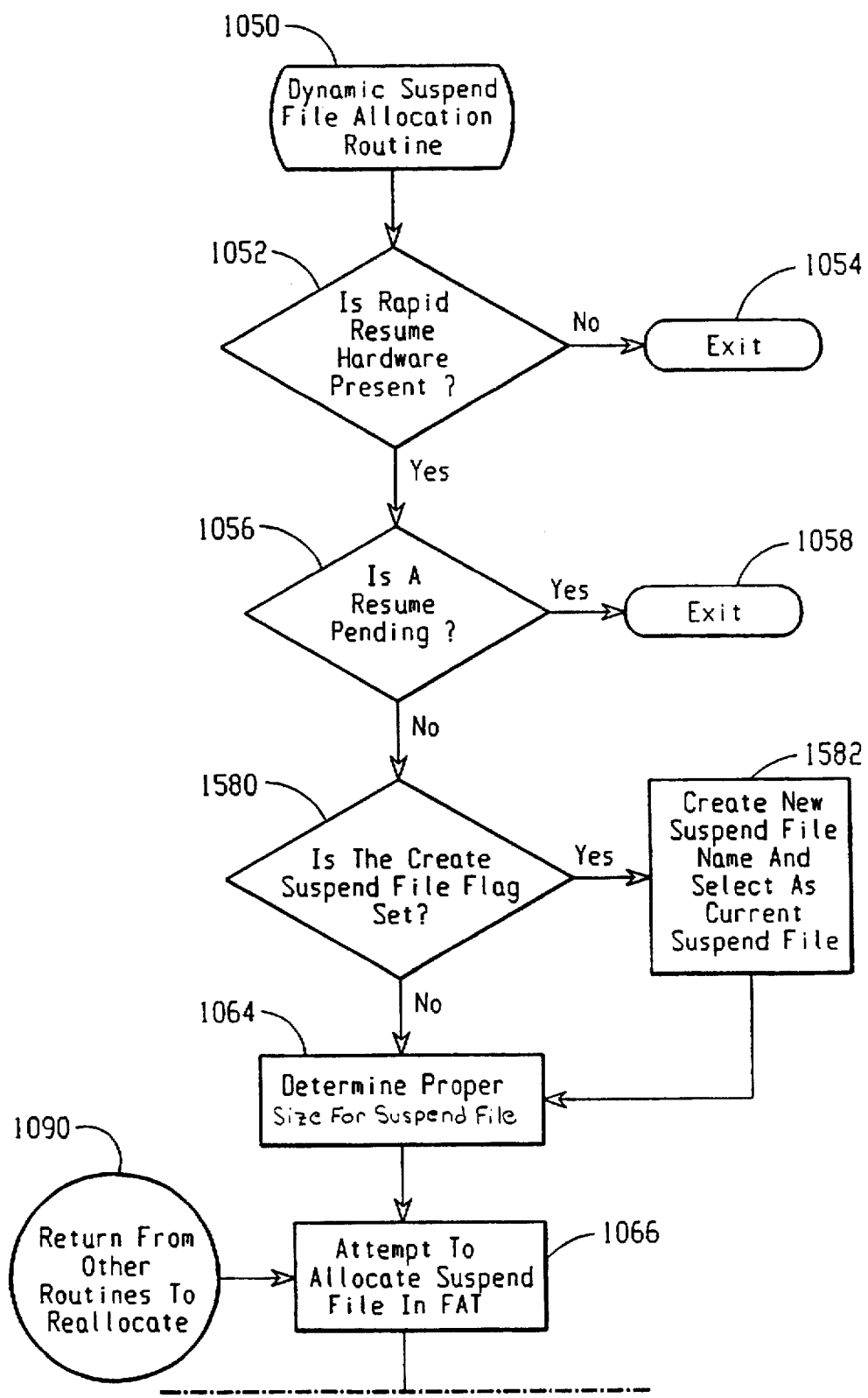
FIG. 16 is a flow chart showing the details of the Dynamic Save File Allocation Routine of the present invention.
Figure 16B:
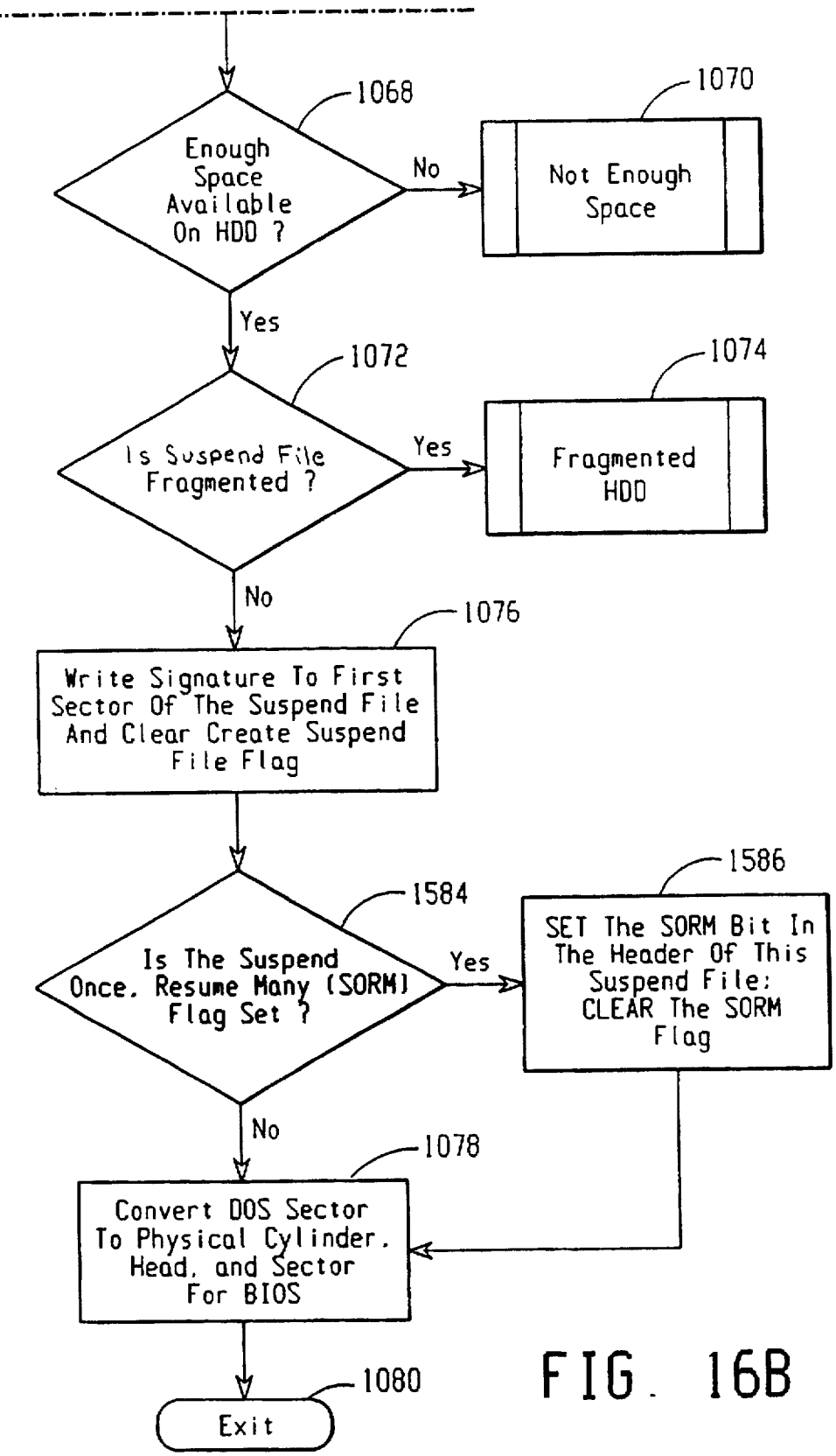
Figure 16C:
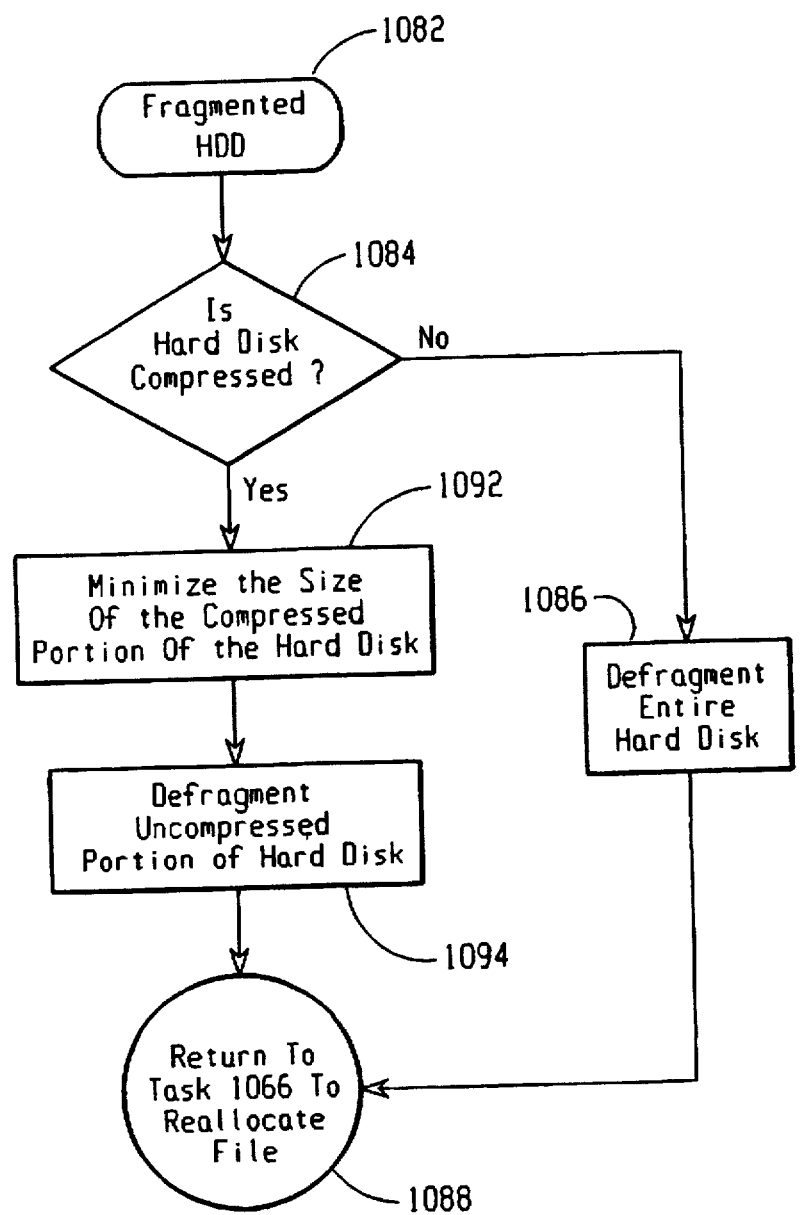
Figure 16D:
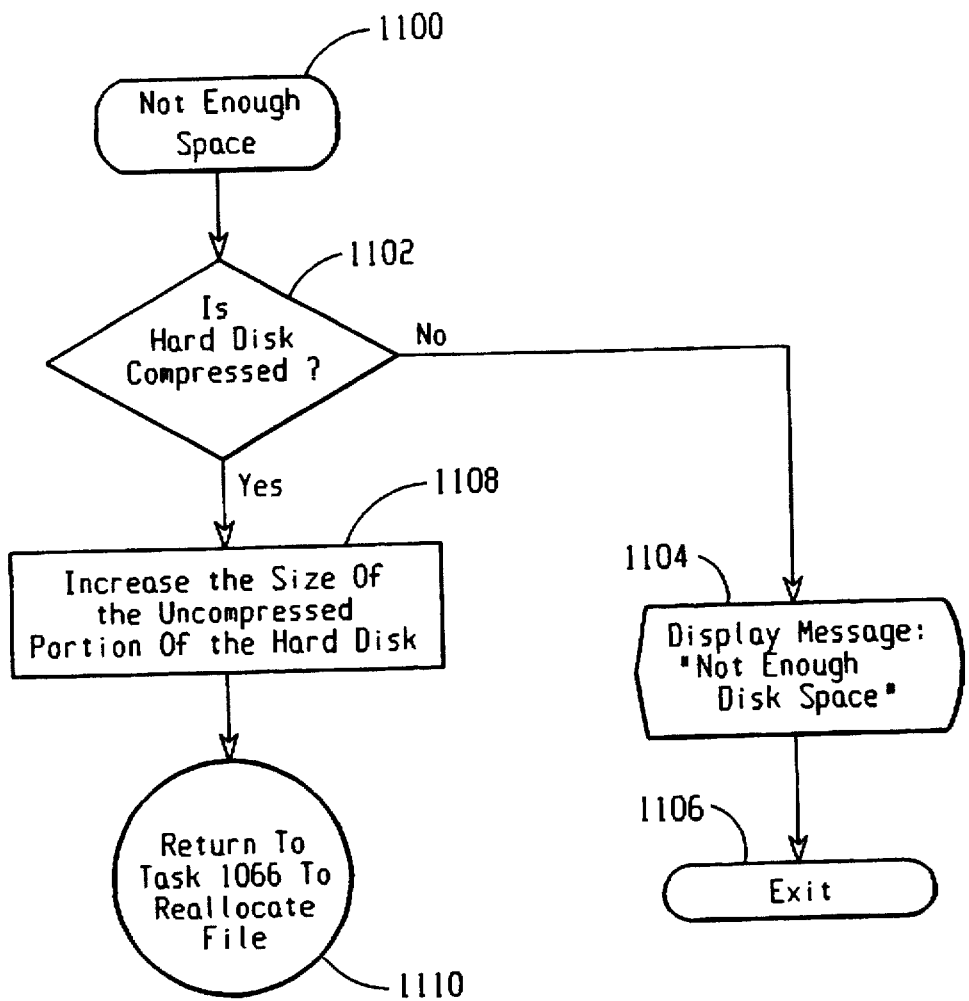

The Power-Up and Resume routines are best understood with a knowledge of the Suspend Routine. Therefore, it is believed that a description of the APM BIOS routines is best examined in the following order: a general overview of the Power-Up routine of the present invention (above in FIG. 8), details of the Supervisor Routine (FIG. 9), details of the Suspend Routine of the present invention (FIG. 10), details of the Power-Up process of the present invention (FIG. 11), details of the Resume Routine of the present invention (FIG. 12), details of the Save CPU State Routine (FIG. 13), details of the Restore CPU State Routine (FIG. 14), and details of the Save 8259 State Routine (FIG. 15).

It is believed that although any discussion of the computer system 10 of the present invention is somewhat circular because most of the routines interact with the others and the suspend/resume process is a continuing cycle, a discussion of the Suspend Routine (FIG. 10) before the Boot Routine (FIG. 11) or the Resume Routine (FIG. 12) will be most helpful. Referring now to FIG. 10, a flow chart of the Suspend Routine is shown. Recall that after either the normal boot routine 204-210 or the resume boot routine 214-220 are executed, the computer system 10 is in the normal operating state 150. Moreover, as mentioned above in the text accompanying FIG. 8, whether the computer system was either normally booted 204-210 or resume-booted 214-220, after either routine finishes, the APM OS driver is aware of the APM BIOS routines, such as the Supervisor Routine, shown in FIG. 8. As a result, the APM polls the Supervisor Routine approximately every one second.

The Suspend Routine is shown in FIG. 10 and commences at 250. The Suspend Routine is called by the APM in response to the Supervisor Routine returning to the APM a "Suspend Request" APM Return Code. In addition, the Suspend Routine is called and partially executed when the system performs a Checkpoint, as more fully explained in the text accompanying FIGS. 17 and 18. First, the flow of the Suspend Routine depends on whether the CPU 40 is an S part having an SMI, at 970. If so, the CPU 40 causes the microcontroller U2 to generate an SMI back to the CPU 40, at 972. Responsive to the SMI, microcode in the CPU 40 saves the state of the CPU 40, as is known to those skilled in the art, to the segment E000H data structure, at 974.

On the other hand, if the CPU 40 is not an S part with an SMI, the Save CPU State Routine is called, as shown at 252. The Save CPU State Routine will be detailed in the text accompanying FIG. 13. Suffice it to say for now that no matter what mode the CPU 40 is in when the Suspend Routine is originally called, the remainder of the Suspend Routine will be executed with the CPU 40 in Real Mode and, therefore, may be executed without fear of generating any errors that might be caused by attempting to execute an instruction outside the allowed address-space or by attempting to execute a privileged instruction.

The Save CPU State Routine returns program control to the Suspend Routine, at 253, in a unique manner. The "Return" from the Save CPU State Routine to the Suspend Routine involves resetting the CPU and is explained in more detail in the text accompanying tasks 630 and 632 of FIG. 13, below. The important detail with respect to the Suspend Routine is that the CPU registers have been written to the segment E000H data structure and the CPU 40 is now in Real Mode.

After the Save CPU State Routine returns or after the CPU saves its own state responsive to an SMI, the Suspend Routine next ascertains whether the switch 21 was pressed, at 254. The switch 21 closure is tested as described in the text accompanying FIGS. 6 and 7. If the switch was not pressed, then the suspend underway is a software-suspend and the Software Suspend Flag is SET in CMOS NVRAM 96. This ensures that a software suspend is not confused with a hardware suspend initiated by a switch closure. All software suspends are converted to hardware suspends by setting a bit in the microcontroller U2. The next switch closure after converting the software suspend to a hardware suspend aborts the suspend.

The next task is to set up a stack in segment E000H, indicated at 262.

After the stack is set up the Suspend Routine, at 264, examines the DMA controller 72, the diskette adapter 84, and the IDE disk controller 86 to see if any DMA transfers, floppy drive transfers, or hardfile transfers, respectively, are currently underway. If so, the suspend cannot be done because characteristics peculiar to these three types of transfers prevent a satisfactory suspend from being performed. For example, if a hardfile transfer from the hard drive 31 is underway, the data has already been read by the IDE controller, but has not yet been transferred to the system memory 53. This data cannot be adequately accessed by the CPU and, therefore, this data would be lost if the system was suspended in the middle of a hard file read. Thus, if any of these three types of transfers are underway, the suspend is postponed until the next APM Get Event, when the DMA and diskette controllers are tested for activity once more.

Consequently, the tasks performed at 252, 260, and 262 must be reversed so control can be passed back to the APM. First, the BIOS is changed from read/write to read-only, as shown at 265. That is accomplished by closing segment E000H, which still contains the shadowed data. The stack that was created in task 262 is popped and restored. Finally, the CPU state is restored by the Restore CPU State Routine, at 266, before control is passed back to the APM at 267. The Suspend Routine will be polled again by the APM in approximately another second during the next Get Event. By that time, the transfer(s) that prevented the suspend process will probably be complete, allowing the suspend to continue.

Returning now to task 264, if no DMA transfers, floppy drive transfers, or hardfile transfers are currently underway, then a suspend may be performed. The Suspend Routine continues at 268. Recall that the Failsafe Timer is continually counting down and will cause the system to turn itself off if it expires while the switch 21 is in the off/release state. Therefore, a first task is to reset the Failsafe Timer, described in the text accompanying FIGS. 6A and 19, as shown at 268.

Next, the state of the 8042 coprocessor 104 is saved, at 270. The 8042 coprocessor 104 registers are well known in the art. The registers are directly readable by the CPU 40 and their values are written directly into the data structure in E000H.

Next, the state of the 8259 interrupt controller 92 is saved, at 272. The Suspend Routine calls the 8259 Save State Routine, which will be detailed in the text accompanying FIG. 15. Suffice it to say for now that the 8259 Save State Routine ascertains the contents of the unknown registers of the two 8259 interrupt controllers 92, even though some of the registers are write-only. The register values are written directly to the data structure in E000H.

After the state of the interrupt controller 92 is saved, the configuration of the interrupt controller 92 must be changed to a known state to allow proper functioning of the various interrupt-driven tasks executed by the Suspend Routine. Therefore, the BIOS Data Areas & Vector Tables are swapped, at 274. The Suspend Routine copies the contents of the present-state BIOS Data Area and Vector Table in segment 0000H to a location in segment E000H. Next, the contents of the known-state BIOS Data Area and Vector Table are copied from the data structure in segment E000H to the location in segment 0000H. The known state BIOS Data Area and Vector Table is copied to segment E000H in task 414 of the Boot-Up Routine, shown in FIG. 11, which is discussed below. Finally the present-state DIOS Data Area and Vector Table are copied from segment 0000H to the data structure in segment E000H. When the routine at 274 is finished, all the interrupts, such as interrupt 13H (disk read/write) and interrupt 10H (video access), will function as expected.

Next, the state of the timers 102 are saved, at 276. The timers' registers are well known in the art. All of the registers are directly readable by the CPU 40 and their values are written directly into the data structure in E000H. The state of the IDE disk controller 86 is also saved at 276. The IDE disk controller 86 registers are well known in the art. All of the registers are directly readable by the CPU 40 and their values are written directly into the data structure in E000H.

The next step is to prepare the system memory to be written to the Suspend File on the hard drive 31. The system memory comprises system RAM 53 (which includes both main memory and any extended memory) and the video memory 58. At this time, parts of the RAM 53 may be in the external cache 60. The CPU cache was flushed at task 628, which is discussed below in the text accompanying FIG. 13. Next, the external cache is flushed, at 286, and enabled to speed writes to the hard drive 31.

The code executing on the system 10 may have put the IDE controller 86 into an unknown state. Consequently, the next step is to initialize the IDE controller 86 to a known state, at 292. This is accomplished by writing values directly to the registers within the IDE controller 86.

Next, an interrupt-driven parallel thread to read and save the state of any modems to the E000H data structure is started, at 976. The routine captures the interrupt corresponding to the COMM port associated with the particular modem, transmits commands to the modem to cause it to sequentially transmit back the contents of its registers, receives the register contents transmissions from the modem, and saves the register values to the E000H data structure. This routine transmits a first command to the modem, and then responds in an interrupt-driven fashion, receiving the modem's response and transmitting the next command to the modem responsive to each COMM port interrupt, until all the modem's registers have been saved. If not executed as a parallel thread, this routine could add several seconds (3–5 seconds per modem depending on the particular modem and the current baud rate) to the time it takes to suspend the system. Being an interrupt-driven parallel thread, it adds little or no time to the suspend if it completes execution before the system state is written to the hard drive 31.

After the interrupt driven parallel thread modem save routine is started, the appropriate Suspend File must be located on the fixed disk within the hard drive 31, at 1510. As mentioned herein, the system preferably has a plurality of suspend files. The head, sector, and cylinder of the Suspend File from which the system is to be restored is stored in CMOS memory 96. Once the Suspend File is located, the file size and signature are read. In the preferred embodiment, the signature is an ASCII code of arbitrary length that indicates the presence of the Suspend File. Other alternative implementations of the signature are possible, such as using binary strings with very low probability of being found randomly on a hard file system.

Next, at 1512, the system determines whether the current session is to be suspended or not. If the Suspend Once, Resume Many (SORM) bit for the appropriate suspend file is SET, then that particular suspend file is to be considered read-only and the system is not to be suspended back to that file. Of course, the user can choose to make the current session a suspended session using the Suspend/Resume Manager, described herein, but the system state will be saved to a different suspend file. If the SORM bit is SET, then, at 1513, program execution jumps to task 1519, where the system waits for a period of time, e.g., five seconds, before turning off the system. During that interval of time the user can invoke the Multiple Suspend/Resume Manager, which can allow the user to perform various functions, as described herein.

Having determined that the system is to be suspended and having read the file size and signature for the appropriate Suspend File, the next step is to ensure that the signature and file size are correct, at 296. If either the signature is incorrect, indicating that another program may have modified the Suspend File, or the file size is not correct, indicating that the Suspend File size was modified, then the Suspend Routine calls the Fatal Suspend Error Routine, which starts at task 652 of FIG. 13, at 298. If the user presses the switch 17, to exit the Fatal Suspend Error Routine, program control jumps from task 299 to task 506.

On the other hand, if the signature is correct and the Suspend File is large enough, then the Suspend Routine may proceed writing the state of the computer system to memory.

Before writing the state of the computer system 10 to the hard drive 31, the CPU 40 commands the microcontroller U2 to restart (reset) the failsafe timer and queries the microcontroller U2 to determine if the switch 21 was pressed again, at 297. If the switch 21 was not pressed again then the suspend should continue. On the other hand, if the switch 21 was pressed again then the suspend is aborted. The failsafe timer is restarted and the switch 21 is tested for closure at several points in the Suspend Routine. Task 297 is merely illustrative; a circuit designer of ordinary skill in the applicable art will be able to determine the number of and permissible time between restarts of the failsafe timer. The Suspend Routine should reset the failsafe timer, before it expires causing the microcontroller U2 to cause the power supply 17 to be turned "off." Likewise, the switch 21 should be checked occasionally. If the switch 21 was pressed again, indicating that the user desires to abort the suspend, then the code should jump to an appropriate point in the Resume Routine to "un-suspend" and recover from the partial suspend.

Similarly, a Ctrl-Alt-Del aborts the suspend, at 350. Pressing Ctrl-Alt-Delete (pressing the Control key, the Alt key, and the Delete key simultaneously) is a well known method of resetting typical computer systems based on the IBM BIOS and Intel 80X86 family of CPUs. The computer system 10 handles a Ctrl-Alt-Del with a BIOS Interrupt 1 handler, as is well known in the art. The computer system 10 has a slightly modified Interrupt 1 handler, at 350, which clears the Suspend Flag in CMOS memory 96, at 352, and jumps to the Boot-Up Routine on reset, at 354.

In the computer system 10 of the present invention, pressing Ctrl-Alt-Del while the Suspend Routine is executing causes the computer system to enter the off state 156. This happens because after the switch 21 closure, pressing Ctrl-Alt-Del causes the Boot-Up Routine to be called, and the Boot-Up Routine initializes the microcontroller U2 to a state in which the failsafe timer has expired and the switch is still in the off/release state. Thus, pressing Ctrl-Alt-Del while in the Suspend Routine causes the computer system 10 to enter the off state 156.

Referring now to task 300, the Suspend File is again located on the hard drive 31; the signature phrase is written to the first bytes of the Suspend File, at 300. Next, the entire 64 kilobytes of data in segment E000H is written to the Suspend File, at 302. This 64K copy of E000H is really just a place holder and will be rewritten to this same location at the end of the Suspend Routine.

Then, the state of the video controller 56 is saved, at 303. The video controller 56 registers are well known in the art. All of the registers are directly readable by the CPU 40 and their values are written directly into the data structure in E000H.

Next, the system memory is written to the Suspend File. This is accomplished by a twin-buffer system that reads data from system memory, compresses and writes it to segment E000H, and finally writes the compressed data from segment E000H to the Suspend File. Two routines work in a time-multiplexed arrangement: one compresses the data and writes to segment E000H, the other writes to the Suspend File. The former is running in the foreground, the latter is an interrupt-driven routine that runs in the background. Obviously, since there is only one CPU 40, only one routine can execute at a given time; however, because the latter routine is interrupt-driven, it can interrupt the execution of the former routine as needed to optimize the speed of transfer of the data to the Suspend File. Each of the two buffers is 8 kilobytes long, which is believed to optimize transfer time to the hard drive 31.

This process starts at 304 with the reading, compression, and writing to segment E000H of enough data to fill the first of the 8K buffers. The data is compressed using the run length encoding method; however, any suitable compression method may be used. At this time, the Write from Buffer Routine, which is generally indicated at 307, is started, at 306. The Write from Buffer Routine 307 is an interrupt-driven routine that runs in the background and is comprised of tasks 308–310. The Compression Routine, generally indicated at 311, comprises tasks 312–318 and is the foreground routine. First, the Write from Buffer Routine 307 writes the buffer just filled by task 304 to the Suspend File, at 308. While the Write from Buffer Routine 307 writes the contents of that buffer to the Suspend File, the Compression Routine 311 continues reading the next bytes from system memory, compressing them, and writing the compressed data to the other of the two 8K buffers, at 312. Once the Compression Routine 311 has filled the buffer with compressed data, the next step is to determine if the entire system memory has been compressed yet, at 314.

The IDE controller 86 cannot write data to the hard drive 31 very quickly. As a consequence, the Compression Routine 311 will always finish filling the 8K buffer not being written to the hard drive 31 before the Write from Buffer Routine 307 finishes writing the buffer to the hard drive 31. Therefore, the Compression Routine 311 must wait for the Write from Buffer Routine 307 to finish writing the buffer to the hard drive 31. If the Compression Routine 311 has not finished compressing and writing all of system memory, then the Compression Routine 311 waits for the Write from Buffer Routine 307, at 316. The Compression Routine 311 and the Write from Buffer Routine 307 communicate via a set of flags. When the Write to Buffer Routine 307 finishes writing the current buffer to the Suspend File, the Routine 307 next switches the buffer flags, indicating to the Compression Routine 311 that it may start filling with compressed data the buffer that was just written to the Suspend File. Next, the failsafe timer C2 is reset and the switch 21 is checked for a closure event, at 309, in the manner explained in the text accompanying task 297.

The Write to Buffer Routine 307 then decides if the buffer just written to the Suspend File is the last buffer to be written, at 310. If not, the Write from Buffer Routine writes to the Suspend File the buffer that was just filled by the Compression Routine 311. In the mean time, the Compression Routine 311, by examining the buffer flags, determined that a buffer is ready for more compressed system memory. That is, the Compression Routine waits at 316 until the Write from Buffer Routine finishes with the current buffer, at which time the compression loop continues at 312. Note, the video memory 58 is compressed if linear frame buffering is supported, but is not compressed for VESA page access. Rather, VESA page access video memory is read through the video controller 56 using VESA calls and is written without compression using the twin-buffer system, explained in more detail above.

Once the Compression Routine 311 is finished compressing all the system memory, it waits at 318 for the Write from Buffer Routine 307 to finish writing the last buffer to the Suspend File. Once the Write from Buffer Routine 307 is finished, it branches from 310 to 318 and ceases to exist. At this time, no background routines are executing and the main program continues at 320.

Next, at task 320, the state of the DMA unit 71 (DMA controller 72 and Central Arbiter 82), the 82077 diskette controller 84, and the RS-232 UARTs 94 are saved. These devices have registers that are well known in the art. All of the registers within the diskette controller 84 and the UARTs 94 are directly readable by the CPU 40 and their values are written directly into the data structure in E000H. The DMA unit does not have readable registers. Rather, the write-only registers are normally set up before each DMA transfer. For this reason, the Suspend Routine stops a suspend if a DMA transfer is underway.

Next, at 978 the Suspend Routine tests whether the interrupt-driven modem state routine described in the text accompanying task 976 is finished. If not, it waits for this routine to finish.

It is believed to be desirable to be able to detect any tampering with the Suspend File once the computer system 10 enters the suspend state 150. For example, it may be possible for someone to generate a modified Suspend File, move that Suspend File to the hard drive 31, and attempt to have the computer system 10 restore into a different state than the one saved. To this end, a pseudorandom value is placed in the segment E000H data structure. As shown at 328, after the interrupt-driven modem state save routine is finished, a 16-bit time-stamp is read from one of the high-speed timers 102. This time-stamp is then written to the segment E000H data structure.

Next, a 16-bit checksum for the entire E000H segment is calculated by adding each 16-bit word in E000H together without ever considering the carry bit. This checksum is written to the segment E000H data segment, at 330, and is written to the CMOS NVRAM 96, at 332. After which, all the working variables are written from the CPU 40 to the segment E000H data structure, at 334, and the entire segment E000H is rewritten to the Suspend File, starting after the signature phrase of the Suspend File (directly after the signature), at 336. Next, the Suspend Flag is SET in the CMOS NVRAM 96, at 338, informing the system 10 that the state of the computer system was saved to the Suspend File.

Next, the Suspend Routine determines whether a Checkpoint is being taken, at 980. If so, then the system should not be powered down; rather, the system must be resumed to the extent necessary to recover from the partial suspend that was just performed. Therefore, if a Checkpoint is being taken, at 982 the Suspend Routine jumps to task 484 of the Resume Routine, which then performs a partial resume.

If a Checkpoint is not being taken, then the system determines whether an immediate Suspend/Resume Context Change was selected, at 1514. Such a change might be selected by the user via an OS/2 application or a Windows application known as an "applet." Such an applet might allow rapid changes between the different suspended systems.

In addition, such an immediate Suspend/Resume context change might be caused by the operating system itself. For example, a particular operating system, e.g., OS/2 or Windows, might not be capable of executing certain programs that execute on a different operating system, e.g., PC-DOS or MS-DOS. A class of programs that can have trouble being executed by other operating systems are DOS-based games. Such games typically use so much of the system resources that the "hooks" left by other operating systems interrupt with proper game functioning. In this situation, the one operating system can (i) suspend its current session to one suspend file, (ii) cause the system state to be resumed from a different operating system, thereby allowing a "clean" copy of the operating system to execute the particular program, e.g., game, (iii) suspend or discard the newly resumed session, and (iv) cause the system to be resumed from the suspend file to which the system state was saved in (i), above. The key to the above scenario is ensuring that the correct suspend file is pointed to in CMOS memory so that the system properly transitions. An additional section of CMOS memory can be used to function as a sort of "stack." That is, two or more suspend files can be stored in CMOS memory with the appropriate flags such that when one session is completed, as indicated by that session being either suspending or discarded, the system will resume from the other suspend file indicated in CMOS.

If an Immediate Suspend/Resume Context Change was selected, as tested at 1514, then the appropriate codes are set to cause the system to be resumed from the desired suspend file, at 1516. Such codes include indicating the correct suspend file in CMOS memory and possibly indicating the location of any swap file, as described herein.

As described herein, the present system can have more than one suspend file from which the system can be resumed. This can cause several problems of two types unless particular care is used to manage the files on the hard drive: (i) swap file problems and (ii) data file problems.

Most high-performance operating systems require more memory than provided by the volatile system RAM. Consequently, they use special files on the hard drive known as "swap files" to store parts of programs and data not currently being executed by the CPU. As the programs and data are needed for execution by the CPU, data in RAM is swapped with data in the swap file. Thus, in some circumstances, the "state of" a computer system might also seem to include several files on the hard drive, such as these swap files. In these circumstances, there is no need to store the swap file portion of the system state to the hard drive, it is alread stored on the hard drive. However, care must be taken to prevent swap file corruption.

On the one hand, in a system with only one suspend file, the fact that some of the system state is found on the hard drive is irrelevant. The part of the system state in volatile memory and registers is saved to the suspend file when the system is suspended. When the system is resumed, the data in the swap file is exactly where it was when the system was suspended. Similarly, using multiple suspend files all with different operating systems using different swap files is not a problem. None of the different operating systems would access or corrupt any of the swap files of the other operating systems.

On the other hand, in a system having more than one suspend file having the same operating system, the contents of the swap file associated with the first computer state can be completely different from the contents of the swap file associated with the second computer state. Since both versions of the operating system would look to the same swap file, one state could corrupt the other system's swap file or be totally diabled by the other's swap file. Using the first computer state with the swap file from the second computer state could be disastrous!

Therefore, the location or DOS handle of a particular swap file associated with the state stored in a particular suspend file must be saved somewhere in non-volatile storage. For example, the location or handle of a swap file associated with the state stored in a particular suspend file can be stored as part of the suspend file itself. Or, if CMOS non-volatile memory is plentiful, a table of swap file locations associated with particular suspend files can be used. What is critical is that when the system state is resumed from a particular suspend file, the operating system is made aware of the location of the associated swap file. This can be accomplished by, e.g., writing the location or handle of the swap file to a particular location in memory (or a file) known to represent the location or handle of the swap file. It also might be accomplished by a special API function as the system state is resumed.

The second possible problem mentioned above is a data file problem. As known to those skilled in the art, it is undesirable to allow more than one application to simultaneously access a file that is to be written back. The DOS SHARE.EXE program is an example of a program that monitors which files are currently open or otherwise in use and warns or prevents others from using that file. In the present system, the system state can be saved with many files open and with suspended applications having date files in memory. In a system with multiple suspend files from which the system can be resumed, it is conceivable that a file might be open in more than one session. However, the monitor program (e.g., SHARE.EXE) from one session are not be aware of files open or otherwise in use in a different session. Thus, problems of data being overwritten can occur unless care is taken in allowing use of files.

Thus in a system having multiple suspend files, a monitor of file use must transcend any one session. Such a global file use monitor might be a list of open files written either to the hard drive or to CMOS non-volatile memory, if it is plentiful. Information in addition to merely a list of open files might include the session in which the file is being used to allow the user to perform an immediate context switch between suspended sessions to free up the desired file. Interfacing the global monitor to each session can take the form of either having each session execute the same global use monitor that utilizes the list of files in use. An alternative method would be to make the global file use monitor compatible with file use monitors of other operating systems, e.g., SHARE.EXE, and transferring the list of open files to that particular file use monitor for each session after the system has been resumed. This can be accomplished by, e.g., writing the list of files in use to a particular location in memory (or a file) known to represent the list of in use files. It also might be accomplished by a special API function as the system state is resumed. Preferrably, the system uses a bit or flag for each file that is commonly used in file systems to indicate that a particular file is "open" or otherwise in use. The flag is set to one value to indicate that the file is available for use. The flag is set to a different value to indicate that the file is open or otherwise in use in the present session or a different session.

Once the proper codes are set, at 1516, program execution is transferred to the Resume Routine so that the system can be immediately resumed from the newly indicated suspend file.

If an Immediate Suspend/Resume Context Change was not selected, as tested at 1514, or after task 1519, where the system pauses for a period of time, e.g., five seconds before turning off the system, for the user to invoke the Multiple Suspend/Resume Manager, then the system determines if the Multiple Suspend/Resume Manager is to be invoked, at 1520. The Multiple Suspend/Resume Manager can be invoked by the user at any time pressing a particular combination of keys simultaneously, often referred to as a "hot-key." If so, then the Multiple Suspend/Resume Manager Screen is displayed, at 1522.

An example of an Multiple Suspend/Resume Manager screen is shown at 1700 in FIG. 22 and is used by the user to select another suspend file from which to resume the system. The screen 1700 has two windows 1702 and 1704 for displaying suspendable sessions and use once (suspend once, resume many) sessions, respectively. The screen 1700 also has several user interface devices, such as buttons 1706, 1708, and 1710, which are used to resume the system, create a new session, and exit (turn the machine off without performing more tasks), respectively. Such user interface devices are known to those skilled in the art. If the user does not choose a new system from which the system will be resumed, the system will suspend to and resume from the last suspend file chosen.

To provide additional protection between sessions, a user can optionally be prompted to type in a correct password before the system will cause the system to resume from the selected suspend file. Each suspend file can optionally have such an associated password, located as part of the file itself or in other nonvolatile memory. Such a password scheme might prevent one user from affecting another user's system configuration or data.

Figure 20A:
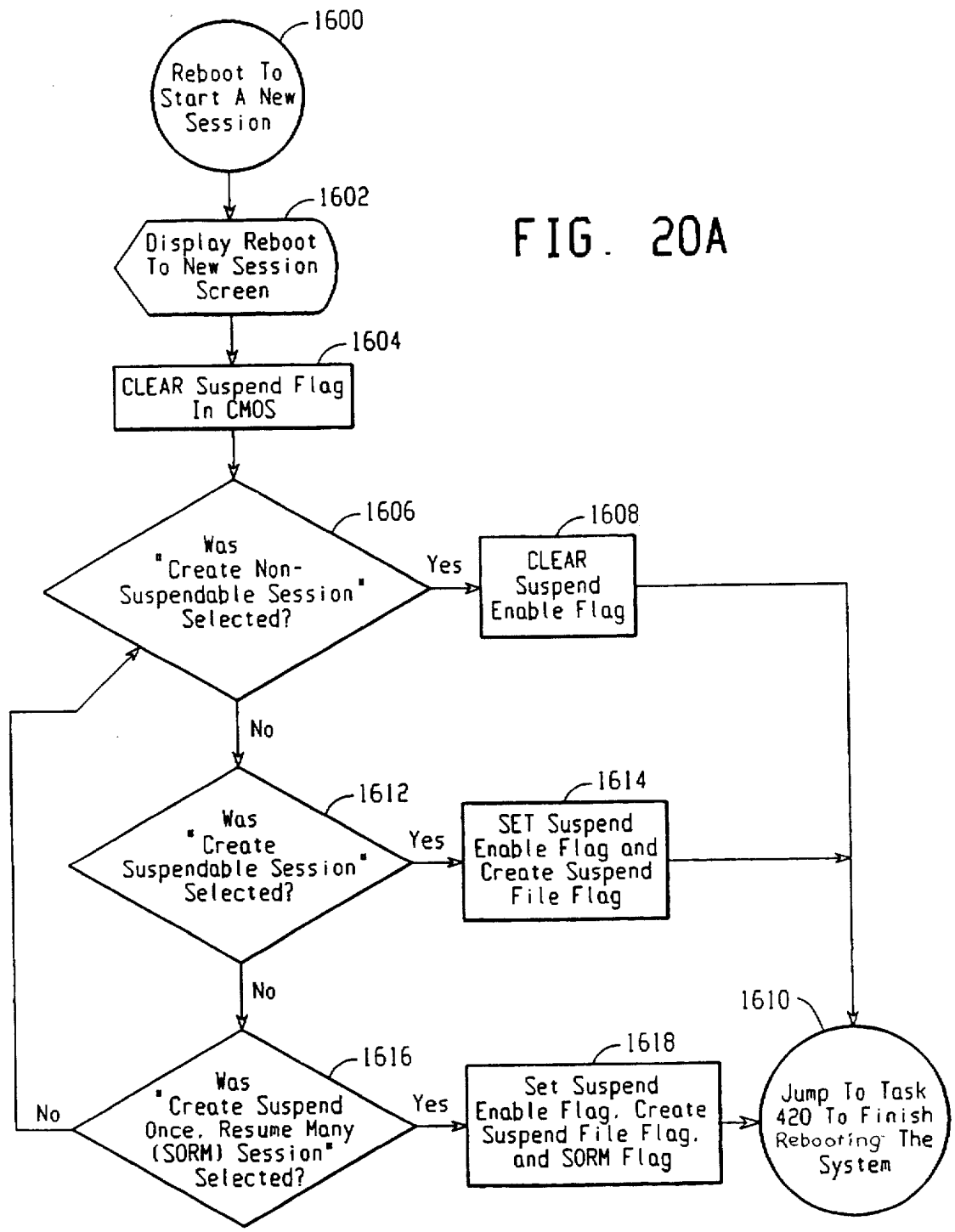
FIG. 20A is a flow chart showing the details of the routine of the present invention used to start a new session.
Figure 20B:
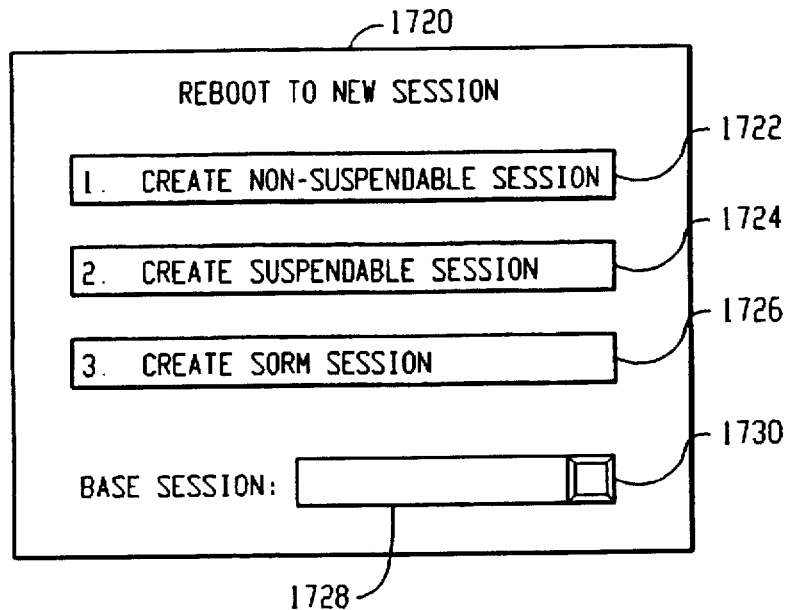
FIG. 20B is an example of a screen displayed by the routine of FIG. 20A.

Referring back to FIG. 10, code execution then branches at 1524 depending on whether the user has selected the "Create New" button 1708. If so, then at 1526 the code jumps to task 1600 in FIG. 20A. Referring now to FIG. 20A, the code responsible for creating a new session is shown, starting at 1600. First, the Reboot to New Session Screen is displayed. An example of this screen is shown at 1720 in FIG. 20B. This screen has several user interactive devices, such as buttons 1722, 1724, and 1726, which create a new non-suspendable (use-once, not saved to hardfile) session, create a new suspendable session, and create a new suspend once, resume many (SORM) (use once, saved to hardfile) session, respectively. The screen also has a user interactive device 1728 for indicating which of the suspended systems should form a basis for the new session. A user might want to create a new SORM system from the "Clean OS/2 Session" suspend file, for example. To facilitate selecting a base session, a user interactive device, such as button 1730, pulls down a list of the available suspend files for the sessions. Such user interactive devices are known to those skilled in the art. If the user does not select a new suspend file to use, the system state will be suspended to and resumed from the currently selected suspend file.

Referring back to FIG. 20A, next, the suspend flag is cleared in CMOS memory, at 1602, in preparation for creating a new session. Thereafter, at 1606, if the user elects to create a new non-suspendable session that is not a SORM session, then the suspend enable flag is cleared at 1608, thereby disabling the suspended system, which will cause the system to boot a clean session. Thereafter, at 1610, program execution jumps to task 420 to finish booting the clean system.

If instead the user chooses to create a suspendable session, at 1612, then the suspend enable flag and the suspend enable flag are set at 1614. These flags are used by the system to finish performing the necessary steps to create the suspendable session. Thereafter, at 1610, program execution jumps to task 420 to finish booting the suspendable system.

Finally, if the user chooses to create a suspend once, resume many (SORM) session, at 1616, then the suspend enable flag, the create suspend file flag, and the SORM flag are set, at 1618. These flags are used by the system to finish performing the necessary steps to create the SORM session. Thereafter, at 1610, program execution jumps to task 420 to finish booting the SORM system.

Referring back to FIG. 10, if the user has not selected the "Create New" button at 1708, then code execution branches at 1528, depending on whether the user selected a new suspend file from which to resume the system. The user does so by selecting one of the available sessions shown in windows 1702 and 1704 and selecting the "Resume" button 1706. If the user has selected a new suspend file, as tested at 1528, then the appropriate codes are set to cause the Resume Routine to resume the system from that particular suspend file, at 1530. Such codes might include indicating the suspend file in CMOS memory and possibly indicating the location of any swap file in CMOS memory. After the codes are set, then at 1532 code execution branches to the Resume Routine to resume the system from the selected suspend file.

If the Multiple Suspend/Resume Manager is not to be invoked, as tested at 1520, or if the user selects the "exit" button 1710, then the CPU 40 turns "off" the power supply at 340 by commanding the microcontroller U2 to pull the $\overline{ON}$ signal to a logical ZERO, thereby causing the primary/regulation unit 172 of the power supply 17 to stop providing regulated voltages along the ±5 and ±12 lines. The voltages take several seconds to ramp down to approximately zero, giving the CPU 40 time to execute numerous commands. Therefore, the CPU 40 executes an endless loop (a "spin"), at 342, as it waits for the system power voltages generated by the power supply 17 to decline until the CPU 40 stops functioning.

Referring now to FIG. 11, the details of the BootUp Routine are shown. The boot process was generally outlined in the text accompanying FIG. 8. The Boot-Up Routine starts at 380 when the CPU 40 jumps to and executes the code pointed to by the Reset Vector. This occurs each time the CPU 40 is powered up and whenever the CPU 40 is reset by jumping to the code pointed to by the reset vector. Such reset procedures are well known in the art.

The first task is to test the CPU 40 and initialize the memory controller 46, at 382. The CPU is tested by the POST routine. Part of the CPU test is to determine whether the CPU 40 is an "S" part having an SMI. If so, a flag is SET indicating this fact. The memory controller 46 is initialized by the POST routine.

Next, the Boot-Up Routine tests whether the microcontroller U2 is functioning, at 986. To do this, the CPU sequentially reads the status port of the power management circuitry 106 and waits for a transition from High to LOW and back from LOW to HIGH at that port. Such a transition indicates that the heartbeat of the microcontroller U2 is functioning; therefore, the CPU 40 can continue the booting process under the assumption that the microcontroller U2 is functioning as expected.

If the CPU does not detect a transition at the status port within a predetermined period of time, e.g., one or two seconds, then the microcontroller U2 does not have a heartbeat, and the CPU 40 commands the first PAL U1 to reset the microcontroller U2, at 988, as explained above. Then the CPU 40 again waits for a transition from HIGH to LOW at the status port, at 990. If the CPU again does not detect a transition at the status port within one or two seconds, then the microcontroller U2 does not have a heartbeat, and the CPU 40 disables the power management features described herein, at 992, under the assumption that the microcontroller U2 is in such a state that it cannot be reset.

On the other hand, if the microcontroller U2 is functioning, then the CPU 40 refreshes the minutes to wake alarm value in the microcontroller U2, at 994. The time-base of the RTC 98 is much more accurate than the time base of the microcontroller U2. Therefore, to overcome this limitation without adding a much more accurate and, therefore, expensive time base to the microcontroller U2, the BIOS synchronizes the less accurate time base to the more accurate time base and updates the minutes to wake alarm value within the microcontroller U2 with a more accurate value derived from the RTC 98 each time the system boots. To accomplish this, the CPU 40 reads the absolute alarm date and time from the CMOS memory 96, calculates the minutes to wake alarm value, and writes it to the microcontroller U2.

Thereafter, and if the microcontroller U2 is not functioning causing the power management features to be disabled, the Boot Routine determines if the system was booted due to the application of power to the power supply 17, at 996. Preferably, the power supply 17 always has AC power applied to its primary/regulation unit 172 and the regulation of power at the ±5 and ±12 lines is controlled by the ON# input. This way the power supply 17 can constantly provide the AUX5 needed to power the power management circuitry 106 and be controlled by the power management circuitry 106 without having it switch the AC power itself.

However, as is known to those skilled in the art, some users prefer to power their computer systems using a switched power strip (not shown), turning off and on the AC power to the entire system with a single switch. This poses problems for the power management circuit 106 because the microcontroller U2 and the other devices are configured to be constantly powered by the AUX5 power line. Therefore, the system must have a method of determining that it was powered by the application of behaving accordingly.

However, the AUX5 line is also subject to blackouts and brownouts, as explained above. After a blackout or brownout, the reset subcircuit 920 resets the microcontroller U2 to prevent it from hanging due to the out of tolerance voltages. Therefore, the system must be able to further determine whether the microcontroller was awakened after a brownout or after the application of AC power.

Consequently, at 996, the CPU queries the microcontroller U2 about the event that caused the power supply 17 to be turned on. The microcontroller can return any one of four responses: (1) it was reset and, therefore, caused the power supply 17 to begin providing regulated power at the ±5 and ±12 lines, (2) the minutes to wake alarm expired, (3) a ring occurred at either the RS232 ring input or the ring input from the optoisolator OPTO1, and/or (4) the switch 21 was pressed. The reason for the system being powered on can be read directly from the microcontroller U2 by application programs, such as a scheduler, which would execute certain programs responsive to the particular reason the system was powered up. In the alternative, the reason for powering up the system can be made available via one or more BIOS calls.

Other than being reset by the CPU 40, the microcontroller U2 is only reset by the reset subcircuit 920, which resets the microcontroller whenever either the AUX5 line is applied or it glitches. Therefore, if the microcontroller U2 was reset, or if the microcontroller returned an invalid wakeup code, which is tested at 997, the CPU 40 must then determine whether the power supply should continue the regulation of power at the ±5 and ±12 lines or not, at 998. To this end, a flag in CMOS NVRAM called DEFAULT_ON is used. If this flag is SET, then the power supply 17 should continue providing regulated power after the microcontroller U2 is reset. On the other hand, if DEFAULT_ON is not SET, then the power supply 17 should cease providing regulated power after the microcontroller U2 is reset and, therefore, the CPU 40 commands the microcontroller U2 to cause the power supply 17 to cease providing regulated power at the ±5 and ±12 lines, at 1000. Thereafter, the voltages take several seconds to ramp down to approximately zero, giving the CPU 40 time to execute numerous commands. Therefore, the CPU 40 executes an endless loop (a "spin"), at 1002, as it waits for the system power voltages generated by the power supply 17 to decline until the CPU 40 stops functioning, at 1004. As mentioned above, the microcontroller U2 is preferably constantly powered by the AUX5 line and continues executing its programmed routines.

Thereafter, if the microcontroller returned a valid wakeup code, at 997, or if the microcontroller U2 was reset, but the system, is to remain powered, at 998, the CPU 40 commands the microcontroller U2, at 1004, to generate an SMI back to the CPU 40 before it causes the power supply 17 to cease providing regulated power at the ±5 and ±12 lines in the event the microcontroller U2 deems that the power should be turned off. Also, at 1004, the CPU SETs the DEFAULT_ON bit in the CMOS NVRAM so that if AC power is lost, the system will turn itself back on after AC power is reapplied.

As described herein, the inactivity suspend timer can have two intervals, one being a relatively longer interval before expiration, or there can be two inactivity suspend timers, one with a relatively longer interval of time before expiration than the other. Next, at 1540, the system determines which interval should be used (or which timer should be active). At 1540, the system tests whether the system was turned on because of user action as compared to the system being turned on in an unattended fashion, as by a ring of the attached telephone line or by the internal alarm. User action in this context means that the user pressed the power button or performed some other task that caused the system to power up. If the system turned on because of user action, then the inactivity suspend timer is set to its longer interval, at 1542. If the system turned on for a reason other than because of user action, then the inactivity suspend timer is set to its shorter interval, at 1544.

Regardless of which interval is used, the Boot Routine next performs the first Plug & Play resource allocation pass, at 1006, as known to those skilled in the art.

Next, the shadow memory is tested and the BIOS is copied from ROM 88 to the shadow memory portion of RAM 53. The flow of the executed code depends on whether the Suspend Flag is SET in CMOS NVRAM 96. If the Suspend Flag is SET, then the computer system 10 is in the suspend state 150, and the computer system 10 should be restored to the state it was in when it was suspended. The system RAM 53 in segments E000H and F000H are given an abbreviated test. To reduce the amount of time the computer takes to resume, the memory is merely checked for proper size and zeroed (000H is written to each location).

On the other hand, if the Suspend Flag is CLEARed in CMOS NVRAM 96, then the system RAM 53 in segments E000H and F000H are given the standard, in-depth memory test comprising: (1) a sticky-bit test, (2) a double-bit memory test, and (3) a crossed address line test. These tests are well-known in the art.

After segments E000H and F000H are tested, the BIOS may be shadowed which involves copying the contents of the ROM BIOS 88 to the system RAM 53 and configuring the memory controller to execute the BIOS from RAM. Shadowing the BIOS is done to increase the speed of the system; system performance is enhanced because the BIOS is running from the faster system RAM 53 (a typical access time is 80 nanoseconds) rather than the slower ROM 88 (typical access time 250 nanoseconds). Shadowing the BIOS comprises loading a BIOS copier to an address in lower memory, copying the BIOS from the ROM 88 to the segments E000H and F000H of the system RAM 53, and enabling the shadow RAM.

Next the video controller 56 is tested and initialized and the video memory 58 is tested, both at 384. These tests and initializations are well known in the art.

Then, the Boot Routine performs the second Plug & Plan resource allocation pass, at 1008, as known to those skilled in the art.

The flow of the executed code depends on whether the Suspend Flag is SET in CMOS NVRAM 96, at 386. If the Suspend Flag is SET, then the remaining system RAM 53 is merely checked for size and then zeroed, like task 383. If, however, the Suspend Flag is CLEARed in CMOS NVRAM 96, then the remaining system RAM 53 is tested at task 398 using the three-step, in-depth memory test described in the text accompanying task 383.

After the memory is tested, the auxiliary devices—including the 8259, the UARTs, the 8042, and any others—are tested and initialized, at 400. At task 408, the fixed disk controller is initialized.

The flow of the executed code depends on whether the Suspend Flag is SET in CMOS NVRAM 96, at 409. If the Suspend Flag is SET, indicating that the state of the system was successfully saved when power was last removed, then the Boot-Up Routine skips the test of the hard drive controller 86 and hard drive 31. On the other hand, if the Suspend Flag is CLEARed in CMOS NVRAM 96, indicating that the state of the system was not saved when power was last removed, then the Boot-Up Routine performs a complete test of the fixed disk controller 86 and hard drive 31, at task 410, as is well known in the art.

Next, the floppy drive controller 84 is tested and initialized at 412.

At this time, all the devices are initialized and the vectors point to known locations, so all interrupt routines will work as expected. Therefore, the Boot-Up Routine snapshots the BIOS Data Area & Vector Table, at 414, which writes a copy of the BIOS Data Area and the Vector Table to the data structure in segment E000H. This copy of the BIOS Data Area and the Vector Table is used by the Suspend Routine at task 274 to place the computer system 10 into a known state, with all interrupts working as expected.

Next, any BIOS extensions are "scanned in" and initialized at 416 as is well known in the art. BIOS extensions are blocks of BIOS code added to the system by peripheral adapters, such as network adapters. BIOS extensions are typically located in segments C000H and D000H on the ISA bus 76 and have an associated "signature" to identify the BIOS extension as such. If a BIOS extension is detected, the length is checked and a checksum is calculated and checked. If the signature, length, and checksum all indicate that a valid BIOS extension exists, program control passes to the instruction located three bytes past the signature and the BIOS extension can perform any needed tasks such as the initialization of the peripheral adapter. Once the extension finishes execution, control passes back to the Boot-Up Routine, which searches for more BIOS extensions. Any more BIOS extensions are handled like the BIOS extension above. If no more BIOS extensions are detected, the Boot-Up Routine then moves to task 417.

Then, at 1010, the CPU reads the state of the CMOS memory and writes it to the hard drive.

Figure 21:
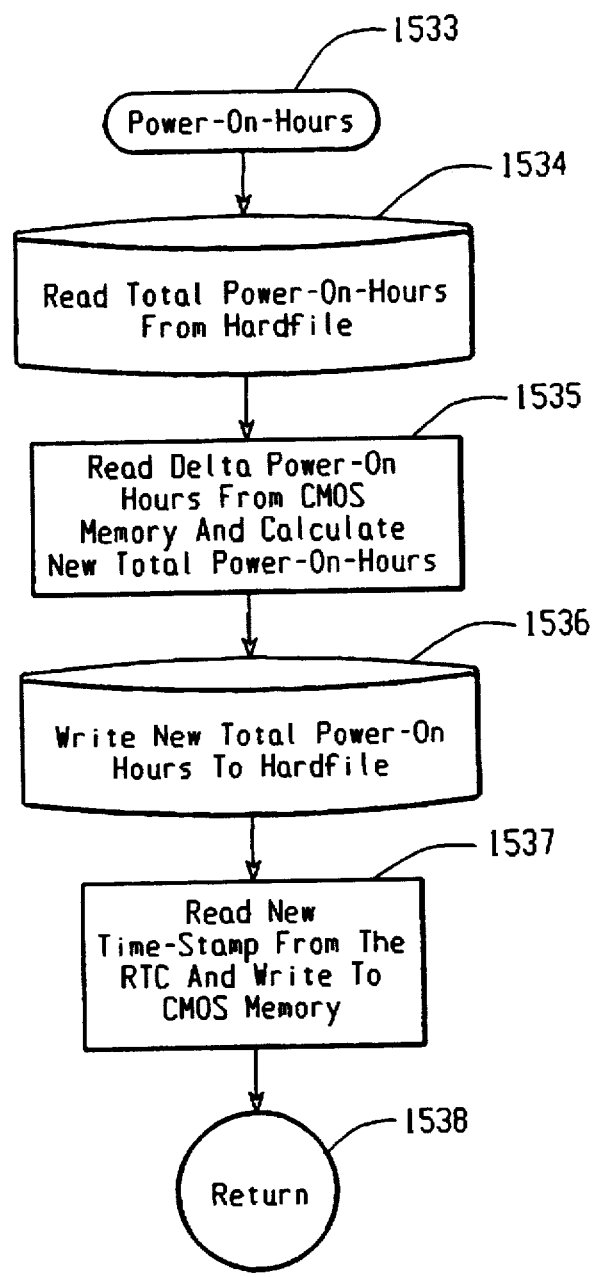
FIG. 21 is a flow chart showing the details of the second stage of the routine of the present invention that determines and saves the power on hours data.

Then, at 1548, the routine at FIG. 21 is invoked to calculate and save the total elapsed time the system has been powered on. As described in more detail herein, the total power on hours is saved in a two-stage process. During the first stage, the power-on hours delta is calculated and saved to CMOS NVRAM. During the second stage, the power on hours delta is added to the total power on hours and the new total power on hours delta is saved to the hard drive. The routine invoked at 1548 is the second stage of the two-stage power on hours saving process.

Referring now to FIG. 21, the second stage of the power-on hours routine is shown starting at 1533. First, the CPU reads the total system power-on hours from the hardfile at 1534. The total power on hours is stored is preferably stored in a special portion of the hard drive, which is not accessible by the average user. For example, the power on hours might be saved in a special disk partition that is not easily deleted or modified by users. Preferably the special partition is inaccessible by any of the FAT-based operating systems, e.g., at the last cylinder of most hard drives. The total power on hours value stored on the hard drive is the total elapsed time the computer has been in use, except for the elapsed time of the latest session, which is stored in CMOS memory as the power on hours delta. Therefore, the power-on hours delta is read from CMOS memory and added, at 1535, to the total hours read from the special partition on the hard drive 31 in the immediately preceding step. Next, the new (updated) total power-on hours is written back to special partition on the hard drive 31, at 1537. Finally, a new time-stamp is read from the RTC and written to CMOS memory, at 1537, to allow the next power-on hours delta to be calculated as the system is powered down. Lastly, the code returns to the calling program, at 1538. Thus concludes the second stage of the power on hours code.

Figure 23:
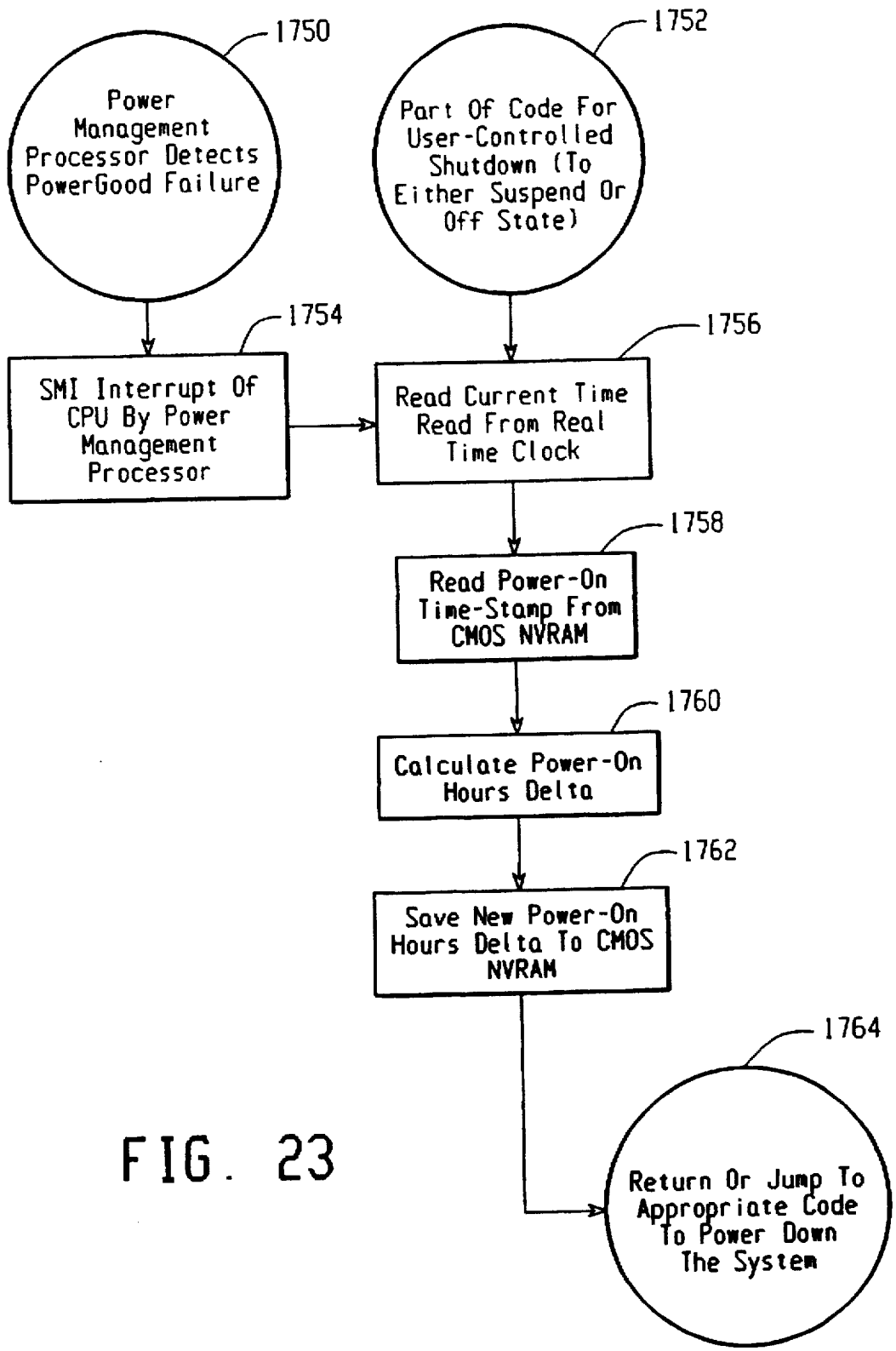
FIG. 23 is a flow chart showing the details of the first stage of the routine of the present invention that determines and saves the power on hours data.

During the first stage of the power on hours code, the power on hours delta, which represents the interval of time the system was used most recently, is calculated. Referring now to FIG. 23, the first stage of the power on hours code is shown. As explained elsewhere, before the microcontroller U2 powers down the system, it interrupts the CPU 40 by asserting the SMI line. Consequently, the CPU performs certain tasks under the assumption that the system will be powered down imminently. Preferably, this involves calculating and saving certain information to the CMOS NVRAM, such as the power-on delta described above, as measured by an elapsed power-on hours timer. Thereafter, the CPU 40 permits the microcontroller U2 to power down the system. Thus, the first stage of the power on hours routine can be entered at 1752 as part of the code responding to a user-controlled shutdown.

In addition to the controlled system shutdown, to be of value, the power on hours must also be calculated even if the system loses power for an unknown reason, such as the user pulling the plug, thereby cutting off the flow of AC power from the standard AC outlet. Consequently, the first stage of the power on hours routine must be invoked, at task 1750, when the power fails or is otherwise removed from the system. As described herein, the power management processor U2 monitors the POWERGOOD signal, which indicates when the system power lines are within tolerance. After the POWERGOOD signal is negated, the CPU has at most approximately 1 millisecond of reliable power. Thus, not enough time remains to write any data to the hard drive. However, as described immediately below, there is enough time to calculate the power on hours delta and save it to the CMOS NVRAM. Thus, at 1754, the power management processor U2 interrupts the CPU via the CPU's SMI.

In response to the SMI, or in response to a user-controlled shutdown, the CPU reads the current time from the real time clock (RTC), at 1756. Optionally, this value can be checked to ensure that has not been altered by the user, e.g., the user substituted a value that will cause the power on hours delta to be a negative value to thereby reduce the total power on hours value, rather than increase it. Recall that at 1537, a time-stamp was read from the RTC and saved to the CMOS NVRAM. At 1758, this power on time-stamp is read from CMOS NVRAM. Again, optionally, this value can be checked to ensure that that has not been altered by the user, e.g., the user substituted a value that will cause the power on hours delta to be a negative value to thereby reduce the total power on hours value, rather than increase it.

Next, at 1760, the power on hours delta is calculated from the power on time stamp and the current time. Once again, optionally, this value can be checked to ensure that that has not been altered by the user, e.g., the user substituted a value that will cause the power on hours delta to be a negative value to thereby reduce the total power on hours value, rather than increase it. Then the calculated power on hours delta is saved to the CMOS NVRAM, at 1762.

Finally, at 1764, the code either returns to perform other tasks, in the case of the user-controlled shutdown, or causes program execution to jump to a routine to power off the system (e.g., task 340), in the case of power failure.

As described above, the last (inner) cylinder of the hard drive is the preferable location of the special partition used to store the total power on hours, the number of power cycles, and the past error codes and the dates on which they occurred. One suitable data structure for this partition is as follows. At the beginning of the partition is a signature header that can be used by the BIOS to verify that the partition is used for saving the data described above. Next, data can be located in fixed locations thereafter. Preferably, however, next are located relative offset pointers that point to data blocks located after the pointers. The pointers have a header portion that identify exactly what is located at the relative offset portion and point to, e.g., Plug & Play allocation data, system total power on hours, system power cycle data, specific peripheral power on hours and cycles, etc. In the alternative, the pointers do not have a header portion; rather the pointers are merely relative offset pointers into the data block, and a header portion is part of each data block.

In the example described above, only the total power on hours for the entire system is stored. In the alternative, many different power on hours values can be stored. For example, if a new component, e.g., a new hard drive, is added, a separate total power on hours value can be created just for the new component. The various power on hours values would all be stored preferably in the special partition and would all be added to the new power on hours delta each time the system is booted, at the code in FIG. 21.

In addition, other system parameters can be written to the hard drive at power on along with the new total power on hours. For example, the total number of times the system was powered on might be beneficial to save. In this case, each time the system boots, the current number of times the system was booted can be read from the hard drive, incremented by one, and written back to the hard drive. As another example, systems detect various system errors and associate a code with particular errors. Users may or may not write down or even respond to error codes. Therefore, it might be beneficial to store a certain number of error codes and the dates on which they occurred to the special partition on the hard drive. Like the total power on hours described above, the error codes for the current session can be stored in CMOS NVRAM each time the system is powered down, and then written to the hard drive the next time the system boots. The difference being that all the error codes (or a fixed number stored in a first-saved, first discarded fashion) would be saved separately instead of only saving one, as with the total power on hours value.

In the structure described above, POWERGOOD is used to detect the system being turned off. Responsive to this signal, the first stage of the parameter saving routine is performed. POWERGOOD monitors the regulating stage of the power supply 17. That is, when the regulated voltages attain levels within acceptable tolerances, the POWERGOOD signal changes to a logical ONE; whenever either the +5 or +12 Volt lines fall out of tolerance, the POWERGOOD signal becomes a logical ZERO, thereby indicating voltages out of tolerance. Thus, the POWERGOOD signal is tied to the regulated system voltages and by the time POWERGOOD indicates an out of tolerance condition, the CPU only has approximately 1 millisecond of processing time left.

In the alternative, the power supply 17 can be modified to provide an ACGOOD signal, shown in FIG. 5. The ACGOOD signal would monitor the AC input from the wall outlet to the primary stage of the power supply 17. When the AC input to the power supply 17 reaches certain predetermined parameters, the ACGOOD signal becomes a logical ZERO, indicating that the input to the power supply is failing. It is believed that such an ACGOOD signal transitioning to ZERO would indicate failing system voltages many tens of milliseconds before a POWERGOOD transition to ZERO will indicate system voltages out of tolerance. The exact circuit that generates the ACGOOD signal is not critical; it may differ depending on the particular amount a particular power supply can tolerate variances in AC input without showing effects in the system voltages. It is believed that those of ordinary skill in the art are able to design the particular circuit needed to monitor the AC input. Such a circuit might monitor the RMS voltage of the AC input and trigger the ACGOOD transition to ZERO when the RMS value falls below a particular threshold, as measured by a comparator. Many other circuits are contemplated by the present invention.

The ACGOOD signal is tied to the CPU via the coprocessor U2, like the POWERGOOD signal. A ONE to ZERO transition of the ACGOOD signal causes the coprocessor U2 to generate an SMI to the CPU. In response to the SMI, the CPU interrogates the coprocessor U2 to determine the cause of the SMI. If the ACGOOD transition caused the SMI, then the CPU can perform a certain set of tasks, knowing that there remains approximately 30 milliseconds of reliable processor time. The approximately 30 milliseconds of power provides the CPU with enough time to write a small amount of data to the hard drive. Thus, the ACGOOD signal coupled to the CPU via the coprocessor U2 provides a one-step alternative to the two step process described herein to determine and save the power on hours value to the hard drive. Instead of using two stages, the CPU calculates and writes the power on hours value to the hard drive responsive to an ACGOOD generated SMI. The process is the same as shown in FIGS. 21 and 23, except the power on hours delta would not need to be stored in the CMOS NVRAM for a period of time.

In addition, depending on the amount of reliable processor time provided by the particular ACGOOD signal, the other system parameters described herein, e.g., power on cycles, error codes, and error dates, could be saved to the hard drive in a single step in response to the ACGOOD signal transition to ZERO.

Referring back to FIG. 11, after the power-on hours value is determined and saved, the system determines if the Multiple Suspend/Resume Manager is to be invoked, at 1550. If so, then the Multiple Suspend/Resume Manager Screen is displayed, at 1552.

The Multiple Suspend/Resume Manager screen is shown in FIG. 22 and described in the text accompanying FIG. 22, above.

Code execution then branches at 1554 depending on whether the user has selected the "Create New" button 1708 of the Multiple Suspend/Resume Manager Screen 1700. If so, then at 1556 the code jumps to task 1600 in FIG. 20A. If not, then code execution branches at 1558, depending on whether the user selected a new suspend file from which to resume the system. The user does so by selecting one of the available sessions shown in windows 1702 and 1704 and selecting the "Resume" button 1706 of the screen 1700. If the user has selected a new suspend file, as tested at 1558, then the appropriate codes are set to cause the Resume Routine to resume the system from that particular suspend file, at 1560. Such codes include indicating the suspend file in CMOS memory and possibly indicating the location of any swap file in CMOS memory. After the codes are set, then code execution branches to task 419 to possibly initialize the adapters and thereafter resume the system from the selected suspend file.

If the Multiple Suspend/Resume Manager is not to be invoked, as tested at 1550, or if the user selects the "exit" button 1710 thereby indicating that a new suspend file was not selected at 1558, then the code continues at task 418 by testing the suspend flag.

At 417 the Boot-Up Routine searches for a partition on the hard drive 31 that appears to be partition specifically allocated for the Suspend File. If a partition with a PS/1 identifier "FE" or a hibernation partition with the identifier "84" in the partition table is found and that partition is large enough to accommodate a Suspend File for this particular system, then that partition is used for the Suspend File. Consequently, the Suspend File Signature is written to the first bytes of the area, and the starting head, sector, and cylinder of the area are written to CMOS NVRAM 96.

The flow of the executed code then branches, depending on whether the Suspend Flag is SET in CMOS NVRAM 96, at 418. If the Suspend Flag is cleared, then the Boot-Up Routine passes control to the PBOOT routine at 420, which executes the routine of FIG. 16 and passes control to the operating system, at 1012. PBOOT is well known in the art and is responsible for loading the operating system (OS) and command interpreter from either a floppy disk or the hard drive 31. If a partition for the Suspend File was not found at task 417, then the OS executes an OS-specific driver described checks text accompanying FIG. 16 that checks whether a partition was found, and if not allocates a file of contiguous sectors (defragmenting an area if necessary) in the FAT, writes the signature to the first bytes of the Suspend File, and writes the starting head, sector, and cylinder of the Suspend File to the CMOS NVRAM 96.

Regardless of when the Suspend File is allocated, the file should be contiguous sectors to allow a rapid write to disk and a rapid read from disk during suspends and resumes, respectively.

The OS next configures the system based on the instructions found in the CONFIG.SYS file. Lastly, the OS executes the AUTOEXEC.BAT file, which eventually passes execution control back to the operating system. If the Suspend Flag is cleared in CMOS NVRAM 96, indicating that the state of the system was not saved when power was last removed, then RESUME.EXE, which is explained more fully in the text accompanying task 421, is ignored.

Referring back to task 418, if the Suspend Flag is set in CMOS NVRAM 96, indicating that the state of the system was saved when power was last removed, then the flow of the executed code then branches, depending on whether the Reinitialize Adapters Flag is SET in CMOS NVRAM 96, at 419. If the Reinitialize Adapters Flag is set, then the Boot-Up Routine passes control to the PBOOT routine at 421. Like the usual PBOOT Routine, PBOOT of the present invention loads the OS, which configures the system in accordance with the commands found in the CONFIG.SYS and AUTOEXEC.BAT files, which, inter alia, load drivers and configure the system as is well known in the art.

The commands in CONFIG.SYS and AUTOEXEC.BAT may initialize adapter cards in the system. This application presumes three types of adapter cards exist: Type I adapters do not need initialization; Type II adapters require initializing, but are placed into a known working state by the BIOS extension or the driver loaded as per the CONFIG.SYS or AUTOEXEC.BAT files; and Type III adapters are modified by code executing on the system. Systems comprising Type I and Type II adapters may be suspended and restored; however, systems comprising Type III adapters, which include many networking adapters, may not be restored, unless the cards have an associated APM aware device driver that reinitializes the adapter after certain conditions occur, such as system power being removed. Systems may suspend Type III cards that have an APM aware device driver.

The file RESUME.EXE is added to the AUTOEXEC.BAT file in the preferred embodiment and is responsible for transferring program control from the OS to the Resume Routine. The OS in task 420 ignores the presence of RESUME.EXE; however, the OS of task 421 executes RESUME.EXE, which passes control to the Resume Routine after the Type II adapters are finished being initialized by the device drivers loaded by the OS from CONFIG.SYS AND AUTOEXEC.BAT.

Referring back to task 419, if the Reinitialize Adapters Flag is cleared in CMOS 96, the OS passes execution control to the Resume Routine via RESUME.EXE. The Resume Routine restores the system state from the Suspend File on the hard drive and is described in detail in the text accompanying FIG. 12.

Referring now to FIG. 12, the details of the Resume Routine, tasks 450 through 530, are shown. First, the CPU is tested at 451. If the CPU 40 has an SMI, then a CPU resume SMI is generated, which places the CPU into SMM mode and jumps to the code at task 454. If the CPU does not have an SMI, then a resume shutdown occurs, in which a reset is caused and the reset handler jumps to the code at task 454. During the configuration process, the BIOS Data Area & Vector Table is probably modified to an unknown state; therefore, the basic BIOS routines may or may not function as expected. Consequently, the Resume Routine enables segment E000H as read/write, at 454, and calls the Swap BIOS Data Area & Vector Table Routine at 456. This routine swaps the known, good BIOS Data Area & Vector Table, which was copied to segment E000H in task 414, with the modified BIOS Data Area & Vector Table, which is currently active in segment 0000H. When the routine is finished, the known BIOS Data Area & Vector Table is active in segment E000H, the modified BIOS Data Area & Vector Table is in segment E000H, and the BIOS routines will function as expected.

Next, the Resume Routine disables all interrupts except those supporting the keyboard and the hard drive, at 458. Then, the Resume Routine locates the appropriate Suspend File on the hard drive 31, at 1570. As mentioned herein, the system can have a plurality of suspend files; the appropriate suspend file must be located by the Resume Routine. The suspend file can be selected by a user via the Multiple Suspend/Resume Manager, an example of which is shown in FIG. 22. In addition, the operating system can determine from which suspend file the system will resume, as described herein. Next the Resume Routine reads the file size and the signature, which, as explained above, is the multi-byte identifier for the Suspend File. The flow of the executed code then branches, at 462, depending on whether the Suspend File has the correct size and signature. If the Suspend File does not have the correct size and signature, then the Resume Routine CLEARs the Suspend Flag in CMOS memory 96, at 464, and program control is passed to the code in the location pointed to by the Reset Vector, at 466, thereby causing the system to boot as though the system was never suspended. On the other hand, if the Suspend File has the correct size and signature, then the Resume Routine continues with the system resume by reading the 64K block in the Suspend File located after the signature (the portion of the Suspend File that corresponds to the segment E000H information) to segment 1001H, at 468.

Next, the checksum of the block in 1000H is calculated, at 470, the previously stored checksum is read from CMOS non-volatile memory 96, at 472, and the flow of the executed code then branches, at 474, depending on whether the checksum calculated in task 470 is the same as the checksum calculated in task 330. If the checksum calculated in task 470 is not the same as the checksum calculated in task 330, then the Suspend File is somehow flawed (for example, it may have been tampered with) and control passes to task 464, which CLEARs the Suspend Flag and resets the system, as explained in the text accompanying tasks 464 and 466. If the checksum calculated in task 470 is the same as the checksum calculated in task 330, then the Suspend File is presumed to be the same one written by the Suspend Routine, and the data in segment 1000H is copied to segment E000H, at 476.

Now, the Resume Routine writes to the screen, at 478, a special signal screen informing the user that the system is being restored and that the user should press Ctrl-Alt-Del to abort the resume. As with the Suspend Routine, pressing Ctrl-Alt-Del clears the Suspend Flag, at 526, and causes the system to reboot, at 528.Thus, the system reboots normally when Ctrl-Alt-Del is pressed and the Resume Routine is executing.

Then, the 82077 diskette controller 84 and the DMA unit 71 are restored by writing the values from the segment E000H data structure to their respective registers, at 480 and 482, respectively.

Next, an interrupt-driven parallel thread to restore the state of any modems from the E000H data structure is started, at 1020. As with the routine at task 976, the modem restore routine captures the interrupt corresponding to the COMM port associated with the particular modem, reads values from the E000H data structure, transmits commands and values to the modem to cause it restore the registers therein. This routine transmits a first command to the modem, and then responds in an interrupt-driven fashion, receiving the modem's response and transmitting the next value to the modem responsive to each COMM port interrupt, until all the modem's registers have been restored. Like the modem save routine, if not executed as a parallel thread, this routine could add several seconds to the time it takes to resume the system. Being an interrupt-driven parallel thread, it adds little or no time to the resume, if it fully executes before the system state is read from the hard drive 31.

After the interrupt driven parallel thread modem restore routine is started, at tasks 486 through 500, the system memory is restored from the Suspend File using a twin buffer routine similar to the routine explained in the text accompanying tasks 304 through 318 in the Suspend Routine. This twin-buffer system reads compressed data from the Suspend File, writes it into segment E000H, decompresses it, and writes it to the system memory. Two routines work in a time-multiplexed arrangement: one reads data from the Suspend File and writes it into segment E000H, and the other decompresses the data and writes the decompressed data to the system memory. The latter is running in the foreground, the former is an interrupt-driven routine that runs in the background. Obviously, since there is only one CPU 40, only one routine can execute at a given time; however, because the former routine is interrupt-driven, it can interrupt the execution of the latter routine as needed to optimize the speed of transfer of the data from the Suspend File. Each of the two buffers is 8 kilobytes long, which is believed to optimize transfer time.

This process starts at 486 with the reading from the Suspend File and writing to segment E000H of enough data to fill the first of the 8K buffers. At this time, the Read from Buffer Routine, which is generally indicated at 489, is started, at 306. The Read from Buffer Routine 489 is an interrupt-driven routine that runs in the background and is comprised of tasks 490–492. The Decompression Routine, generally indicated at 493, comprises tasks 494–498 and is the foreground routine. First, the Read from Buffer Routine 489 starts reading the next 8K of the Suspend File and writing it to the other buffer, now the current buffer, at 490. While the Read from Buffer Routine 489 reads the next 8K from the Suspend File and writes it to the current buffer, the Decompression Routine 493 reads the buffer filled by task 486 decompresses the compressed data, and writes the decompressed data to the system memory, at 494. Once the Decompression Routine 493 has decompressed all the data in that buffer, the next step is to determine if the entire system memory has been decompressed yet, at 496.

The IDE controller 86 cannot read data from the hard drive 31 very quickly. As a consequence, the Decompression Routine 493 will always finish decompressing the 8K buffer not being written to the hard drive 31 before the Read from Buffer Routine 489 finishes reading data into the current buffer from the hard drive 31. Therefore, the Decompression Routine 493 must wait for the Read from Buffer Routine 489 to finish reading data from the hard drive 31. If the Decompression Routine 493 has not finished compressing and writing all of system memory, then the Decompression Routine 493 waits for the Read from Buffer Routine 489, at 498. The Decompression Routine 493 and the Read from Buffer Routine 489 communicate via a set of flags. When the Read from Buffer Routine 489 finishes reading data from the Suspend File into the current buffer, the Routine 489 next switches the buffer flags, at 490, indicating to the Decompression Routine 493 that it may start decompressing the data in the buffer that was just read from the Suspend File.

The Read from Buffer Routine 489 then decides if an 8K block remains to be read from the Suspend File, at 492. If not, the Read from Buffer Routine reads the remaining data from the Suspend File and writes it to the current buffer, at 502. The Read from Buffer Routine then ceases running in the background, in effect waiting at 500 for the Decompression Routine to finish decompressing the last memory.

In the mean time, the Decompression Routine 493, by examining the buffer flags, determines that a buffer is ready for decompression to system memory. That is, the Decompression Routine waits at 498 until the Read from Buffer Routine finishes with the current buffer, at which time the decompression loop continues at 494.

Once the Decompression Routine 493 is finished decompressing all the system memory, the only background routine executing is the interrupt-driven modem restore routine explained in the text accompanying task 1020 and the main program continues at 504.

Next, the video controller 56 and the IDE controller 86 are restored, at 504 and 506 by writing the values from the E000H data structure to the registers within each of the two devices. Task 504 is also the point to which the Suspend Routine jumps (see task 1024) if a Checkpoint is being taken.

Then, at 1022, the Resume Routine tests whether the interrupt-driven modem restore routine described in the text accompanying task 1020 is finished. If not, it waits for this routine to finish.

As shown at 508, after the interrupt-driven modem state restore routine is finished, the CPU cache 41 and the system cache 60 are enabled by writing appropriate values to the CPU 40 and the cache controller 62, respectively. Next, the Resume Routine restores the state of the timer controller 102, the 8042 keyboard interface microprocessor 104, and the 8259 interrupt controller 92 by writing values from the segment E000H data structure to the registers within the respective devices, at 510 through 514.

Next, the UARTs 94 are restored by writing the values from the segment E000H data structure to their respective registers, at 484.

Next, the Resume Routine calls the Swap BIOS Data Area & Vector Table Routine, at 516. Before the routine is called, the known BIOS Data Area & Vector Table is active in segment 0000H and the BIOS Data Area & Vector Table read from the Suspend File is inactive in the segment E000H data structure. After the swap, the known BIOS Data Area & Vector Table is inactive in segment E000H and the BIOS Data Area & Vector Table that was saved by the Suspend Routine is active in segment 0000H.

Lastly, the Resume Routine jumps to the Restore CPU Routine, at 518, which restores the CPU 40 to the state before it was suspended. The Restore CPU Routine will be explained more fully in the text accompanying FIG. 14. The Restore CPU Routine eventually passes execution control back to the APM.

Finally, the CPU 40 executes a RETURN instruction, causing the system to return to the APM. The system now continues executing code as though the system was never suspended. For all practical purposes, the system is unaffected by the suspend/resume procedure.

Referring now to FIG. 13, a flow chart of the Save CPU State Routine is shown. The Suspend Routine jumps to the Save CPU State Routine at 600. Note that the APM enabled segments E000H and F000H, from which these routines execute, as read/write. In addition, EFLAGS and the eight general purpose registers were saved by the APM, as indicated at 602. The Save CPU State Routine first waits for any DMA to finish and synchronizes to the mouse 13 data packet, at 604, to ensure that this routine executes between mouse packet transmissions. The following steps allow DMA to finish and synchronize to the mouse packet: (1) enable interrupts, (2) wait 7 milliseconds for any DMA to finish, (3) disable interrupts, (4) wait 5 milliseconds for a mouse packet boundary, (5) enable interrupts, (6) wait 5 more milliseconds for the mouse packet to arrive, and (7) disable interrupts. After these steps, the code may safely execute between mouse packets.

Next, the state of Address Line 20 (I/O port 92H) is PUSHed onto the Stack, at 606.

The flow of the executed code then branches, at 1030, depending on whether the CPU 40 is an "S" part having an SMI. If so, the CPU 40 commands the microcontroller U2 to generate an SMI back to the CPU 40, at 1032. In response to the SMI, microcode within the CPU 40 saves the state of the CPU 40 to E000:FE00H in the E000H data structure, at 1034. Thereafter, the CPU 40 saves the state of the floating point coprocessor, at 1036, and calls the Suspend Routine (FIG. 10), at 1038. As explained elsewhere, the Suspend Routine then returns, at 1040, and restores the state of the floating point coprocessor, also at 1040. Thereafter, at 1042, a RSM (resume) instruction restores the CPU state and then branches to 732.

On the other hand, if the CPU 40 does not have an SMI, the CPU state must be saved using the remainder of the FIG. 13 code and the state of the arithmetic coprocessor 44 is PUSHed onto the Stack, at 608. Then, at 610, a flag is SET of CLEARed to indicate whether the CPU is executing in 32-bit or 16-bit mode, respectively.

The flow of the executed code then branches, depending on whether the CPU 40 is executing in Protected Mode or not, at 612. If the CPU 40 is not executing in Protected Mode, then it must be executing in Real Mode and the registers may be saved in a very straightforward manner. First, the values in the machine status word and CR3 are written to the segment E000H data structure, at 614. Also at 614, zero is written into the segment E000H data structure in the areas corresponding to TR and LDTR, because TR and LDTR are zero in Real Mode.

The code then merges with a common code path at 616, where the values stored in GDTR and LDTR are written to the segment E000H data structure. Next the flow of the executed code then branches, depending on whether the CPU 40 was executing in Virtual 8086 Mode or not, at 618. If the CPU 40 is not executing in Virtual 8086 Mode, then the code continues down the common path to task 620, where the debug registers DR7, DR6, DR3, DR2, DR1, and DR0 are PUSHed onto the Stack. These registers are being used by debuggers and other routines. Then DS, ES, FS, and GS are PUSHed onto the Stack, at 622. Next, the values in CS, SS, and ESP are written to the segment E000H data structure.

At this point, all the values to be written to the segment E000H data structure have been written, so the Shadow RAM segments E000H and F000H can be changed back to read-only, at 626. Next, the CPU cache 41 is flushed using the Write-Back and Invalidate Cache command, at 628.

Lastly, a unique Shutdown Flag is SET in the CMOS non-volatile memory 96, at 630. Finally, the Save CPU State Routine "Returns," in effect, to the Suspend Routine, at 632. The "Return" is actually a RESET followed by a branch in the code. The CPU 40 resets by JUMPing to the code pointed to by the Reset Vector. Resetting the CPU 40 forces the CPU into Real Mode, where all the devices and memory locations may be accesses without fear of generating a protection fault. After this point, the state of the CPU has been saved and the Suspend Routine must save the state of the rest of the system.

Within the code pointed to by the Reset Vector, program control branches, depending on whether the Shutdown Flag is SET in the CMOS 96. If the Shutdown Flag is CLEARed, then the system boots as it normally would. On the other hand, if the Shutdown Flag is SET, then the code branches to the rest of the Suspend Routine; that is, execution control jumps to task 253 in FIG. 10 within the Suspend Routine, which finishes suspending the system 10. Thus, the Save CPU State Routine effectively "Returns" to the Suspend Routine at 632.

Referring back to task 612, if the CPU is in Protected Mode, then the code branches, at task 634, depending on whether the CPU is in Virtual 8086 Mode, or not. If the CPU is not in Virtual 8086 mode, then the code again branches, at task 636, depending on whether the current privilege level is zero. If the current privilege is anything but zero, then a routine without proper privilege is executing the Save CPU State Routine, and the Fatal Suspend Error Routine (starting at task 652) is called. The Fatal Suspend Error Routine will be discussed below. If program control returns from the Fatal Suspend Error Routine, then the CPU must be returned to its condition before the Save CPU State Routine was called, so program execution branches to task 794, in FIG. 14, which performs a partial restore of the CPU. Only a partial restore is necessary because very little in the CPU has been modified.

Referring back to task 636, if the calling code has the proper privilege level, then the save continues, at 642, as the values in CR0, CR3, TR, and LDTR are saved to the segment E000H data structure. Then this code path merges with the common code path at 616, where the values in GDTR and the IDTR are saved to the E000H data structure, as explained above. From here, the code follows the path from 618 to 632 that was explained above, resulting in a "Return" (RESET plus a branch) to the remaining Suspend Routine code.

Referring back to task 634, if the CPU 40 is in Virtual 8086 mode, then execution continues at 644, where the value of the machine status word (the lower 16 bits of CR0) is saved to the E000H data structure and a Flag in the segment E000H data structure is SET indicating that the CPU is in Virtual 8086 Mode. This code then merges with the common code at 616 via the transfer 646 and 648. At task 618, if the CPU was in the Virtual 8086 Mode, then control branches to 650, where the values in DS, ES, FS, and GS are saved in the segment E000H data structure. This code remerges with the common code at 624. From here, the code follows the path from 624 to 632 that was explained above, resulting in a "Return" (RESET plus a branch) to the remaining Suspend Routine code.

The Fatal Suspend Error Routine is found at tasks 652 through 664 and is called at 638 if code with an improper privilege level attempts to save the state of the CPU. First, the Failsafe Timer is RESET, at 654. Then the speaker beeps a number of times at an audible frequency, e.g., three times at 886 Hz for 0.25 seconds, with 1/8th of a second between beeps, at task 656. The three beeps alerts the user that the attempted suspend did not take place. After beeping, the Failsafe Timer is RESET again at 658 to give the user a consistent 15 to 18 seconds before the Failsafe Timer expires, shutting off the power supply 17.

Next, the Fatal Suspend Error Routine repeatedly checks to see if the switch 21 was pressed by user, at tasks 660 and 662, indicating that the user wants to abort the suspend. The switch is checked for closure by the CPU 40 querying the microcontroller U2 whether a closure event occurred. If the user presses the button 21, then the execution control returns to task 640, above. If the user does not press the button 21 within 15 to 18 seconds, then the Failsafe Timer will expire and the power supply 17 will be turned "off" by the microcontroller and, obviously, all execution of the code by the CPU 40 will cease as the system voltages fall out of tolerance.

Referring now to FIG. 14, a flow chart of the Restore CPU Routine is shown starting at 700. This routine is called by the Resume Routine after the rest of the hardware and memory have been restored to their state before the suspend. First, if segment E000H is not read/write yet, it should be made read/write, at 702.

Next the flow of the executed code then branches, depending on whether the CPU 40 was executing in Virtual 8086 Mode when it was suspended, at 704. If the CPU 40 was executing in Virtual 8086 Mode when the system 10 was suspended, then the code from tasks 706 through 728, which are unique to the Virtual 8086 CPU restore. Then the code merges with a common path from tasks 730 through 748.

If the CPU was in Virtual 8086 mode when the state was saved, then CR3, LDTR, and TR could not be accessed by the Save CPU State Routine to save those values to the E000H data structure. Therefore, CR3, LDTR, and TR must be estimated, respectively, at 706, 708, and 710. In general, they are estimated by searching through the system RAM 53 for the structures to which CR3, LDTR, and TR point. For example, finding the LDT entry in the GDT allows the LDTR to be determined.

CR3 is estimated at task 706. CR3 holds the Page Directory Base Register (PDBR), which holds the page frame address of the page directory, the Page-Level Cache Disable (PCD) bit, and the Page-Level Write Through (PWT) bit. Estimation of the PDBR is done knowing that the page directory must start at a 4K boundary within system RAM 53, knowing the values for the IDTR and the GDTR, which were saved in the segment E000H data structure by the Save CPU State Routine, and assuming that the BIOS code is executing from segment F000H. The assumption is reasonable because the BIOS code is already shadowed into Shadow RAM for speed. If the operating system copied the BIOS code to a different area, then the estimation of CR3 would fail.

With the above knowledge and assumption, every 4K page of physical memory is tested for the presence of a page translation table corresponding to the BIOS code segments. That is, an offset of 03C0H into the page would contain the values 000F0XXX, 000F1XXX, 000F2XXX, . . . 000FEXXX. Once that page is located, the system RAM 53 is searched for a page directory whose first entry corresponds to the physical address of the page table that was located above. The physical address of the page directory is a good "guess" of the value of the PDBR.

The hypothetical PDBR is then verified by ensuring that the PDBR translates the addresses for the GDTR and the IDTR correctly. That is, the PDBR is used to translate the linear address of the GDTR and the first entry of the GDT is verified to be a null (the first eight bytes of the GDT are always 00H in any CPU mode). Then the physical address that is returned is verified to be within the bounds of physical memory. To accomplish the linear to physical translation, a subroutine that mimics the CPU's translation method is used; the translated address is returned in ESI and the carry flag CF is cleared if the physical page is present in physical memory, and CF is SET if the physical page is not present in memory. Using this translation routine, the first byte of the GDT is read from memory 53. If the first entry of the GDT is a null, then the hypothetical PDBR passed its first test and is, therefore, tested once again. The PDBR is then used to translate the IDTR to find the IDT using the translation routine. Then the physical address that is returned is verified to be within the bounds of physical memory. If the first location of the IDT is present in physical memory, then the PDBR passed its second test.

If a hypothetical PDBR correctly translates into the GDTR and the IDTR, then the value is presumed to be the PDBR and is written to the CR3 area within the segment E000H data structure. If, on the other hand, the hypothetical CR3 fails either test, then the routine starts again, searching system memory for another BIOS code segment page translation table, which might lead to a valid CR3.

PCD and PWT are always assumed to be fixed at 00H for normal planar operation. These values are set to zero and written with the PDBR in the CR3 area within the segment E000H data structure.

Once CR3 has been estimated, the LDTR is estimated, at 708. The LDTR can be estimated given that CR3 has been estimated, knowing that the LDT is somewhere within the GDT, and knowing that the LDT must be present in memory. To estimate the LDTR, the GDT is searched for an LDT that is marked present. The first LDT that is present in physical memory (tested using the translation routine explained in the text accompanying task 706) and is marked present is presumed to be the table to which the LDTR points. The physical address of the start of that table is saved to the LDTR area in the segment E000H data structure.

The above method of estimating LDTR is believed to be reliable enough to be useful, even though under OS/2 more than one LDT can be marked present and present in physical memory. EMM386 is a common Virtual 8086 Mode routine and, therefore, might seemingly cause problems; however, CR3 and LDTR for EMM386 are easy to estimate because EMM386 only has one CR3 and one LDTR.

Once CR3 and LDTR have been estimated, the TR is estimated, at 710. Essentially, each task selector entry within the GDT and the LDT are searched for a task state selector with the busy bit set. The type field for each entry is tested to see if it is either a busy 80286 task state selector or a busy 80486 task state selector. The first entry with either a busy 286 TSS or a busy 486 TSS is presumed to be the address to which the TR points. The physical address of the entry with the busy 286 or 486 TSS is saved to the TR area within the segment E000H data structure. If no entry has a busy 286 or 486 TSS, then the zero is saved to the TR area within the segment E000H data structure.

Having estimated CR3, LDTR, and TR, the code continues at task 712. At 712, if the TR points to a valid TSS, then the busy bit in the TSS pointed to by the TR is cleared, at 714. Either way, the code continues at 716, where DS, ES, FS, and GS are loaded with the selector valid for the GDT. Then CR3 and CR0 are loaded with the values from the segment E000H data structure, at 718. Next, paging is enabled, at 720, so the only area for which linear addresses equal physical addresses is the area in segments E000H and F000H. Then, IDTR, GDTR, LDTR, and TR are loaded with the values stored in the segment E000H data structure, at 722.

Finally, a Virtual 8086 Interrupt Stack is created at 724 and 726 by pushing values corresponding to GS, FS, DS, ES, SS, ESP, EFLAGS (after setting the VM bit), and CS from the segment E000H data structure onto the Stack. Also, a return address corresponding to the code at task 730 is pushed onto the stack at 726. Lastly, an IRETD instruction is executed to place the CPU 40 back into Virtual 8086 Mode and transfer execution to the code corresponding to task 730.

Task 730 starts the common thread, which is used by each of the various threads in FIG. 14. At task 730, the coprocessor 44 is restored from the values saved in the segment E000H data structure. Next, the state of Address Line 20 (I/O port 92H) is popped from the Stack, at 732. Task 732 is also the point to which the SMI-based CPU save state routine jumps (see task 1046). Then, Shadow RAM segment E000H is made read-only again, at 734. At 736, the APM is connected to the hardware by restarting the failsafe timer, as described in the text accompanying FIGS. 6A and 19. Then, Shadow RAM segments E000H and F000H are made read-only again, at 738. Finally, at 740, the Restore CPU State Routine sets a flag indicating that a normal resume occurred. Tasks 742, 744, and 746 are not executed by the Restore CPU State Routine, but are merely used to show that at some time prior to returning to the code that was interrupted by the suspend event, the eight general registers are popped off the Stack, maskable interrupts are enabled (if they were enabled when the code was interrupted), and the flags are popped off the stack. Lastly, the Restore CPU State Routine returns to the Supervisor Routine, which returns control back to the APM, which updates any stale system values and returns control back to the code that was interrupted.

Referring back to task 704, if the CPU 40 was not in Virtual 8086 mode when it was interrupted, then the code follows a path from 750 through 792, where the code merges with the common thread of tasks 730 through 748. At 750, if the TR value in the segment E000H data structure indicates that the TR points to a valid TSS, then the busy bit in that TSS is cleared at 752. In either case, next, at 754, the GDTR and CR0 are loaded with values from the segment E000H data structure.

Then a dummy page directory table and page translation table are loaded into segment E000H, at tasks 756 through 764. First, Shadow RAM segment E000H is made read/write, at 756. Second, a new page directory table is created at address 0E0000H, at 758. Third, the first entry in that new page directory table is modified to point to 0E1000H, at 760. Fourth, a new page translation table is created at 0E1000H such that addresses 0E0000 through 0FFFFF are present and linear addresses equal physical addresses for this address range, at 762. Lastly, the page directory base register in CR3 is loaded with 0E0000H so that address translations are made through the new dummy page directory and page translation table in 0E0000H. Paging was reactivated (if applicable) when CR0 was loaded at task 754.

Next, Shadow RAM segments E000H and F000H are made read/write, at 766. Then, if the CPU 40 was executing 16-bit code when it was suspended, then it was in 16-Bit Mode and an offset pointing to a 16-bit code path is saved to the segment E000H data structure, at 770. On the other hand, if the CPU 40 was not in 16-Bit Mode, then it was in 32-Bit Mode and an offset pointing to a 32-bit code path is saved to the segment E000H data structure, at 772, instead of the 16-bit offset. In either event, these code paths are parallel and differ only in that one uses 16-bit operands and the other uses 32-bit operands. Tasks 770 and 772 merely set up the offset into either of the parallel paths. One of the paths (the one corresponding to the offset) is entered at task 782 below.

Next, at 774, the CR3 value from the segment E000H data structure is loaded into EDX, the SS value from the segment E000H data structure is loaded into CX, the ESP value from the segment E000H data structure is loaded into EBP, the TR value from the segment E000H data structure is loaded into the upper half of ESI, and the LDTR value from the segment E000H data structure is loaded into the lower half of ESI (SI). These values are shifted into their proper locations below. Then, GDTR, LDTR, and CR0 are loaded with their values from the segment E000H data structure, at 776. At 778, LDTR is loaded with the LDTR value stored in SI. Then the code far jumps to the offset placed in either task 770 or 772. The far jump is coded by directly placing the opcode into the source code and using the offset from either 770 or 772. The code then continues in either a 16-bit opcode path or a 32-bit opcode path, at 782.

Next CR3 is loaded with the CR3 value stored in EDX, SS is loaded with the SS value stored in CX, and ESP is loaded with the ESP value stored in EBP, at 784. Then GS, FS, ES, and DS are popped off the stack, at 786. At 788, if the interrupted CPU 40 was executing code in protected mode, then the TR is loaded with the TR value stored in the upper half of ESI, at 790. In either case, the code continues at task 792, where the debug registers DR0, DR1, DR2, DR3, DR6, and DR7 are popped off the Stack.

At this point, this code path merges with the common code path of tasks 730 through 748, which were explained above. At 794, the error-recovery routine also joins the common code path from task 640 of the Save CPU State Routine.

Referring now to FIG. 15, a flow chart of the Save 8259 State Routine is shown starting at 800. Saving the states of the 8259s proceeds with saving the periodic interrupt values used by the real-time clock 98, at 802, and the saving of all other readable registers, at 804, to the segment E000H data structure. The architecture of the computer system 10 requires certain 8259 read-only registers to have fixed values, as is well known in the art. These values are known and need not be determined. The 8259 values that are difficult to obtain are the 8259 base address, the 8259 slave address, and whether the two 8259s are set to show pending or in-service interrupts by the OS.

The four above items are ascertained with the remaining code in FIG. 15. At 806 the 8259 is masked leaving only the keyboard 12 and mouse 13 interrupts unmasked.

Next, the interrupt vector table is saved by copying the bottom 1K of physical memory to a segment E000H data structure, at 808. Then, at 810, a new "dummy" interrupt vector table is loaded into the bottom 1K of physical memory by loading 256 unique dummy vectors that point to 256 dummy interrupt service routines, which start in segment C800H. At 812, the 256 dummy interrupt service routines are generated in segment C800H.

Then keyboard 12 and mouse 13 interrupts are disabled at 814. Any unacknowledged keyboard 12 and mouse 13 interrupts are acknowledged, at 816.

A keyboard interrupt is then generated, at 818, and the interrupt is tested to see if the base 8259 is set to be pending or in-service, at 820. This value is then written to the segment E000H data structure. At 822, the code waits for the interrupt to be serviced. The interrupt is serviced, at 824, by calling one of the dummy service routines. Calling the dummy service routine determines the 8259 base address and determines if the 8259 was in pending or in-service mode; the base address and mode are saved to the segment E000H data structure.

A similar procedure is performed for the slave 8259 at tasks 826, 828, 830, and 832.

At 834, the interrupt vector table is restored by copying the values from the E000H data structure back to the lower 1K of physical memory. Then segment E000H is made read-only again, at 836, and all interrupts are masked, at 838, in preparation for returning to the calling program, at 840.

Referring now to FIG. 16, the routine used to dynamically allocate the Suspend File is shown. As indicated in the text accompanying task 1012, the Suspend File allocated in the FAT should be contiguous sectors to allow for rapid writes to disk and rapid reads from disk during suspends and resumes, respectively. Also, as is evident to those skilled in the art, the Suspend File must be large enough to store the compressed contents of the entire system state.

To these ends, the routine to dynamically allocate the Suspend File begins at 1050. This routine is executed by the OS each time the system boots without executing the Resume Routine and should be executed after memory is added to the system. First, the Allocation Routine shown in FIG. 16 tests whether the power management circuit is present, at 1052, by checking a flag in CMOS NVRAM. If no power management hardware 106 is present, then the program exits, at 1054. If power management hardware 106 is present, then the routine checks to see if a Resume is pending, at 1056. If so, the program exits, at 1058.

If a resume is not pending, then next the system determines whether a new suspend file needs to be created, at 1580, by testing the Create Suspend File flag. If it is set, then a new suspend file name is created and selected as the current suspend file, at 1582.

If a new suspend file is not to be created, or after the new Suspend File name is created and that file is selected as the current Suspend File, a file must be allocated in the FAT for the Safe File. First, the size of the file is determined, at 1064. This is calculated by adding the size of the system RAM 53, the size of the video memory 58, the size of any other devices having a large volatile memory capacity, and a 64 kilobyte area for storing values in the registers of the various devices, such as the CPU 40.

After the size of the required Save File is calculated, the Allocation Routine next attempts to allocate the Save File in the FAT, at 1066. If there is not enough storage space available on the hard drive 31, the Allocation Routine calls a routine, at 1070, to increase the size of the available space on the hard drive 31, if possible.

DOS calls cannot guarantee contiguous sectors in a file. Therefore, if the hard drive 31 has enough space to tore the Save File, the Allocation Routine next determines if that space is contiguous, at 1072. If the Save File is fragmented (not contiguous) then the Allocation Routine calls a routine, at 1074, to defragment the hard drive to provide a contiguous file for the Save File, if possible.

If the Save File is not fragmented, then the Allocation Routine next writes the signature ("PS/1 Power Management") to the first sector of the Save File, at 1076, and the create suspend file flag is cleared.

Next, at 1584, the system determines whether the suspend file just created is to be a suspend once, resume many (SORM) suspend file, by testing the SORM flag. If so, then the SORM bit is set in the header of that particular suspend file and the SORM flag is cleared.

Then the Allocation Routine converts the DOS handle for this particular suspend file to its physical cylinder, head, & sector for the BIOS, and writes these values to the CMOS NVRAM, at 1078. Finally, the Allocation Routine exits, at 1080.

The routine to defragment the hard drive 31, which was called at 1074, begins at task 1082 and continues through task 1094. First the hard drive 31 is tested, at 1084, to determine if it is compressed using one of the hard drive compression routines, which are known to those skilled in the art.

If the hard drive 31 is not compressed, next the entire hard drive 31 is defragmented using a defragmenting utility, which are known to those skilled in the art, at 1086. Thereafter, the routine returns, at 1088, to begin anew the allocation portion of the Allocation Routine, at 1090.

If the hard drive 31 is compressed, then the compressed portion of the hard disk is minimized, at 1092. Thereafter, the uncompressed portion of the hard drive 31 is defragmented using a defragmenting utility, which are known to those skilled in the art, at 1094. Thereafter, the routine returns, at 1088, to begin anew the allocation portion of the Allocation Routine, at 1090.

The routine to increase the space available on the hard drive 31, which was called at 1070, begins at task 1100 and continues through task 1110. First the hard drive 31 is tested, at 1102, to determine if it is compressed using one of the hard drive compression routines, which are known to those skilled in the art.

If the hard drive 31 is not compressed, then the hard drive 31 does not have enough space available for the Save File and a message is displayed, at 1104, informing the user that to use the suspend and resume features, the user must either add additional hard drive capacity or delete files from the hard drive 31.

If the hard drive 31 is compressed, then next the size of the uncompressed portion of the hard drive 31 is increased, if possible, at 1108. Thereafter, the routine returns, at 1110, to begin anew the allocation portion of the Allocation Routine, at 1090.

Figure 17:
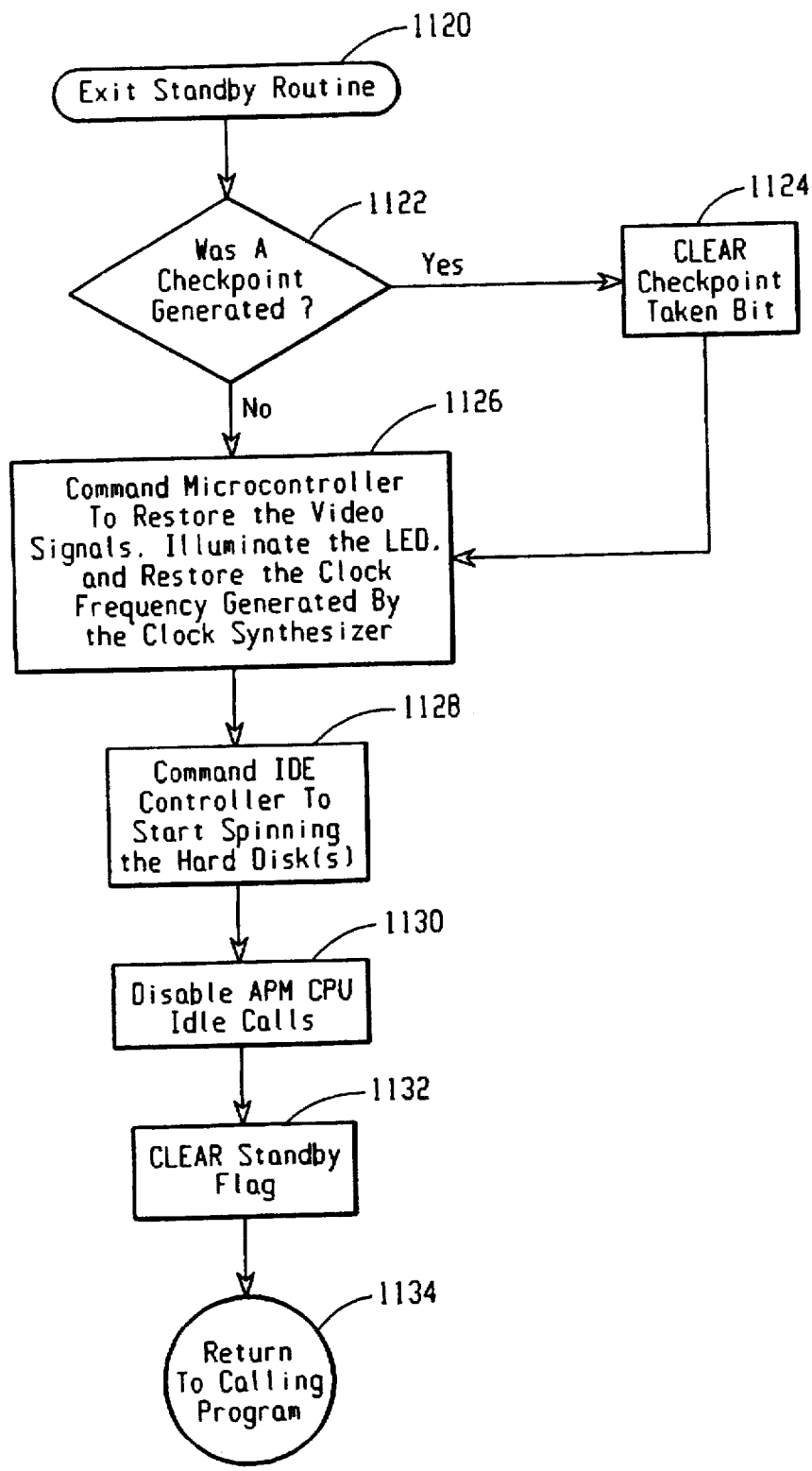
FIG. 17 is a flow chart showing the details of the Exit Standby Routine of the present invention.

Referring now to FIG. 17, the routine to exit the standby state is shown, starting at 1120. Conceptually, as the system exits the standby state 152, the system reverses the changes caused as the system transitioned from the normal operating state 150 to the standby state 152. In short, as the system exits the standby state 152, the system restores the video signal, illuminates the LED 23, spins up the hard disk within the hard drive 31, restores the system clock, disables APM CPU Idle calls so that CPU Idle calls from the APM driver no longer halt the CPU 40, and clears a flag indicating that the system 10 is in the Standby State 152.

First, the routine tests, at 1122, if a Checkpoint was generated as the system entered the standby state 152. If so, the Checkpoint taken bit is cleared, at 1124, to indicate that the Checkpoint is no longer valid. In this particular embodiment, the Checkpoint is invalidated as the system exits standby. Checkpoint data is only used to resume the system if the system fails WHILE in the standby state 152, because most systems use virtual swap files on the hard drive and resuming from the Checkpoint data could put the machine into a state in which the swap file is completely different from that expected by the system state stored as Checkpoint data. In the alternative, the Checkpoint data can be invalidated after the next disk access. In another alternative, the Checkpoint data could be invalidated after a disk access to a file that might cause system problems if the system were resumed from the Checkpoint data. In yet another alternative, the Checkpoint data could be available to users at all times with the understanding that resuming from the Checkpoint data might cause some or all of the data on the hard drive 31 to be lost.

Thereafter, and if no Checkpoint was taken, the CPU 40, at 1126: commands the microcontroller U2 to (i) cause the video controller 56 to start generating the video signal once again, (ii) cause the clock synthesizer 906 to resume the system clock's higher frequency (25 MHz or 33 MHz), and (iii) illuminate the LED 23. Then, at 1128, the CPU 40 writes an appropriate value to the fixed disk controller 86 to cause the hard disk within the hard drive 31 to start spinning. Next, APM CPU Idle calls are disabled so that CPU halts do not occur, at 1130. Finally, the Standby Flag is cleared, at 1132, indicating that the system 10 is in the normal operating state 150, and the routine returns to the calling program, at 1140.

Referring now to FIG. 18, the routine to enter the standby state is shown, starting at 1140. In short, as the system enters the standby state 152, the system blanks the video signal, flashes the LED 23, spins down the hard disk within the hard drive 31, slows the system clock, enables APM CPU Idle calls so that CPU Idle calls from the APM driver halt the CPU 40, and sets a flag indicating that the system 10 is in the Standby State 152.

First, the routine tests, at 1142, if a Checkpoint is to be taken. If so, most of the Suspend Routine is executed, at 1144, so that the state of the computer system 10 is stored on the hard drive 31. In the present embodiment, a Checkpoint is taken as the system enters standby. In the alternative, a Checkpoint can be periodically taken and used to resume the system, with the cautions discussed in the text accompanying FIG. 17. Then, at 1146, enough of the Resume Routine is executed to recover from the partial Suspend taken at 1144. Then the Checkpoint taken bit is SET, at 1148, to indicate that a valid Checkpoint was taken. Recall that in this embodiment, the Checkpoint data is only used if the system fails WHILE in the standby state 152. In this event, as the system boots, it resumes from the saved Checkpoint.

Ideally, the Checkpoint should be totally transparent to the system. As such, the checkpoint should be aborted if a hardware interrupt occurs to prevent data loss. In the alternative, as with a normal suspend, any hardware interrupts can be ignored.

Thereafter, and if no Checkpoint was to be taken, the CPU 40, at 1150: commands the microcontroller U2 to (i) cause the video controller 56 to stop generating the video signal, (ii) cause the clock synthesizer 906 to slow the system clock from its higher frequency (25 MHz or 33 MHz) to 8 MHz, and (iii) flash the LED 23. Then, at 1152, the CPU 40 writes an appropriate value to the fixed disk controller 86 to cause the hard disk within the hard drive 31 to stop spinning. Next, APM CPU Idle calls are enabled so that CPU Idle calls from the APM driver halt the CPU 40, at 1154. Finally, the Standby Flag is SET, at 1156, indicating that the system 10 is in the standby state 152, and the routine returns to the calling program, at 1158.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A computer system having at least two modes of power management, namely a normal operating mode in which code is executed normally by said computer system, and a suspend mode, said computer system entering said normal operating mode in one of an attended fashion and an unattended fashion, said system comprising:
   (a) at least one inactivity suspend timer, said inactivity suspend timer determining the expiration of a first inactivity period of time responsive to said computer system entering said normal operating mode in the attended fashion, said inactivity suspend timer determining the expiration of a second inactivity period of time responsive to said computer system entering said normal operating mode in the unattended fashion, said first inactivity period of time being longer than said second inactivity period of time; and
   (b) a control unit for actively controlling transitions of said computer system from said normal operating mode to said suspend mode in response to expiration of one of the first and second inactivity periods of time.

2. A computer system according to claim 1:
   (a) further comprising a processor in circuit communication with volatile system memory, volatile registers, and a nonvolatile memory, all in circuit communication with a power supply;
   (b) wherein said suspend mode is characterized by said nonvolatile memory having stored therein a suspend file including a snapshot of the contents of the volatile system memory and the volatile registers at a point in time where code execution by said processor was reversibly interrupted; and
   (c) wherein said suspend mode is further characterized by said nonvolatile memory, said processor, said volatile system memory, and said volatile registers all not being powered by said power supply.

3. A computer system according to claim 1 wherein said at least one activity suspend timer switches from the second inactivity period of time to the first inactivity period of time responsive to a predetermined event.

4. A computer system according to claim 3 wherein said predetermined event comprises user activity.

5. A computer system having at least two modes of power management, namely a normal operating mode in which code is executed normally by said computer system, and a suspend mode, said computer system entering said normal operating mode in one of an attended fashion and an unattended fashion, said system comprising:
   (a) a first inactivity suspend timer, said first inactivity suspend timer determining the expiration of a first inactivity period of time responsive to said computer system entering said normal operating mode in the attended fashion;
   (b) a second inactivity suspend timer, said second inactivity suspend timer determining the expiration of a second inactivity period of time responsive to said computer system entering said normal operating mode in the unattended fashion, said first inactivity period of time being longer than said second inactivity period of time; and
   (c) a control unit for actively controlling transitions of said computer system from said normal operating mode to said suspend mode in response to expiration of one of the first and second inactivity suspend timers.

6. A computer system according to claim 5:
   (a) further comprising a processor in circuit communication with volatile system memory, volatile registers, and a nonvolatile memory, all in circuit communication with a power supply;

(b) wherein said suspend mode is characterized by said nonvolatile memory having stored therein a suspend file including a snapshot of the contents of the volatile system memory and the volatile registers at a point in time where code execution by said processor was reversibly interrupted; and (c) wherein said suspend mode is further characterized by said nonvolatile memory, said processor, said volatile system memory, and said volatile registers all not being powered by said power supply.

7. A computer system having at least four modes of power management, namely a normal operating mode in which code is executed normally by said computer system, a standby mode, a suspend mode, and an off mode, said computer system entering said normal operating mode in one of an attended fashion and an unattended fashion, said system comprising:

(a) at least one inactivity suspend timer, said inactivity suspend timer determining the expiration of a first inactivity period of time responsive to said computer system entering said normal operating mode in the attended fashion, said inactivity suspend timer determining the expiration of a second inactivity period of time responsive to said computer system entering said normal operating mode in the unattended fashion, said first inactivity period of time being longer than said second inactivity period of time; and (b) a control unit for actively controlling transitions of said computer system from said normal operating mode to said suspend mode in response to expiration of one of the first and second inactivity periods of time.

8. A method of managing the power of a computer system having a power button, a modem, a keyboard, and a mouse and further having at least three modes of power management, namely a normal-attended mode in which code is executed normally by the computer system, a normal-unattended mode in which code is executed normally by said computer system, and a suspend mode in which code execution by said computer system has been reversibly interrupted, said method comprising the steps of:

(a) transitioning from the suspend mode to the normal-attended mode responsive to the power button being actuated;

(b) transitioning from the suspend mode to the normal-unattended mode responsive to the modem receiving a ring signal via an attached telephone line;

(c) transitioning from the normal-unattended mode to the normal-attended mode responsive to user activity being detected at one of the keyboard and mouse;

(d) while in the normal-unattended mode, receiving a data transmission from the attached telephone line via the modem;

(e) transitioning from the normal-unattended mode to the suspend mode after a first preselected time interval of inactivity; and (f) transitioning from the normal-attended mode to the suspend mode after a second preselected time interval of inactivity, the first preselected period of inactivity being shorter than the second preselected period of inactivity.

9. A method of managing the power of a computer system according to claim 8:

(a) wherein the computer system further includes a processor in circuit communication with volatile system memory, volatile registers, and a nonvolatile memory, all in circuit communication with a power supply;

(b) wherein the suspend mode is characterized by the nonvolatile memory having stored therein a suspend file including a snapshot of the contents of the volatile system memory and the volatile registers at a point in time where code execution by the processor was reversibly interrupted; and (c) wherein the suspend mode is further characterized by the nonvolatile memory, the processor, the volatile system memory, and the volatile registers all not being powered by the power supply.

10. A method of managing the power of a computer system according to claim 8 wherein the nonvolatile memory comprises a fixed disk storage device.

11. A method of managing the power of a computer system according to claim 8 wherein said step of receiving a data transmission from the attached telephone line via the modem comprises receiving a facsimile transmission from the attached telephone line via the modem.

12. A method of managing the power of a computer system according to claim 8 wherein the first preselected period of inactivity is about two minutes and the second preselected period of inactivity is about thirty minutes.

13. A method of managing the power of a computer system having a power button, an internal wakeup timer, a keyboard, and a mouse and further having at least three modes of power management, namely a normal-attended mode in which code is executed normally by the computer system, a normal-unattended mode in which code is executed normally by the computer system, and a suspend mode in which code execution by the computer system has been reversibly interrupted, said method comprising the steps of:

(a) transitioning from the suspend mode to the normal-attended mode responsive to the power button being actuated;

(b) transitioning from the suspend mode to the normal-unattended mode responsive to the internal wakeup timer expiring;

(c) transitioning from the normal-unattended mode to the normal-attended mode responsive to user activity being detected at one of the keyboard and mouse;

(d) while in the normal-unattended mode, performing a specific activity at a specific time with the computer system;

(e) transitioning from the normal-unattended mode to the suspend mode after a first preselected time interval of inactivity; and (f) transitioning from the normal-attended mode to the suspend mode after a second preselected time interval of inactivity, the first preselected period of inactivity being shorter than the second preselected period of inactivity.

14. A method of managing the power of a computer system according to claim 13:

(a) wherein the computer system further includes a processor in circuit communication with volatile system memory, volatile registers, and a nonvolatile memory, all in circuit communication with a power supply;

(b) wherein the suspend mode is characterized by the nonvolatile memory having stored therein a suspend file including a snapshot of the contents of the volatile system memory and the volatile registers at a point in time where code execution by the processor was reversibly interrupted; and (c) wherein the suspend mode is further characterized by the nonvolatile memory, the processor, the volatile system memory, and the volatile registers all not being powered by the power supply.

15. A method of managing the power of a computer system according to claim 13 wherein the nonvolatile memory comprises a fixed disk storage device.

16. A method of managing the power of a computer system according to claim 13 wherein the first preselected period of inactivity is about two minutes and the second preselected period of inactivity is about thirty minutes.

17. A computer system comprising a power button, a modem, a keyboard, and a mouse, all in circuit communication with a processor, further comprising at least three modes of power management, namely a normal-attended mode in which code is executed normally by said computer system, a normal-unattended mode in which code is executed normally by said computer system, and a suspend mode in which code execution by said computer system has been reversibly interrupted, and further comprising a control unit in circuit communication with said processor, said control unit:
   (a) causing a transition from the suspend mode to the normal-attended mode responsive to the power button being actuated;
   (b) causing a transition from the suspend mode to the normal-unattended mode responsive to the modem receiving a ring signal via an attached telephone line;
   (c) causing a transition from the normal-unattended mode to the normal-attended mode responsive to user activity being detected at one of the keyboard and mouse;
   (d) causing a transition from the normal-unattended mode to said suspend mode after a first preselected time interval of inactivity; and
   (e) causing a transition from the normal-attended mode to said suspend mode after a second preselected time interval of inactivity, said first preselected period of inactivity being shorter than said second preselected period of inactivity.

18. A computer system according to claim 17:
   (a) wherein said processor is in circuit communication with volatile system memory, volatile registers, and a nonvolatile memory, all in circuit communication with a power supply;
   (b) wherein said suspend mode is characterized by said nonvolatile memory having stored therein a suspend file including a snapshot of the contents of said volatile system memory and said volatile registers at a point in time where code execution by said processor was reversibly interrupted; and
   (c) wherein said suspend mode is further characterized by said nonvolatile memory, said processor, said volatile system memory, and said volatile registers all not being powered by said power supply.

19. A computer system according to claim 17 wherein said nonvolatile memory comprises a fixed disk storage device.

20. A computer system according to claim 17 wherein said computer system receives a data transmission from an attached telephone line via said modem while in said normal-unattended mode.

21. A computer system according to claim 17 wherein said first preselected period of inactivity is about two minutes and said second preselected period of inactivity is about thirty minutes.

22. A computer system according to claim 17 wherein said control unit comprises code for execution by said processor.

23. A computer system comprising a power button, an internal wakeup timer, a keyboard, and a mouse, all in circuit communication with a processor, further comprising at least three modes of power management, namely a normal-attended mode in which code is executed normally by said computer system, a normal-unattended mode in which code is executed normally by said computer system, and a suspend mode in which code execution by said computer system has been reversibly interrupted, and further comprising a control unit in circuit communication with said processor, said control unit:
   (a) causing a transition from the suspend mode to the normal-attended mode responsive to the power button being actuated;
   (b) causing a transition from the suspend mode to the normal-unattended mode responsive to the internal wakeup timer expiring;
   (c) causing a transition from the normal-unattended mode to the normal-attended mode responsive to user activity being detected at one of the keyboard and mouse;
   (d) causing a transition from the normal-unattended mode to said suspend mode after a first preselected time interval of inactivity; and
   (e) causing a transition from the normal-attended mode to said suspend mode after a second preselected time interval of inactivity, said first preselected period of inactivity being shorter than said second preselected period of inactivity.

24. A computer system according to claim 23:
   (a) wherein said processor is in circuit communication with volatile system memory, volatile registers, and a nonvolatile memory, all in circuit communication with a power supply;
   (b) wherein said suspend mode is characterized by said nonvolatile memory having stored therein a suspend file including a snapshot of the contents of said volatile system memory and said volatile registers at a point in time where code execution by said processor was reversibly interrupted; and
   (c) wherein said suspend mode is further characterized by said nonvolatile memory, said processor, said volatile system memory, and said volatile registers all not being powered by said power supply.

25. A computer system according to claim 23 wherein said nonvolatile memory comprises a fixed disk storage device.

26. A computer system according to claim 23 wherein said first preselected period of inactivity is about two minutes and said second preselected period of inactivity is about thirty minutes.

27. A computer system according to claim 23 wherein said control unit comprises code for execution by said processor.

* * * * *